US008943357B2

(12) United States Patent
Atzmony

(10) Patent No.: US 8,943,357 B2
(45) Date of Patent: Jan. 27, 2015

(54) SYSTEM AND METHODS FOR RAID WRITING AND ASYNCHRONOUS PARITY COMPUTATION

(75) Inventor: Yedidia Atzmony, Omer (IL)

(73) Assignee: Kaminario Technologies Ltd., Yokne'Am Ilit (IL)

( * ) Notice: Subject to any disclaimer, the term of this patent is extended or adjusted under 35 U.S.C. 154(b) by 820 days.

(21) Appl. No.: 13/124,243

(22) PCT Filed: Oct. 27, 2009

(86) PCT No.: PCT/IL2009/001003

§ 371 (c)(1), (2), (4) Date: Apr. 14, 2011

(87) PCT Pub. No.: WO2010/049928

PCT Pub. Date: May 6, 2010

(65) Prior Publication Data

US 2011/0202792 A1 Aug. 18, 2011

Related U.S. Application Data

(60) Provisional application No. 61/193,079, filed on Oct. 27, 2008, provisional application No. 61/165,670, filed on Jan. 4, 2009.

(51) Int. Cl.
*G06F 11/00* (2006.01)
*G06F 11/10* (2006.01)

(52) U.S. Cl.
CPC .... *G06F 11/1076* (2013.01); *G06F 2211/1009* (2013.01); *G06F 2211/1054* (2013.01)
USPC .......................... 714/6.13; 714/6.1; 714/6.24

(58) Field of Classification Search
USPC .......................... 714/6.13, 6.1, 6.24; 711/133
See application file for complete search history.

(56) References Cited

U.S. PATENT DOCUMENTS 4,761,785 A * 8/1988 Clark et al. .................. 714/805
4,942,579 A * 7/1990 Goodlander et al. ......... 714/805

(Continued)

FOREIGN PATENT DOCUMENTS

EP 0802485 A1 10/1997
EP 1193600 A2 4/2002

OTHER PUBLICATIONS

Menon et al., The Architecture of a Fault-Tolerant Cached RAID Controller, Computer Architecture News, May 1993, pp. 76-86, vol. 21, No. 2, ACM, New York, NY, USA.

(Continued)

*Primary Examiner* — Loan L. T. Truong
(74) *Attorney, Agent, or Firm* — Wiggin and Dana LLP; Gregory S. Rosenblatt

(57) ABSTRACT

A computer storage management system for managing a first plurality of data storage units, the system including: (a) an asynchronous parity computation manager which, responsive to a write operation in which an incoming data portion is to be written into an individual storage unit from among the storage units, deposits the incoming value in the individual storage unit and stores a copy of the data element in a pre-parity storage area, and wherein asynchronously with depositing the incoming value in the individual storage unit, the asynchronous parity computation manager is operative to compute parity data corresponding to the incoming data portion and to other data portions which are associated with the incoming data portion and to store the parity data; and (b) a post-loss data recovery manager operative to recover lost data including determining whether at least one parity value associated with at least one data portion within said lost data is not current and, for at least one non-current parity, using information stored in the pre-parity storage area to generate, after said lost data has been lost, a current parity to replace said non-current parity and using said current parity to recover said lost data.

53 Claims, 43 Drawing Sheets

(56) References Cited

U.S. PATENT DOCUMENTS

| | | | | |
|---|---|---|---|---|
| 5,522,065 | A * | 5/1996 | Neufeld | 714/6.12 |
| 5,548,735 | A * | 8/1996 | Chen et al. | 710/7 |
| 5,557,770 | A * | 9/1996 | Bhide et al. | 711/161 |
| 5,598,549 | A * | 1/1997 | Rathunde | 711/114 |
| 6,012,123 | A * | 1/2000 | Pecone et al. | 711/114 |
| 6,725,392 | B1 * | 4/2004 | Frey et al. | 714/6.12 |
| 6,802,039 | B1 * | 10/2004 | Quach et al. | 714/763 |
| 7,093,157 | B2 * | 8/2006 | Hajji | 714/5.1 |
| 7,136,976 | B2 * | 11/2006 | Saika | 711/162 |
| 7,159,150 | B2 * | 1/2007 | Kenchammana-Hosekote et al. | 714/43 |
| 7,426,611 | B1 * | 9/2008 | Gupta et al. | 711/119 |
| 7,793,146 | B1 * | 9/2010 | Gibson et al. | 714/6.13 |
| 8,286,029 | B2 * | 10/2012 | Anderson et al. | 714/6.32 |
| 2001/0018729 | A1 * | 8/2001 | Johnson | 711/114 |
| 2004/0093464 | A1 * | 5/2004 | Hassner et al. | 711/114 |
| 2006/0047896 | A1 * | 3/2006 | Nguyen et al. | 711/112 |
| 2006/0107091 | A1 * | 5/2006 | Hafner et al. | 714/5 |
| 2007/0028145 | A1 * | 2/2007 | Gerhard et al. | 714/36 |
| 2007/0067667 | A1 * | 3/2007 | Ikeuchi et al. | 714/6 |
| 2007/0162692 | A1 | 7/2007 | Nishimoto et al. | |
| 2008/0016435 | A1 * | 1/2008 | Goel | 714/801 |
| 2008/0040553 | A1 * | 2/2008 | Ash et al. | 711/133 |
| 2008/0109616 | A1 * | 5/2008 | Taylor | 711/155 |
| 2008/0222214 | A1 * | 9/2008 | Tokuda et al. | 707/202 |
| 2008/0250270 | A1 * | 10/2008 | Bennett | 714/6 |
| 2009/0049050 | A1 * | 2/2009 | Whitehead | 707/10 |
| 2009/0089612 | A1 * | 4/2009 | Mathew et al. | 714/6 |
| 2010/0031060 | A1 * | 2/2010 | Chew et al. | 713/193 |

OTHER PUBLICATIONS

Varma et al., Destage Algorithms for Disk Arrays with Non-Volatile Caches, Computer Architecture News, May 1995, pp. 83-95, vol. 23, No. 2, ACM, New York, NY, USA.

Menon et al., Floating Parity and Data Disk Arrays, Journal of Parallel and Distributed Computing, Jan./Feb. 1993, pp. 129-139, vol. 17, No. 1/2, Elsevier, Amsterdam, NL.

International Search Report dated Feb. 19, 2010 in corresponding International Application No. PCT/IL2009/001003.

* cited by examiner

| N, O Occupancy table for $S_7$ | | | | |
|---|---|---|---|---|
| Slot in N | | Slot in S7 | Slot in O | |
| $N_{19}$ | 23 | 1 | $O_2$ | 345 |
| $N_{134}$ | 143 | 17 | $O_1$ | 19 |
| $N_{14}$ | 645 | 142 | $O_{243}$ | 65 |
| $N_1$ | 273 | 78 | $O_1$ | 27873 |
| $N_{314}$ | 115 | 1 | $O_{14}$ | 11 |
| $N_{614}$ | 2234 | 12 | $O_{61}$ | 234 |
| $N_{1014}$ | 9123 | 9123 | $O_{134}$ | 23 |
| $N_5$ | 17 | 253 | $O_{56}$ | 1 |
| $N_{17}$ | 3 | 19 | $O_7$ | 213 |
| ... | | ... | ... | |
| $N_{464}$ | 55 | $S_n$ | $O_{34}$ | 12 |

Figure 11C

| N, O Occupancy table | |
|---|---|
| Slot $N_3$ $O_3$ | Slot $S_7$ |
| 1 | 1 |
| 2 | 17 |
| 3 | NULL |
| 4 | 142 |
| 5 | NULL |
| 6 | 1 |
| 7 | 12 |
| 8 | NULL |
| 9 | 9123 |
| 10 | 253 |
| ... | |
| k | $S_n$ |

Figure 11D 2900
2903
T=0
TimeFactor=4
2905
Write S1(a)
2910
2913
T=1
TimeFactor=4
2915
Write S1(c)
(To Fig 24b or Fig 25a)
S1
S2
P
B
a b c d e f g h
i j k l m n o p

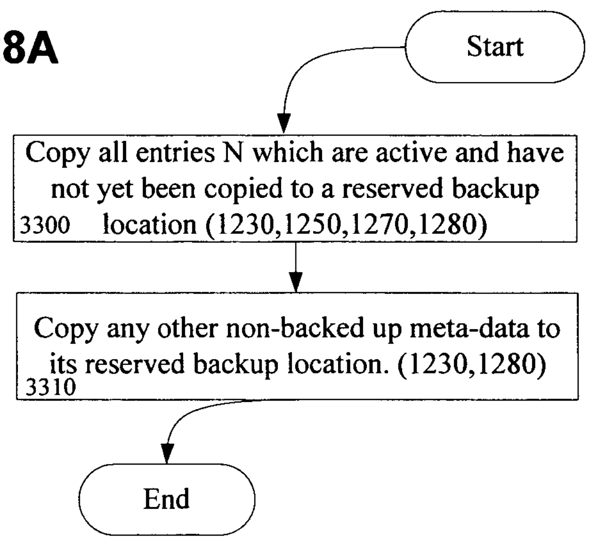
Figure 28A
Start
Copy all entries N which are active and have not yet been copied to a reserved backup location (1230,1250,1270,1280)
3300
Copy any other non-backed up meta-data to its reserved backup location. (1230,1280)
3310
End

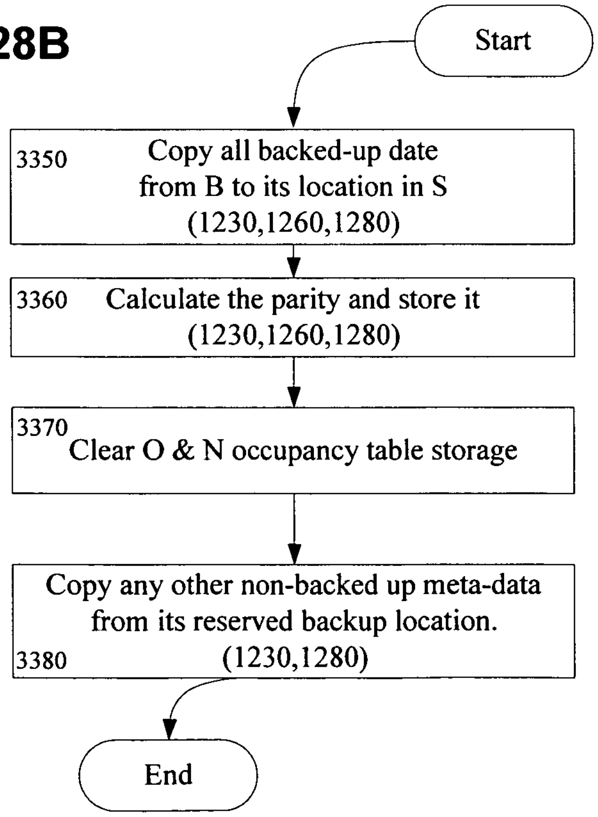
Figure 28B
Start
3350
Copy all backed-up date from B to its location in S (1230,1260,1280)
3360
Calculate the parity and store it (1230,1260,1280)
3370
Clear O & N occupancy table storage
Copy any other non-backed up meta-data from its reserved backup location. (1230,1280)
3380
End

SYSTEM AND METHODS FOR RAID WRITING AND ASYNCHRONOUS PARITY COMPUTATION

REFERENCE TO CO-PENDING APPLICATIONS

Priority is claimed from PCT Patent Application No. PCT/IL2009/001003, entitled "System and methods for raid writing and asynchronous parity computations", filed Oct. 27, 2009, which in turn claims priority from U.S. Provisional Application No. 61/193,079, entitled "A Mass-Storage System Utilizing Volatile Memory Storage and Non-Volatile Storage" filed Oct. 27, 2008; and from U.S. Provisional Patent Application No. 61/165,670 "System and Methods for RAID Writing and Asynchronous Parity Computation", filed Jan. 4, 2009.

FIELD OF THE INVENTION

The present invention relates generally to storage systems and more particularly to storage systems with RAID-like data storage management schemes.

BACKGROUND OF THE INVENTION

Redundancy is an important storage concept involving extra data written across the array, organized so that the failure of one (sometimes more) disks in the array will not result in loss of data. A failed disk may be replaced by a new one, and the data on it reconstructed from the remaining data and the extra data. A redundant array allows less data to be stored. For instance, a 2-disk RAID 1 (mirrored) array loses half of the total capacity that would have otherwise been available using both disks independently, and a RAID 5 array with several disks loses the capacity of one disk.

RAID schemes manage a group of storage units such as disks so as to achieve data reliability and increased input/output performance. When multiple physical disks are set up to use RAID technology, they are said to be in a RAID array (or members of a RAID group).

Different RAID "levels" use one or more of the following techniques: striping, mirroring, and parity. Striping refers to splitting data across more than one disk; this enhances performance by allowing sequences of data to be read simultaneously from multiple disks. In mirroring, data is copied to more than one disk to expedite reading data, however, mirroring may slow writing if both disks are required by the configuration to confirm that the data has been correctly written. Parity involves redundant data stored to provide fault tolerance, however, speed is typically adversely affected.

RAID 0 schemes use striped disks which distribute data across several disks in a way that gives improved speed and full capacity, but all data on all disks will be lost if any one disk fails. RAID 1 schemes use mirrored settings/disks to achieve a real-time backup solution. Two (or more) disks each store exactly the same data, at the same time, and at all times. Data is not lost as long as one disk survives. Total capacity of the array is simply the capacity of one disk. At any given instant, each disk in the array is simply identical to every other disk in the array. RAID 2 does not use conventional mirroring, striping or parity. Data is split at the bit level and distributed over a number of data disks and a number of redundancy disks. Redundant bits may be computed and written to dedicated ECC disks using Hamming error correction codes.

In RAID 3, data is striped across multiple disks at a byte level and parity information is sent to a dedicated parity disk. The failure of any disk in the array, including the parity disk, can be tolerated. RAID 4 stripes data across many disks in blocks, rather than bytes as in RAID 3, so as to improve performance, and, like RAID 3, provides fault tolerance through a dedicated parity disk. RAID 5 uses striped disks with parity, combining three or more disks so as to protect data against loss of any one disk; the storage capacity of the array is reduced by one disk. RAID 6 provides striped disks with dual parity, enabling recovery even from the loss of two disks.

Conventional disk arrays typically provide a selectable one of some or all of these RAID levels. RAID levels may be hardware based, software based and firmware based. Software based RAID schemes are typically implemented in the operating system and present as a single drive to applications running upon the operating system.

An example of a state of the art data storage system is U.S. Pat. No. 5,720,025 to Wilkes et al.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a data storage system including a primary storage layer such as a virtual memory layer and a backup layer, wherein a RAID (other than RAID 0) scheme is implemented asynchronously on the primary storage layer. Whereas a portion of the data in the primary storage layer may not be RAIDed at a particular time, which may be a time of failure, at least a copy of the data portion or data enabling its reconstruction, exists within the system.

Many storage systems use RAID-4, RAID-5 or RAID-6 type schemes, or combinations and modifications thereof, to achieve striping and/or parity within a group of storage elements, each such storage element being termed a "member". In RAID 4 redundancy is achieved by sub-dividing storage elements into small units, such as blocks, which are addressed from 0 to b, the number of blocks in the storage element. If the RAID scheme has n members (e.g. in RAID-4, n=6), all blocks tagged with the same address j are considered a "stripe". One member of the 6 storage elements (say C) is designated as the parity storage element and never stores actual user data. Instead, it holds the parity of ALL data blocks from all members in the RAID groups, computed for all blocks in the same stripe j. In contrast, in RAID-4 schemes, a single storage element C is involved in all WRITE operations, in RAID-5 the parity blocks are distributed amongst ALL RAID members to even out the load in a WRITE operation. In RAID-6 schemes, 2 independent parities are computed and stored.

In the RAID schemes described above, more than one member participates in each Write operation. For example, in RAID-4 and 5 at least 2 members participate (the one being written upon and the one holding the parity) and in RAID-6 at least 3 members participate: the member being written to, and 2 additional members which have been designated to store parities. Typically, when effecting a WRITE in a RAID group, the host writing the I/O will receive acknowledgement only once all writes relevant to the I/O, including data writing and parity writing after parity computation, have been completed. This creates complexity if parallel I/O WRITE requests to several blocks in the same stripe are received e.g. in order to ensure that the relevant parity or, in the case of RAID-6, parities, are all up-to-date prior to acknowledging each WRITE operation. Failure to compute the parity correctly will make correct recovery of the data impossible once a member in the stripe group of the bad parity block is lost.

According to certain embodiments of the present invention, striping and/or parity properties of the RAID scheme (4, 5 or 6) are generally maintained, however building of the parity into the designated blocks is not necessarily effected concurrently with the I/O and instead, in order to simply and/or expedite I/O operations, parity building may sometimes or always be effected in an asynchronous fashion, e.g. only later, using some low level task.

Typically, when a WRITE request is issued, the data is written in 2 locations—a designated location, also termed "the data block" in the RAID group and an additional storage location e.g. in secondary storage. Once the copies have been written, the WRITE operation is acknowledged. The old data that previously resided in the original data location may be copied locally into a repository until such time that the RAID parity is computed for the new value, at which point the old copy may be discarded. The system may compute the parity for the same block stripe where this previous I/O is written to only subsequently, i.e. after acknowledgement of the write operation. In other embodiments the data in the secondary container is always written to the non-volatile memory ensuring that an old copy of the data continues to exist until the RAID property is computed.

Generally, the parity computation is successful and the RAID property is achieved. At this point the system may discard the second copy since redundancy has been achieved by the parity. In the event that an additional write was received to the same block stripe the system may delay the parity computation, returning to it only at a later time allowing the I/O to run first. In some embodiments, if the new WRITE is to a block that still has no parity, the parity computation may pick up the new value and commence computing the parity—overwriting or discarding the previous value.

In the event that more than one block from the same stripe is written and the parity does not reflect that, the computation may be effected either one block at a time or several or all blocks in parallel. In both cases the desired parity and/or striping properties are achieved for all blocks participating in the update. In some embodiments data stored in secondary storage for temporary protection may also be written to a non-volatile repository for long term protection. If the RAID members are non-volatile this is not necessary.

In the event that the temporary storage is so full that it cannot receive any more data, the next I/O WRITE operation is typically rejected by the storage system until some space becomes available by computing the parity for some of the pending writes. Optionally, the asynchronous RAID storage system may identify that the limit of available secondary storage space is being approached and preemptively promote the priority of the parity computation to free up some space. Alternatively, or in addition, the I/O rate may be artificially slowed, e.g. by holding acknowledgement answers to the host up to a maximum time, to free up some idle time for the parity process to work in.

When data has been lost and must be recovered, there is a high probability that the data (typically the total amount of storage data minus the size of the secondary storage) has already been set with correct parity values, in which case conventional RAID recovery computation is used to restore the data. In the case that the data that was lost had not yet been set with correct parity values, the missing data is recovered using the data from the secondary repository. Specifically, if a block is lost from a given stripe j, the recovery process goes over the secondary repositories and determines whether they hold any data from that stripe. If they do, that data is updated, for all members, and the missing member is then computed, unless the missing member is the one in the secondary storage in which case the relevant data is simply copied. In the event that the stripe is already up-to-date, a conventional RAID operation may be used to recover the data.

Writing, say to a block $b_2$, may comprise the following operations, assuming that $S_1$ to $S_K$ are a RAID group; $b_1$ to $b_K$ are blocks in a RAID stripe i all maintaining the RAID property; and $b_N$ (1<=N<=K), also denoted C, is the respective parity block; $T_1$ to $T_M$ are temporary storage containers and $N_1$ to $N_M$ are additional storage containers; all data residing in the S elements also has (at least) an additional copy either in the N additional elements or in the T temporary elements.

a. The system writes the data at its location at stripe i in storage element $S_2$ and also in temporary storage (say $T_1$), and denotes in a Valid Entries Table that the location in $T_1$ where $b_2$ was written is valid.

b. At a time at which the parity computation is of the highest priority, the system computes a new parity to reflect the above write operation by XORing the new value of $b_2$ (taken from either $S_2$ or $T_1$) with the old value of $b_2$ (residing in $N_3$). In turn that value is XORed to the existing parity and the new parity value is then stored in C. If, in the middle of computing the new parity, another WRITE operation is executed against the same location, the parity computation is typically aborted, since it has become irrelevant.

c. In the event that the temporary buffer has become full to a predetermined degree, the priority of the parity operation may be increased such that it supersedes other operations including I/O operations. In such a case the system may delay or reject the I/O operation, necessitating a retry on the host.

Recovery of Lost Data (say, of block $b_2$) may include the following steps:

a. Use the Valid Entries Table to check whether there is any entry belonging to stripe i in any of the temporary storage T. If there is no such entry in the temporary storage, the value of b2 is computed using the recovery process appropriate to the RAID scheme with all the blocks other than $b_2$.

b. If use of the Valid Entries Table yields that there are entries belonging to stripe i in temporary storage T, say if block $b_2$ resides in $T_1$ then the value is restored from the $T_1$ storage element.

c. Otherwise, get the block from the $N_3$ storage.

It is appreciated that various embodiments shown and described herein are advantageous compared to conventional RAID schemes. For example, assume that multiple write operations are obtained for stripe i e.g. j out of the i elements. Then, according to certain embodiments of the present invention, the system may handle these I/O operations in parallel by writing all new blocks to their respective locations and acknowledging the WRITE operation, yielding an O(1) (constant time) operation. In contrast, in a conventional RAIDed system, the storage may either handle the operations one by one by writing a block, updating the parity and so on, yielding an O(j) operation, or may handle all the operations together, which necessitates a complex procedure whereby all I/Os compute the respective parity of the old and new values of each block, then collect and combine all the values together with the previous parity.

It is appreciated that non-volatile storage may serve as an additional backup, which need not necessarily be a slow solution since some state of the art Non-volatile storage systems are faster than conventional HDD (hard disk drive).

There is thus provided, in accordance with at least one embodiment of the present invention, a computer storage management system for managing a first plurality of computer storage units operative to store data each including at least a second plurality of corresponding data portions, the system comprising a parity-based RAID writing and asynchronous parity computation manager operative to manage a stream of operations including writing operations and to asynchronously compute at least one parity, including, responsive to occurrence of at least one write operation in which an incoming value is to be written into an individual computer storage unit from among the computer storage units, depositing the incoming value in the individual storage unit, thereby to define an individual data portion stored therewithin, and in a pre-parity storage area and computing and storing a parity combining the incoming value with the values of those data portions, in the computer storage units other than the individual computer storage unit, which correspond to the individual data portion; and a post-loss parity computing data recovery manager operative to recover lost data including determining whether at least one parity of at least one data portion within the lost data is not current and, for at least one non-current parity, using information stored in the pre-parity storage area to generate, after the lost data has been lost, a current parity to replace the non-current parity and using the current parity to recover the lost data.

Further, in accordance with at least one embodiment of the present invention, the computation manager is operative to compute at least one parity pertaining to at least one individual writing operation in the stream after storing an incoming value pertaining to at least one writing operation subsequent to the individual writing operation.

Still further in accordance with at least one embodiment of the present invention, the system also comprises a pre-parity storage area.

Additionally in accordance with at least one embodiment of the present invention, the at least one parity is computed after storing, only if a predetermined I/O congestion situation exists.

Still further in accordance with at least one embodiment of the present invention, the predetermined I/O congestion situation includes at least a predetermined number of pending write operations.

Additionally in accordance with at least one embodiment of the present invention, at least a portion of the pre-parity storage area and at least one of the computer storage units are located within a single storage container.

Further in accordance with at least one embodiment of the present invention, the pre-parity storage area is located in a non-volatile storage device.

Still further in accordance with at least one embodiment of the present invention, the parity-based RAID writing and asynchronous parity computation manager is operative to move at least one incoming value from the pre-parity storage area to non-volatile memory.

Additionally, in accordance with at least one embodiment of the present invention, the parity-based RAID writing and asynchronous parity computation manager is operative to move at least one incoming value from the pre-parity storage area to non-volatile memory at least when a predetermined high water mark of the pre-parity storage area has been reached.

Further, in accordance with at least one embodiment of the present invention, the parity-based RAID writing and asynchronous parity computation manager is operative to move at least one incoming value from the pre-parity storage area to non-volatile memory each time a set of incoming values has accumulated in the pre-parity storage area which answers to a predetermined criteria for continuousness in a context defined by a storage scheme of the non-volatile memory.

Still further in accordance with at least one embodiment of the present invention, the parity-based RAID writing and asynchronous parity computation manager is operative to move at least one incoming value from the pre-parity storage area to non-volatile memory each time a predetermined period of time has elapsed since incoming values were last moved from the pre-parity storage area to non-volatile memory.

Additionally, in accordance with at least one embodiment of the present invention, the pre-parity storage area comprises a FIFO storing incoming data portion and, for each individual incoming data portion stored, a pointer indicating a computer storage unit, from among the first plurality thereof, for which the individual incoming data portion stored is intended, and a parity computed bit indicating whether or not a parity has been computed for the individual incoming data portion stored.

Further, in accordance with at least one embodiment of the present invention, the computation manager is operative to carry out at least one asynchronous parity computation session in which at least one parity is computed pertaining to at least one individual writing operation in the stream after storing an incoming value pertaining to at least one writing operation subsequent to the individual writing operation, and wherein the session is followed by at least one writing session and subsequently by a shut-down having a duration, and wherein the computation manager is operative to store at least one parity and at least one incoming value combined into the at least one parity in a backup storage device during the asynchronous parity computation session and prior to shut down, thereby to shorten the duration of the shut-down.

Still further in accordance with at least one embodiment of the present invention, a plurality of parities, respectively combining a plurality of incoming values, are computed in the asynchronous parity computation session, and wherein all of the plurality of parities and the incoming values respectively combined therein are stored in the backup storage device after first computing all of the parities.

Additionally, in accordance with at least one embodiment of the present invention, a plurality of parities, respectively combining a plurality of incoming values, are computed in the asynchronous parity computation session, and wherein computation of at least one of the plurality of parities terminates after storage in the backup storage device of least one other of the plurality of parities begins.

Also provided, in accordance with at least one embodiment of the present invention, is a computer storage management method for managing a first plurality of computer storage units operative to store data each including at least a second plurality of corresponding data portions, the method comprising managing a stream of operations including writing operations and asynchronously computing at least one parity including, responsive to occurrence of at least one write operation in which an incoming value is to be written into a location in an individual computer storage unit from among the computer storage units, depositing the incoming value in the individual storage unit, thereby defining an individual data portion stored therewithin, and in a pre-parity storage area, and computing and storing a parity combining the incoming value with the values of those data portions, in the computer storage units other than the individual computer storage unit, which correspond to the individual data portion; and recovering lost data including determining whether at least one parity of at least one data portion within the lost data is not current and, for at least one non-current parity, using information stored in the pre-parity storage area to generate, after the lost data has been lost, a current parity to replace the non-current parity and using the current parity to recover the lost data.

Yet further provided, in accordance with at least one embodiment of the present invention, is a computer program product, comprising a computer usable medium having a computer readable program code embodied therein, the computer readable program code adapted to be executed to implement a computer storage management method for managing a first plurality of computer storage units operative to store data each including at least a second plurality of corresponding data portions, the method comprising managing a stream of operations including writing operations and asynchronously computing at least one parity including, responsive to occurrence of at least one write operation in which an incoming value is to be written into an individual computer storage unit from among the computer storage units, depositing the incoming value in the individual storage unit, thereby to define an individual data portion stored therewithin, and in a pre-parity storage area, and computing and storing a parity combining the incoming value with the values of those data portions, in the computer storage units other than the individual computer storage unit, which correspond to the individual data portion; and recovering lost data including determining whether at least one parity of at least one data portion within the lost data is not current and, for at least one non-current parity, using information stored in the pre-parity storage area to generate, after the lost data has been lost, a current parity to replace the non-current parity and using the current parity to recover the lost data.

Further, in accordance with at least one embodiment of the present invention, the system also comprises a UPS for use during shutdown whose size is determined by the maximal amount of pending writes to backup.

Further in accordance with at least one embodiment of the present invention, for at least one write operation an old value is replaced with a new value, the old value is stored in O and is redundant by the parity and remaining parity members and at least two copies of the new value are stored in S and in N respectively.

Still further in accordance with at least one embodiment of the present invention, the pre-parity storage area is located in a solid state storage device.

Optionally, destaging of data from the temporary buffer to the backup is delayed so as to reach a point at which parity can be computed, at which point parity computation and destaging are effected generally simultaneously. A particular advantage of this embodiment is that presence of the parity value obviates the need for a second copy of the data for recovery purposes; hence the second copy can be relegated to slow backup space so as to release fast backup space for other purposes.

Further in accordance with at least one embodiment of the present invention, the asynchronous parity computation manager is operative to move at least one incoming value from the pre-parity storage area to non-volatile storage at least when the parity value associated with the incoming value is computed according to a parity-RAID scheme.

Still further in accordance with at least one embodiment of the present invention, the asynchronous parity computation manager is operative to store a parity value computed for the incoming value to non-volatile storage at least when the parity value is computed according to a parity-RAID scheme.

Additionally in accordance with at least one embodiment of the present invention, the asynchronous parity computation manager is operative to store a parity value computed for at least one incoming value to non-volatile storage when a sequence of already computed parities, having a pre-defined length, has accumulated.

Also in accordance with at least one embodiment of the present invention, the asynchronous parity computation manager is operative to store a parity value computed for at least one incoming value to non-volatile storage at least when a predetermined high water mark of the accumulated computed parities in the plurality of storage units has been reached.

Further in accordance with at least one embodiment of the present invention, the asynchronous parity computation manager is operative to store a parity value computed for at least one incoming value to non-volatile storage each time a set of computed parities has accumulated in the plurality of storage units which answers to a predetermined criteria for continuousness in a context defined by a storage scheme of the non-volatile storage.

Still further in accordance with at least one embodiment of the present invention, the asynchronous parity computation manager is operative to store a parity value computed for at least one incoming value to non-volatile storage each time a predetermined period of time has elapsed since the parity value was last computed.

Further in accordance with at least one embodiment of the present invention, data is copied from the pre-parity storage to non-volatile storage according to a criterion whereby the data is de-staged substantially immediately.

Still further in accordance with at least one embodiment of the present invention, the criterion also comprises de-staging parity substantially immediately after computation thereof.

Further in accordance with at least one embodiment of the present invention, wherein parity is copied from the plurality of data storage units to non-volatile storage according to a criterion whereby parity is de-staged substantially immediately after the parity has been computed;

Still further in accordance with at least one embodiment of the present invention, the method also comprises acknowledging a write request corresponding to the write operation after the depositing step is performed for the write operation and before the computing and storing step is performed for the write operation.

Further in accordance with at least one embodiment of the present invention, the incoming value is always written to the pre-parity storage area prior to the computing of the parity.

Still further in accordance with at least one embodiment of the present invention, incoming values are de-staged from the pre-parity storage area to non-volatile storage according to a criterion whereby the incoming values are de-staged substantially immediately.

Further in accordance with at least one embodiment of the present invention, during shut-down, at least one data element in the pre-parity storage area which has already been de-staged is not copied into the non-volatile storage area.

Additionally in accordance with at least one embodiment of the present invention, the method also comprises, during normal operation of the first plurality of computer storage units, moving at least one incoming value from the pre-parity storage area to non-volatile storage, and, when booting up the first plurality of computer storage units, copying at least one value stored in the non-volatile storage area to the first plurality of computer storage units and computing and storing a parity therefor.

Also in accordance with at least one embodiment of the present invention, the pre-parity storage area is located in a volatile storage device.

Still further in accordance with at least one embodiment of the present invention, the UPS is large enough to accommodate de-staging time for the maximal amount of pending writes plus writing time for storing data corresponding to the maximal amount of pending writes within the non-volatile storage.

Further in accordance with at least one embodiment of the present invention, the UPS is also large enough to accommodate the maximal amount of data in the pre-parity storage.

Still further in accordance with at least one embodiment of the present invention, the method also comprises increasing frequency of parity computation as availability of storage in the pre-parity storage area decreases.

Additionally in accordance with at least one embodiment of the present invention, the method also comprises increasing frequency of de-staging as availability of storage in the pre-parity storage area decreases.

Still further in accordance with at least one embodiment of the present invention, data is copied from the pre-parity storage to non-volatile storage according to a criterion whereby de-staging of the data is deferred until a threshold related to capacity of UPS is reached.

Additionally in accordance with at least one embodiment of the present invention, data is copied from the pre-parity storage to non-volatile storage according to a criterion whereby the data is de-staged when a predefined amount of sequential data to be de-staged has been accumulated in the pre-parity storage.

Further in accordance with at least one embodiment of the present invention, data is copied from the pre-parity storage to non-volatile storage according to a criterion whereby data which has not been accessed for a predetermined period of time is de-staged.

Still further in accordance with at least one embodiment of the present invention, data is copied from the pre-parity storage to non-volatile storage according to a criterion whereby data is de-staged when there are no processes associated with the storage system which compete with de-staging of the data for common system resources.

Additionally in accordance with at least one embodiment of the present invention, data is copied from the pre-parity storage to non-volatile storage according to a criterion whereby the data is de-staged as soon as parity computations therefor have been completed.

Still further in accordance with at least one embodiment of the present invention, parity is copied from the plurality of data storage units to non-volatile storage according to a criterion whereby de-staging of the parity is deferred until a threshold related to capacity of UPS is reached.

Still further in accordance with at least one embodiment of the present invention, parity is copied from the plurality of data storage units to non-volatile storage according to a criterion whereby parity is de-staged when a predefined amount of sequential parity values to be de-staged have accumulated in the plurality of data storage units.

Further in accordance with at least one embodiment of the present invention, parity is copied from the plurality of data storage units to non-volatile storage according to a criterion whereby parity which has not been accessed for a predetermined period of time is de-staged.

Still further in accordance with at least one embodiment of the present invention, parity is copied from the plurality of data storage units to non-volatile storage according to a criterion whereby parity is de-staged when there are no processes associated with the storage system which compete with de-staging of the parity for common system resources.

Further in accordance with at least one embodiment of the present invention, incoming values are de-staged from the pre-parity storage area to non-volatile storage according to a criterion whereby defer de-staging of the incoming values until a threshold related to capacity of UPS is reached.

Additionally in accordance with at least one embodiment of the present invention, incoming values are de-staged from the pre-parity storage area to non-volatile storage according to a criterion whereby the incoming values are de-staged when a predefined amount of sequential data to be de-staged has accumulated in the pre-parity storage.

Still further in accordance with at least one embodiment of the present invention, incoming values are de-staged from the pre-parity storage area to non-volatile storage according to a criterion whereby incoming values which has not been accessed for a predetermined period of time are de-staged.

Additionally in accordance with at least one embodiment of the present invention, incoming values are de-staged from the pre-parity storage area to non-volatile storage according to a criterion whereby incoming values are de-staged when there are no processes associated with the storage system which compete with de-staging of the incoming values for common system resources.

Further in accordance with at least one embodiment of the present invention, incoming values are de-staged from the pre-parity storage area to non-volatile storage according to a criterion whereby incoming values are de-staged as soon as parity computations therefor have been completed.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term “process” as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "computing", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

The following terms may be construed either in accordance with any definition thereof appearing in the prior art literature or in accordance with the specification, or as follows:

Asynchronous: Not occurring at the same time. The term "asynchronous" is used herein to refer to computing parity at a time other than, typically later than, the time at which other components of a write operation, such as depositing an incoming value in storage, are performed. Typically, "asychronous" computation of parity includes temporarily storing pre-parity computed data at least until parity computation has been performed thereupon. "Asynchronous RAID" refers to RAID computations or storage systems in which parity is computed asynchronously.

Parity-based RAID scheme: A storage management scheme which achieves redundancy by computing at least one parity value, e.g. RAID-3, RAID-4, RAID-5 or RAID-6.

Storage: Any technology for storing data such as but not limited to volatile or non-volatile storage technologies.

Volatile-memory storage: Any technology for storing data whose storage capabilities depend upon sustained power such as but not limited to random-access memory (RAM), dynamic random-access memory (DRAM), static random-access memory (SRAM), Extended Data Out DRAM (EDO DRAM), Fast Page Mode DRAM, dual in-line memory module (DIMM) including volatile memory integrated circuits of various types, small outline dual in-line memory module (SO-DIMM) including volatile memory integrated circuits of various types, MicroDIMM including volatile memory integrated circuits of various types, single in-line memory module (SIMM) including volatile memory integrated circuits of various types, and including collections of any of the above and various combinations thereof, integrated via a common circuit board, and/or integrated via any type of computer system including any type of server, such as a blade server, for example.

Non-volatile storage: Any technology for storing data capable of storing data independent of sustained external power such as but not limited to a hard disk drive (HDD), FLASH memory or FLASH drives, Electrically Erasable Programmable Read-Only Memory (EEPROM), battery backed DRAM or SRAM, Solid-State Drive (SSD), CDROM, DVD, BluRay Disk, and Tape.

I/O command: a command to input or output data including but not limited to a read command, a write command, a SCSI protocol verify command and a SCSI protocol write-and-verify command.

Chunk: a unit of data e.g. data which is handled, e.g. written, as a unit.

Slot: A portion of a storage unit large enough to accommodate a chunk. Each slot may for example comprise one or many memory cells.

Staging: storing data into temporary storage, and processing the data before copying or moving it to other more permanent storage.

Destaging: copying data from a first memory to a second memory for the purpose of freeing space on the first memory. Typically, but not necessarily, the first memory comprises a crucial storage resource and the second memory comprises a substantially permanent backup storage.

BRIEF DESCRIPTION OF THE DRAWINGS

Certain embodiments of the present invention are illustrated in the following drawings:

FIG. 11C is a single table which is an alternative to the tables of FIGS. 11A-11B in which all data stored in the O-occupancy table of FIG. 11A and in the N-occupancy table of FIG. 11B are stored in a single table.

FIG. 11D is a single table which is a variation of the table of FIG. 11C in which O and N are of the same size and structure and both serve a single S. In this embodiment, slots with the same index in N and O may serve the same slot in S. Slots that are not in use may store a NULL pointer.

FIG. 28A is a simplified flowchart illustration of an embodiment of the present invention which is an alternative to the shutting down method of FIG. 6.

FIG. 28B is a simplified flowchart illustration of an embodiment of the present invention which is an alternative to the booting up method of FIG. 7.

DETAILED DESCRIPTION OF CERTAIN EMBODIMENTS

Figure 1A:
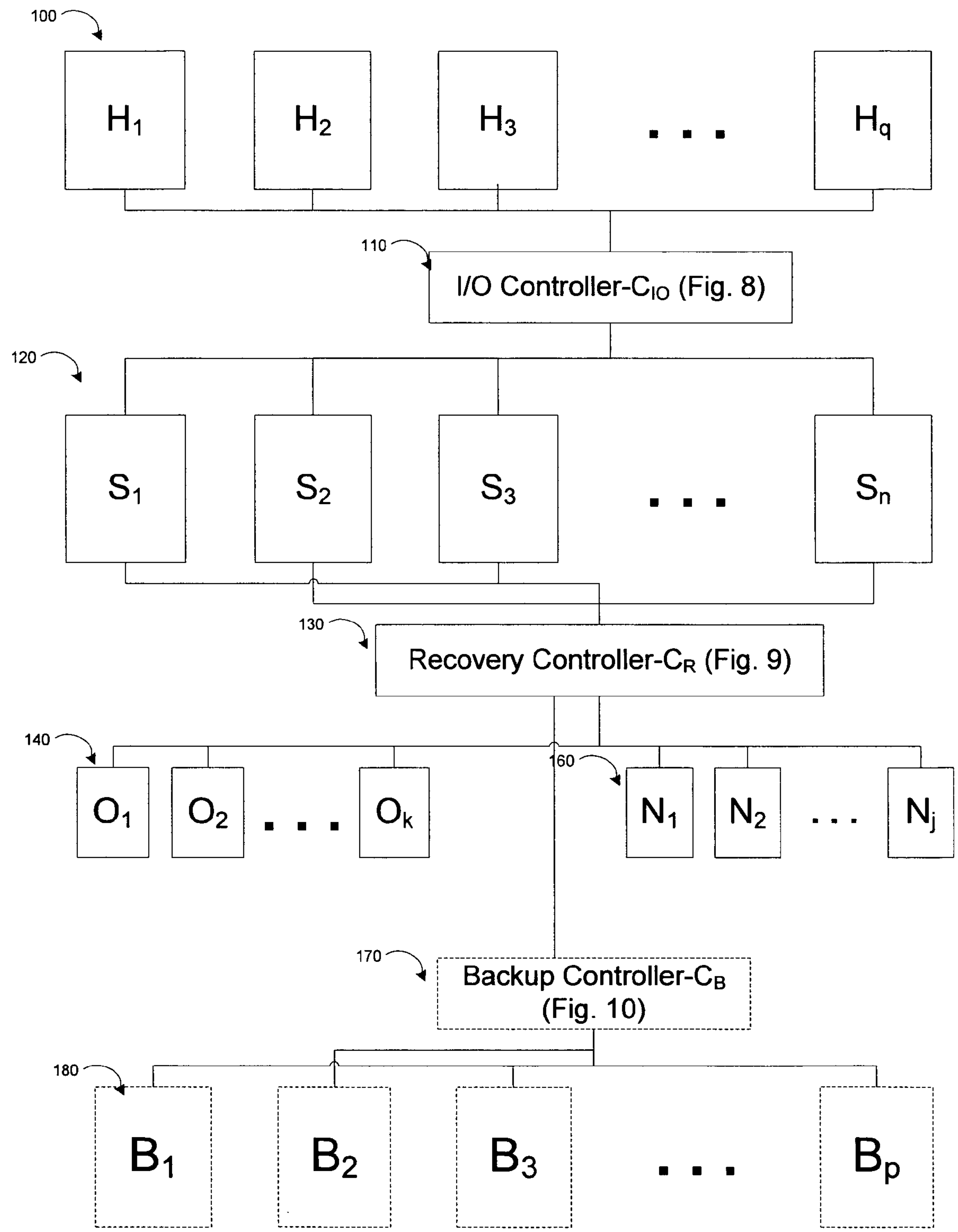
FIG. 1A is a simplified functional block diagram of a computer storage management system.

FIG. 1A is a simplified functional block diagram of a computer storage management system for managing a first plurality of computer storage units operative to store data each including at least a second plurality of corresponding data portions, the system comprising a pre-parity storage area; a parity RAID writing and asynchronous parity computation manager operative to manage a stream of writing operations and to asynchronously compute at least one parity, including, upon occurrence of at least one write operation in which an incoming value is to be written into an individual computer storage unit from among the computer storage units, depositing the incoming value in the individual storage unit, thereby to define an individual data portion stored therewithin, and in the pre-parity storage area and computing and storing a parity combining the incoming value with the values of those data portions, in the computer storage units other than the individual computer storage unit, which correspond to the individual data portion. Also provided is a post-loss parity computing data recovery manager operative to recover lost data including determining whether at least one parity of at least one data portion within the lost data is not current and, for at least one non-current parity, using information stored in the pre-parity storage area to generate, after the lost data has been lost, a current parity to replace the non-current parity and using the current parity to recover the lost data.

H are hosts such as computers, servers, storage or memory devices which may or may not be stand-alone or any other devices serving, inter alia, as I/O interfaces operative to read and write data. The 3 controllers can reside in a single controlling device or may be provided as separate entities. $S_1 \ldots S_n$ are main storage devices such as but not limited to hard drives, computer memories or USB memory sticks, arranged in one or more RAID groups each operating in accordance with a parity-based RAID or other parity-based redundancy scheme such as, but not limited to RAID 3, 4, 5 or 6 or any combinations or known modifications thereof. $N_1, \ldots N_j$ and $O_1$, $O_k$ are temporary storage units for storing "new" and "old" values respectively, as described in detail below, Optionally, a power failure backup array comprising typically non-volatile storage devices $B_1, \ldots B_p$ is provided; alternatively a system may be provided that fails in the event of power failure. In such a case a UPS (not shown) may be provided as well.

Figure 1B:
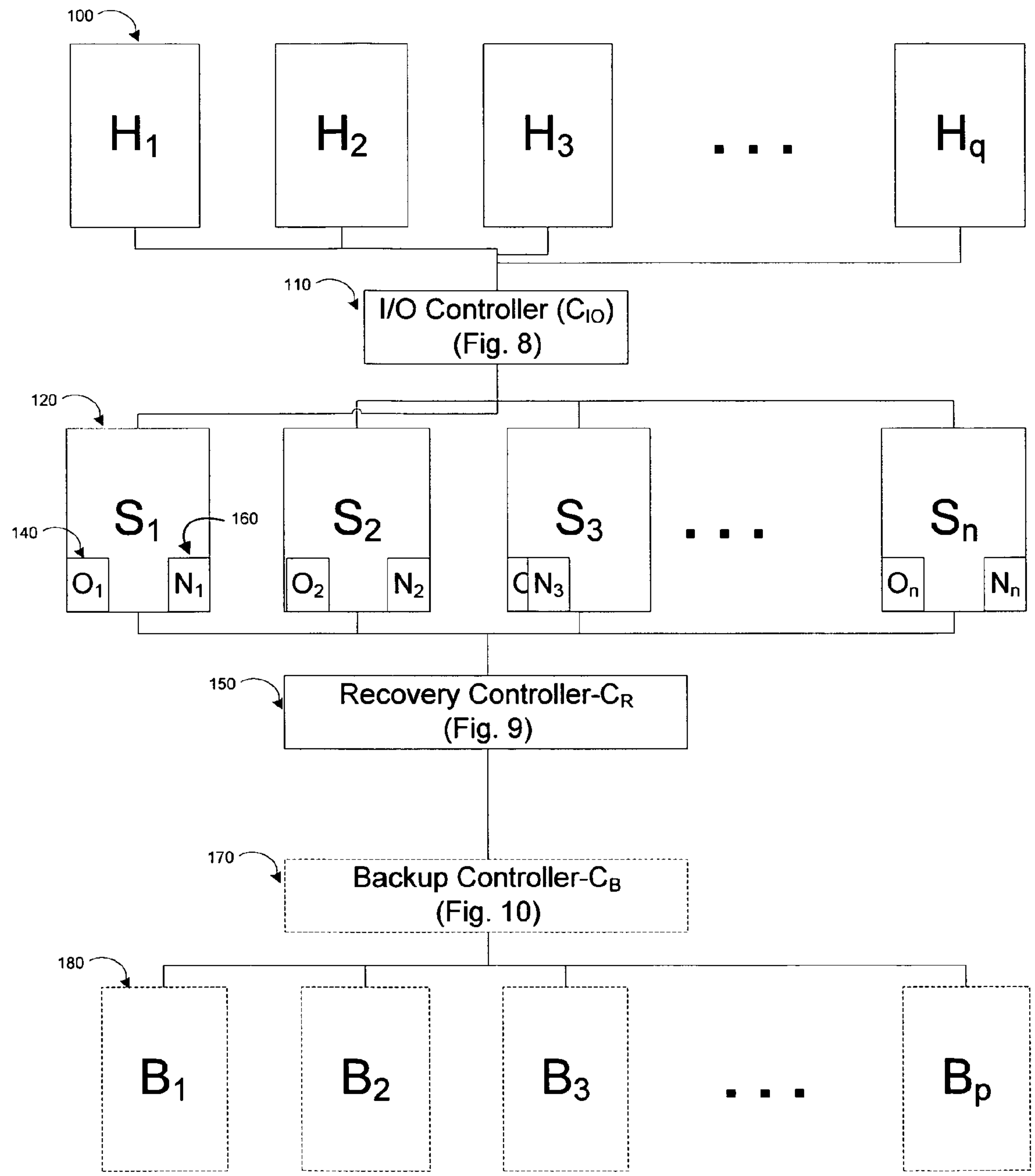
FIG. 1B is a simplified functional block diagram of a computer storage management system which is a variation on the system of FIG. 1A in that rather than the N and O storage devices being separate devices, the same storage device is divided into 3 portions S, N and O where N and O serve an S device other than that in which they themselves reside.

Alternatively, as shown in FIG. 1B, the N and O storage devices are not separate devices as shown in FIG. 1A. Instead, each S device includes two memory portions N and O which serve an S device other than that in which they themselves reside such that failure in a particular S device such as $S_7$ can be overcome since the N and O memory portions serving $S_7$ do not reside in $S_7$. Each memory portion N or O includes "slots" (each of which may comprise one or more memory slots) which are each large enough to accommodate a chunk.

In FIG. 1A, given an array oft primary storage devices S serving an array of q hosts and backed up by an array of p backup storage devices, k and j are parameters which are selected; typically, k=j=t. In FIGS. 1A and 1B, given an array of t primary storage devices S serving an array of q hosts and backed up by an array of p backup storage devices, the size of each O and N and S array is also a parameter which is selected, typically based on the following design criteria:

a. Expected average I/O rate b. Expected proportion of writes in the total I/O rate c. UPS capacity vs. speed of writes from the N and O devices to backup storage.

According to certain embodiments of the present invention, k=j=t=32. S may comprise a solid state storage module of size 100 Gigabyte, the O and N storage modules may be of size 2 Gigabyte and the backup B may comprise a non-volatile HDD of size 140 Gigabyte.

Figure 2:
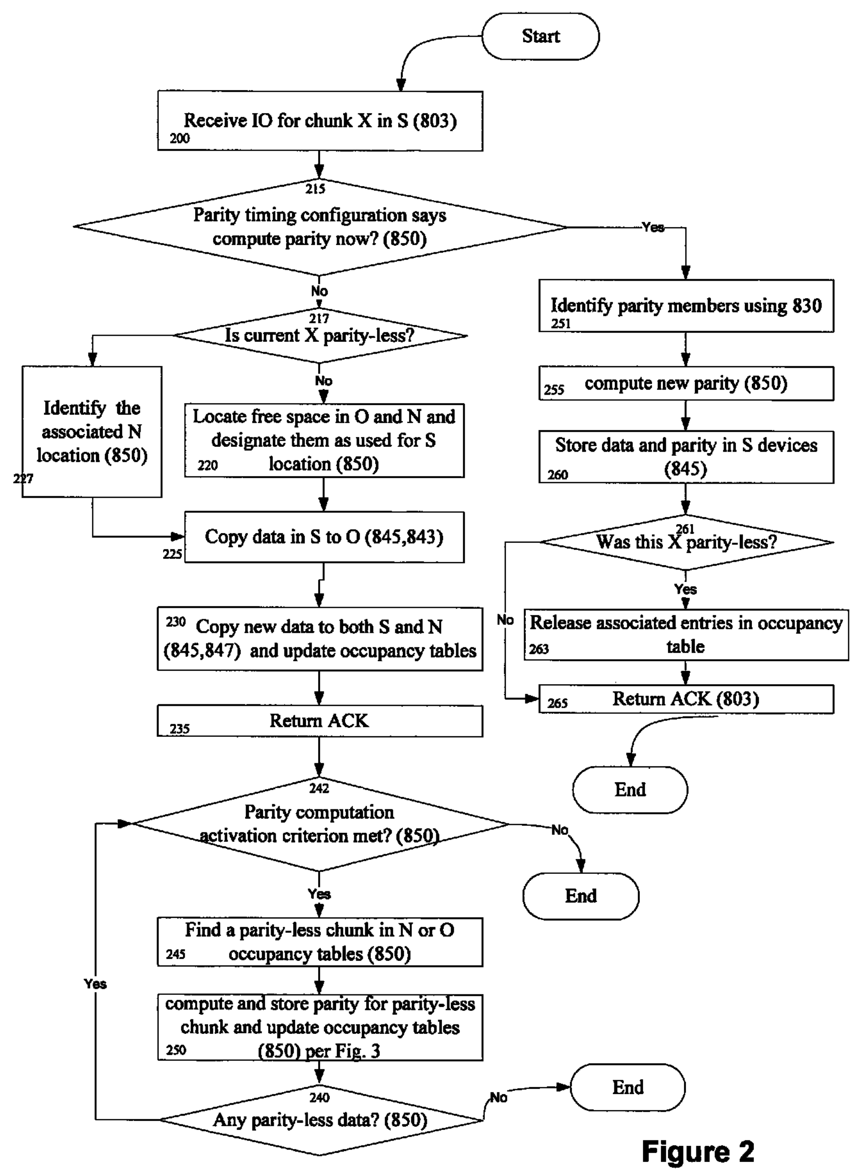
FIG. 2 is a simplified flowchart illustration of a first method for writing into the storage devices S of FIG. 1A or 1B, in accordance with certain embodiments of the present invention.

Reference is now made to FIG. 2 which is a simplified flowchart illustration of a first method for writing into the storage devices S of FIG. 1A or 1B, in accordance with certain embodiments of the present invention. The method of FIG. 2 typically comprises some or all of the following steps, suitably ordered e.g. as shown. Typically, I/O controller 110 receives an I/O write command from one of the H devices instructing the I/O controller to write a certain chunk of data in an individual slot within an individual device in the S array, say slot 15 in $S_7$. Alternatively, the I/O write command may involve several chunks of data to be written into several corresponding slots in $S_7$ or in one or more other devices, in which case the example worked through herewithin would be expanded accordingly. According to one embodiment, there are two selectable modes, one of which computes parity as part of the I/O write operation and the other of which does not; the parity computation is, instead performed after the I/O write operation has been completed and acknowledged, e.g. during subsequent idle times of the I/O controller. Alternatively, only one or the other of these two options may be provided, and not both.

In step 215, the two modes are selected. Regarding step 215 and indeed corresponding steps in other flowchart illustrations provided herein, it is appreciated that the decision to compute the RAID parity "now" can be static, where the entire system is predefined as doing RAID computation now and never asynchronously. Alternatively, this decision may be made dynamically. The dynamic decision may be based on an external configuration change by the user, and/or upon detecting low utilization of the system which allows the system to engage with lengthy computations related to parity. If the decision is made dynamically the flow typically checks, after or even before the RAID computation whether the chunk is parity-less. If so, then after the computation the old and new entries are released and the occupancy table is cleared.

Figure 8:
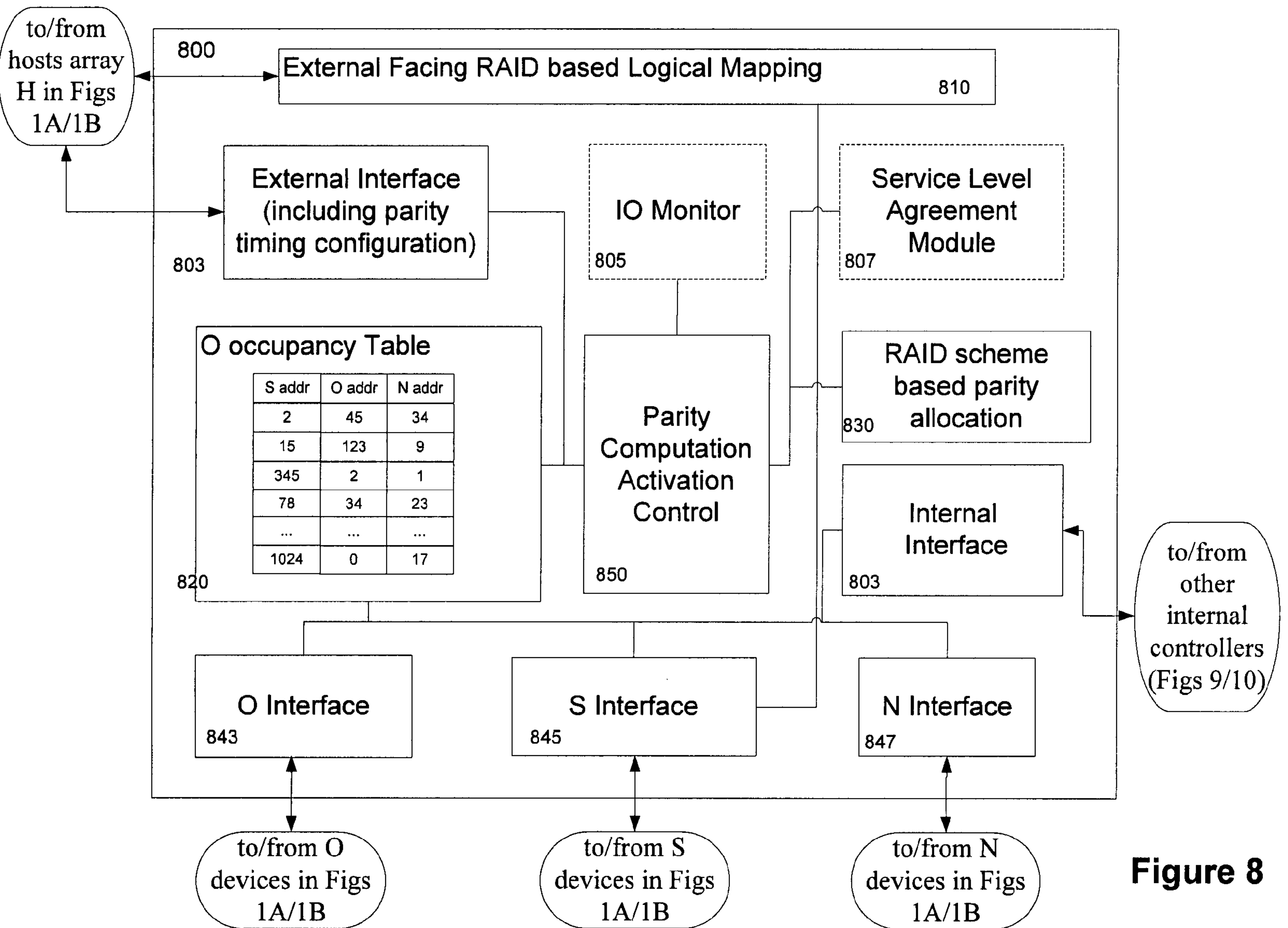
FIG. 8 is a simplified functional block diagram illustration of the I/O controller of FIGS. 1A-1B, in accordance with certain embodiments of the present invention.

In step 251, the parity members of slot 15 in $S_7$ are identified, using RAID scheme based parity allocation table 830 of FIG. 8. For example, the parity members might include slots 15 in each of the devices belonging to the same RAID group as slot 15 of $S_7$ does, which in the illustrated example might include devices $S_5, \ldots S_{13}$ which operate in accordance with a RAID-6 scheme (slots 15 of $S_5$ and $S_{12}$ being allocated to hold the parity value of the data chunks residing in slots 15 of the remaining devices $S_6, \ldots S_{11}$ and $S_{13}$). In step 255, a new parity is computed for the new chunk allocated to slot 15 of $S_7$ and the existing chunks residing in slots 15 of $S_6$, $S_8 \ldots S_{11}$ and $S_{13}$. In step 260, the new chunk is stored in $S_7$, slot 15 and the new parity value is stored in slots 15 of $S_5$ and $S_{12}$. In step 261 the system checks if the previous value was parity-less, if so then in step 263 the slots in N and O related to the previous value are released and the occupancy table is updated accordingly. An acknowledgement signal is returned to the H device which originated the I/O write command (step 265).

Figure 11A:
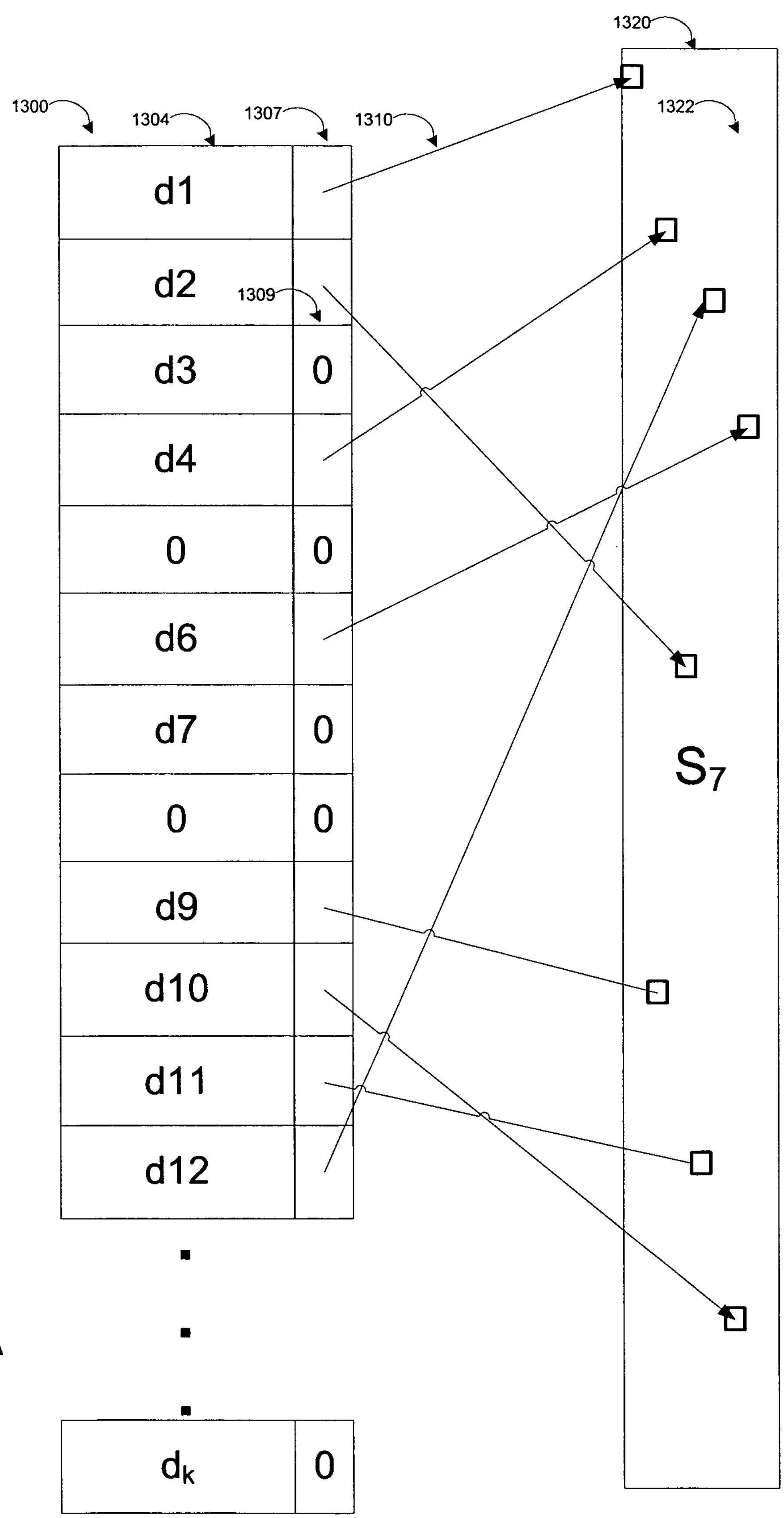
FIG. 11A is an O-occupancy table indicating which slots in an O memory portion serving a particular S device such as S7, currently store a chunk.
Figure 11B:
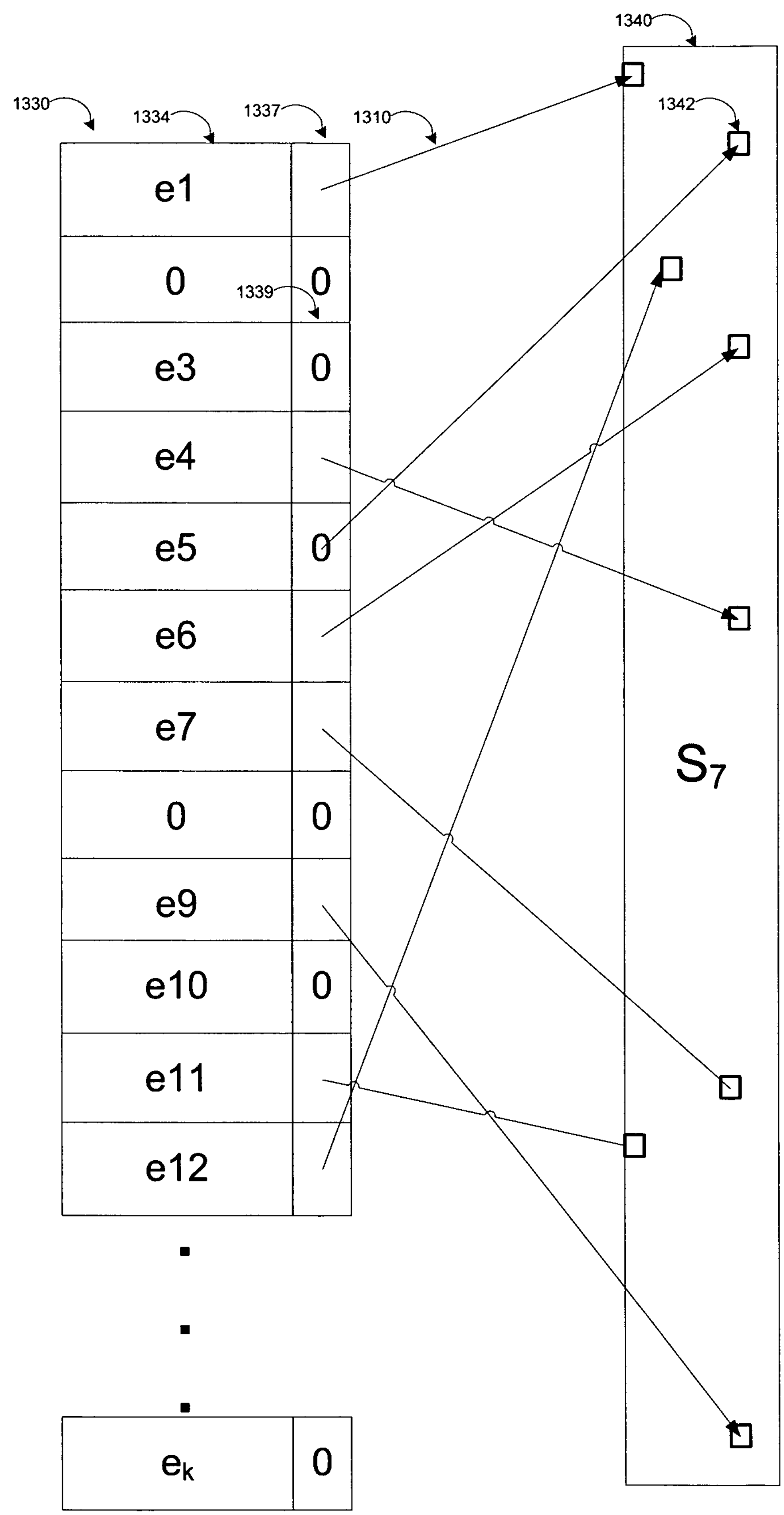
FIG. 11B is an N-occupancy table indicating which slots in an N memory portion serving a particular S device such as S7, currently store a chunk.

If the late-parity computing mode is employed, then if the new chunk is parity-less (step 217), identify (step 227) the N-location associated therewith, using the occupancy table/s, and skip to step 230. Otherwise, the existing data in $S_7$, slot 15 is copied to a free space in array O (steps 220 and 225). The incoming chunk, also termed herein "new data", is copied to a free space in array N and to $S_7$, slot 15 (steps 220 and 230). One or more occupancy tables, described in detail below with reference to FIGS. 11A-11C, are now updated to reflect the location of the new incoming chunk, which is currently a parity-less chunk, if any, in the S, N and O devices. These locations are typically off-limits and are not deemed free space by step 220. An acknowledgement signal is returned to the H device which originated the I/O write command (step 235).

In step 242, a pre-defined binary criterion which triggers actuation of the parity computation operation which still has not been performed, is checked to see whether or not the criterion has a true value. If the parity computation actuation criterion is true, the method finds the parity-less chunk in the N or O devices, using the occupancy tables (step 245), computes its parity, stores the parity value in the appropriate location, as dictated by the RAID scheme, in the S device and updates the occupancy table/s to indicate that the appropriate formerly parity-less chunk now has parity. The location of the formerly parity-less chunk is therefore no longer off-limits and may be deemed free space by step 220. In step 255, the method checks the occupancy tables to determine whether there is any more parity-less data in the S devices. If not, the method terminates. While there is parity-less data and while the parity computation activation criterion remains true, the method continues to compute parity.

If a RAID-6-like scheme is used, in which two parity values are computed, typically, both of these values are computed in step 250 even if the parity computation activation criterion turns false in the meantime. Alternatively, the parity computation activation criterion may be checked after the first of the parity values is computed and if it has turned false, the second parity value is not computed; instead, a special notation in the occupancy tables indicates that only one of the parity values has been computed.

The Parity computation activation Criterion may for example comprise the following:

If any individual one of the O/N storage units is occupied over an application-specific percentage, such as perhaps 80%, set criterion=true, to free space in the O or N units, and in step 245, select one of the chunks in the, or one of the, overly occupied O or N storage units. Otherwise, If the I/O rate is below an application-specific threshold number of I/Os per unit time, such as 10 I/Os per second, over a predetermined window of time such as 1 sec, set criterion=true. Otherwise, If the I/O controller 110 is idle, set criterion=true. Otherwise, If an overriding or manual request can be accommodated, and was indeed received, to finish all parity computation by a given deadline, set criterion=true. Otherwise, If the service level agreement allows I/Os to be postponed, set criterion=true. Otherwise, If the total number, or percentage, of parity-less chunks is over an application specific limit L, set criterion=true.

In the embodiment of FIG. 2, the occupancy tables of FIGS. 11A-11B are initially null, indicating that parity has been computed, and are only updated in those relatively rare instances in which parity has not yet been computed; therefore, for example, step 255 does not require an update of the occupancy tables. However, it is appreciated that alternatively, the tables may be updated when parity has been computed, and not when it has yet to be computed, or the tables may be updated both when parity has been computed and when parity has yet to be computed.

Figure 3:
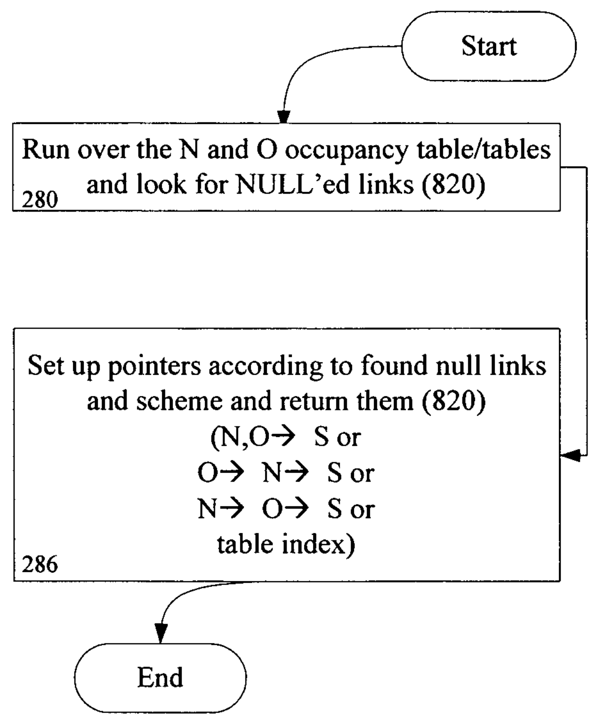
FIG. 3 is a simplified flowchart illustration of a method for performing the free space location step of FIG. 2 in accordance with certain embodiments of the present invention.

FIG. 3 is a simplified flowchart illustration of a method for performing the free space location step 220 of FIG. 2 in accordance with certain embodiments of the present invention, the method comprising some or all of the illustrated steps, suitably ordered e.g. as shown. As described, free space is located in storage devices O and N in which to store an additional copy of a chunk being superseded and the superseding chunk, the former in case recovery is required before the new parity value has been computed, and the latter for asynchronous parity computation purposes.

To perform this step, the method runs over the N and O occupancy table or tables and finds at least one null link in each table provided; at least one null link is always present if the parity computation activation criterion used in step 242 of FIG. 2 includes "catching up on" uncomputed parity values each time approaching congestion in the N or O tables is detected. Pointers are then set up to replace the null links, using a predetermined pointing scheme which may be N, O both pointing to S; or O pointing to N and N pointing to S; or N pointing to O and O pointing to S.

Figure 4:
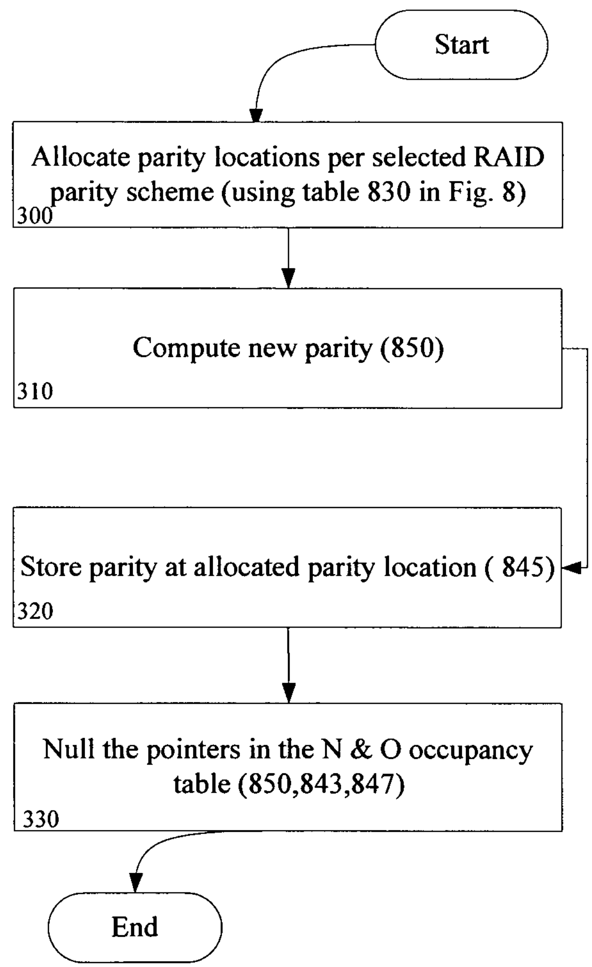
FIG. 4 is a simplified flowchart illustration of a method for performing the parity computation step of FIG. 2 in accordance with certain embodiments of the present invention.

FIG. 4 is a simplified flowchart illustration of a method for performing the parity computation step 250 of FIG. 2 in accordance with certain embodiments of the present invention, the method comprising some or all of the illustrated steps, suitably ordered e.g. as shown.

The methods of FIGS. 2-4 may be performed by the I/O controller 110 of FIGS. 1A-1B; various internal functional units of the controller involved in performing the various steps of the methods of FIGS. 2-4 are indicated in each step in parentheses.

Figure 5:
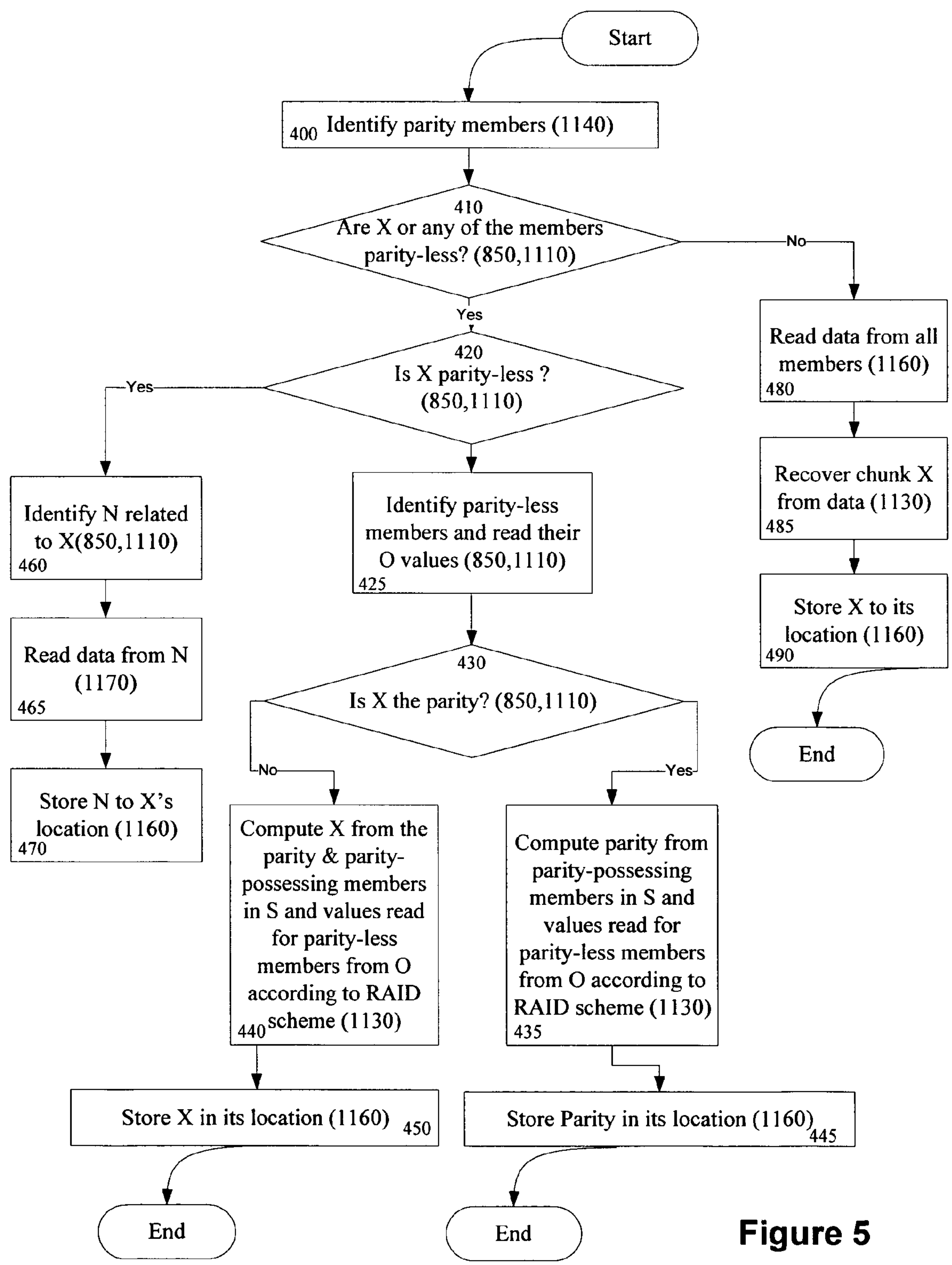
FIG. 5 is a simplified flowchart illustration of a method for recovering data, written in accordance with the method of FIG. 2 into the storage devices S of FIG. 1A or 1B and subsequently lost, all in accordance with certain embodiments of the present invention. The method of FIG. 2 typically comprises some or all of the following steps, suitably ordered e.g. as shown.

Reference is now made to FIG. 5 which is a simplified flowchart illustration of a method for recovering data, written in accordance with the method of FIG. 2 into the storage devices S of FIG. 1A or 1B and subsequently lost, all in accordance with certain embodiments of the present invention. The method of FIG. 5 typically comprises some or all of the following steps, suitably ordered e.g. as shown. In step 400, parity members (also termed herein "RAID members") of the lost chunk, including one parity chunk, are identified using conventional RAID maintenance technology, typically a RAID mapping function mapping each chunk to its parity members. In step 410, the method uses the occupancy table/s to determine whether any of the parity members, including the lost chunk itself, lack a current parity value i.e. whether the current parity value was computed using only current chunks or whether the current parity value was computed using at least one chunk of data which has since been superseded.

If all of the parity members, including the lost chunk itself, have a current parity value (which may be unavailable if the parity chunk is that which was lost) then restoration may comprise conventional RAID restoration as indicated in steps 480, 485 and 490 in FIG. 5. If at least one parity member does not have a current parity value the method determines whether the lost chunk itself is parity-less. If not (e.g. if the lost chunk has a current parity value or the parity chunk is the one which was lost), all parity-less members are identified using the occupancy table and their superseded chunks are read from the appropriate O storage device. If the lost chunk is the parity chunk (step 430), then using the superseded chunks read from O storage, the parity is reconstructed (step 435), even though it is soon to be superseded, and stored (step 445). Alternatively, if all, or a predetermined proportion, of the parity members are parity-less, a new parity value is constructed on the spot (rather than at a later time, and rather than reconstructing the superseded parity value as shown in FIG. 5), and the occupancy tables are updated to reflect this.

If the lost chunk is not parity-less, and is not itself the parity chunk, then superseded chunks for all parity-less members are read from O storage, and the lost chunk is reconstructed using conventional RAID reconstruction technology (step 440) and stored (step 450).

If the lost chunk X is parity-less (step 420), it is retrieved from N-storage (step 465), using the occupancy table/s (step 460) to identify the location in the N-storage corresponding to the location of X in S-storage. The retrieved chunk is then stored in S-storage (step 470).

The method of FIG. 5 may be performed by the recovery controller 130 of FIGS. 1A-1B; various internal functional units of the controller involved in performing the various steps of the method of FIG. 5 are indicated in each step in parentheses.

Figure 6:
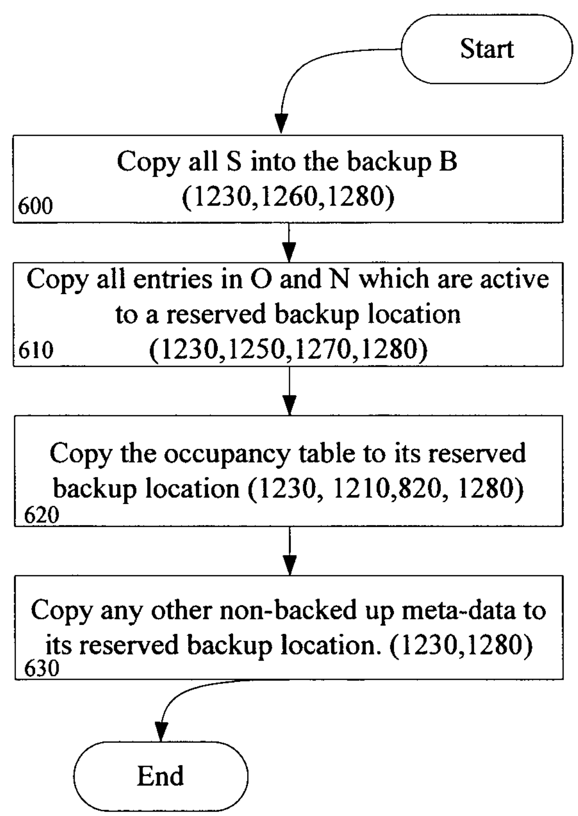
FIG. 6 is a simplified flowchart illustration of a method for shutting down the storage devices S of FIG. 1A or 1B in accordance with certain embodiments of the present invention.

Reference is now made to FIG. 6 which is a simplified flowchart illustration of a method for shutting down the storage devices S of FIG. 1A or 1B in accordance with certain embodiments of the present invention. The method of FIG. 6 typically comprises some or all of the following steps, suitably ordered e.g. as shown. The method of FIG. 6 is suitable for shutting down a storage system such as that shown in FIGS. 1A-1B in which writing takes place according to the methods of FIG. 2 or FIG. 12 and reconstruction takes place in accordance with the method of FIG. 5.

In step 600, all S-storage is copied into backup B. In step 610, all data in O and N which correspond to an active link in the occupancy table/s are copied to a reserved location in the back-up storage B. The occupancy table/s itself or themselves are also copied to a reserved location in the back-up storage B. According to one embodiment of the present invention, the portions of O and N which are copied to retain their original positions within a reserved area in the backup which is equal in size and configuration to the original O and N storage devices and the occupancy table is copied unchanged to the backup. According to another embodiment of the present invention, the portions of O and N which are copied do not retain their original positions within their reserved area in the backup because the reserved area is not necessarily equal in size and configuration to the original O and N storage devices and the occupancy table is updated accordingly as it is copied to backup. Any additional meta-data may also be copied to backup (step 630).

Figure 7:
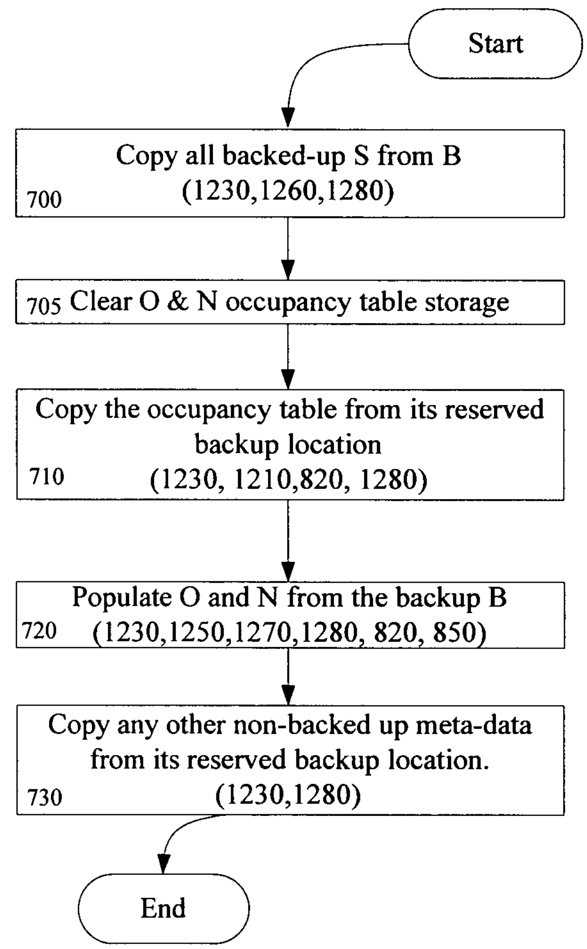
FIG. 7 is a simplified flowchart illustration of a method for booting up the storage devices S of FIG. 1A or 1B in accordance with certain embodiments of the present invention.

Reference is now made to FIG. 7 which is a simplified flowchart illustration of a method for booting up the storage devices of FIG. 1A or 1B in accordance with certain embodiments of the present invention. The method of FIG. 7 typically comprises some or all of the following steps, suitably ordered e.g. as shown. The method of FIG. 7 is suitable for booting up a storage system such as that shown in FIGS. 1A-1B in which writing takes place according to the methods of FIG. 2 or FIG. 12, reconstruction takes place in accordance with the method of FIG. 5 and shut-down takes place in accordance with the method of FIG. 6.

In step 700, all S-storage is copied from backup, back to the S-devices. In step 705, clear the storage area reserved for the occupancy table/s and only then (step 710) copy the occupancy table/s from back-up into the reserved area, which typically is within the S-devices and/or within the N or O devices. In step 720, copy the N and O data from backup to the N and O devices respectively; the method runs over the occupancy table to identify destination and source locations of the N and O data and copies from suitable source locations in backup to suitable destination locations in the N and O devices accordingly. Meta-data, if any, is also restored similarly (step 730).

The methods of FIGS. 6-7 may be performed by the backup controller 170 of FIGS. 1A-1B; various internal functional units of the controller involved in performing the various steps of the methods of FIGS. 6-7 are indicated in each step in parentheses.

FIG. 8 is a simplified functional block diagram illustration of I/O controller 110 of FIGS. 1A-1B. Unit 810, configured either during set-up or on the go, stores a conventional external facing RAID based logical mapping associating each logical unit of data with a physical location within the S devices, based on the particular RAID scheme employed.

Figure 9:
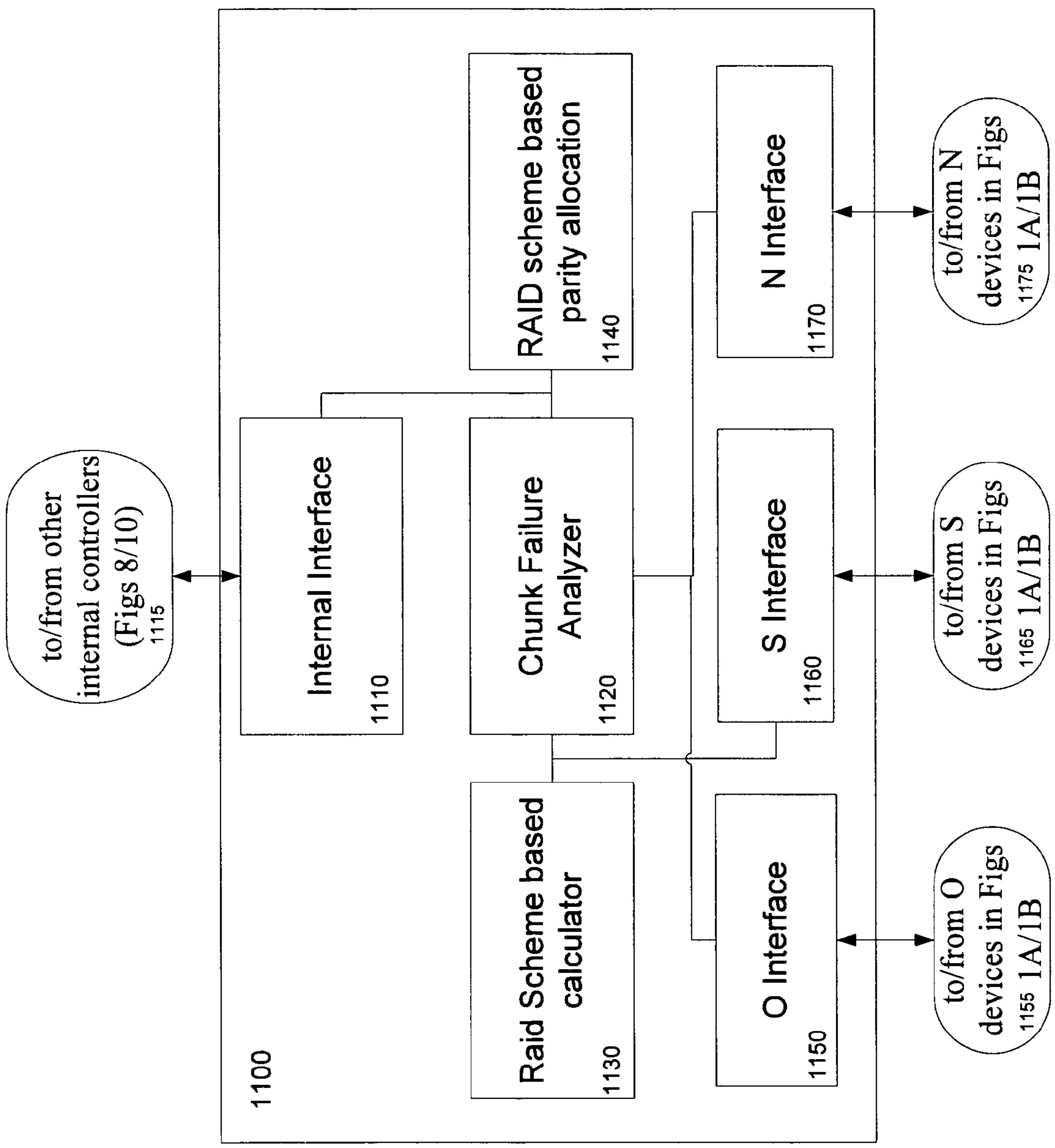
FIG. 9 is a simplified functional block diagram illustration of the recovery controller of FIGS. 1A-1B, in accordance with certain embodiments of the present invention.

FIG. 9 is a simplified generally self-explanatory functional block diagram illustration of the recovery controller of FIGS. 1A-1B, in accordance with certain embodiments of the present invention.

Figure 10:
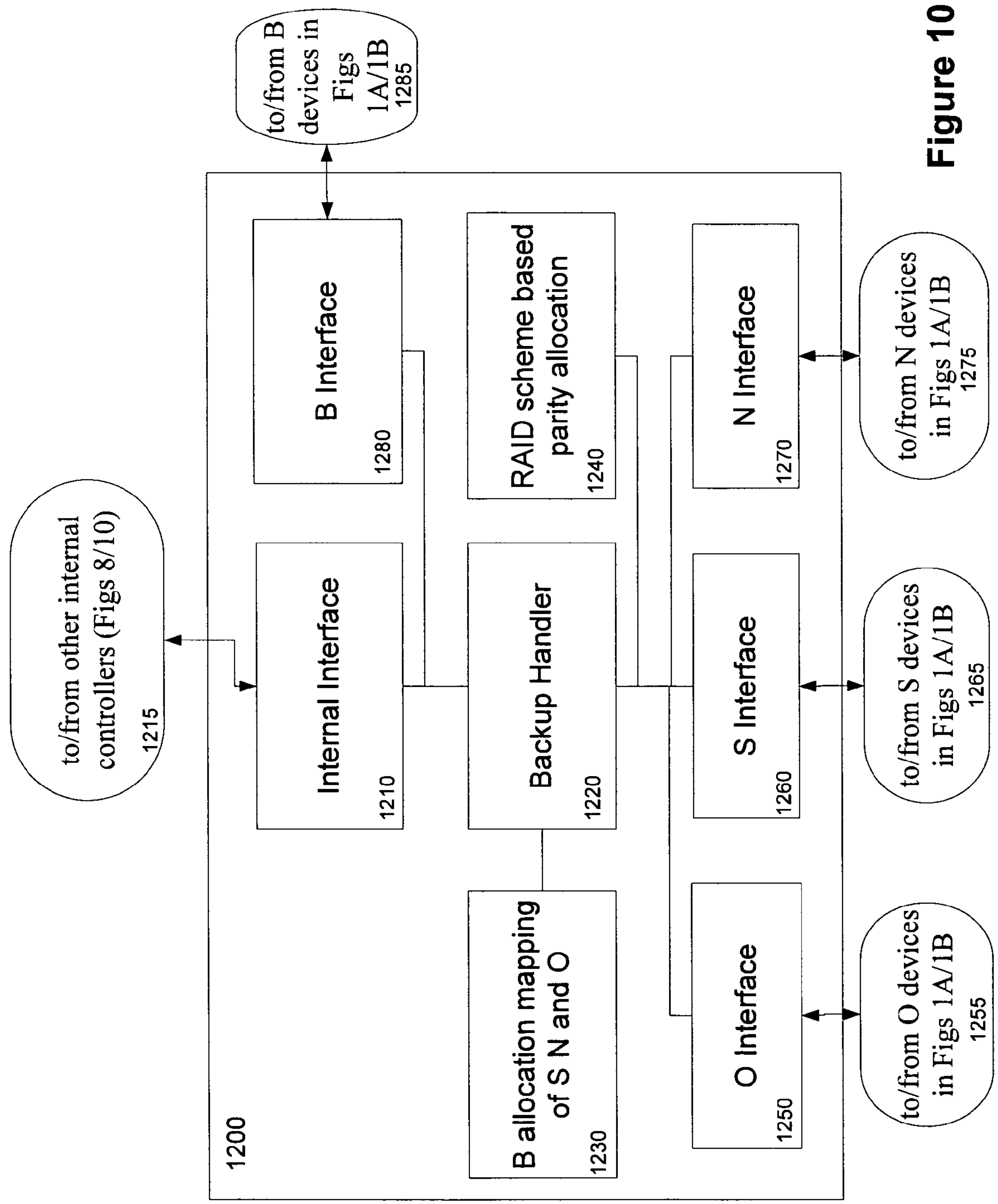
FIG. 10 is a simplified functional block diagram illustration of the backup controller of FIGS. 1A-1B, in accordance with certain embodiments of the present invention.

FIG. 10 is a simplified generally self-explanatory functional block diagram illustration of the backup controller of FIGS. 1A-1B, in accordance with certain embodiments of the present invention.

FIG. 11A is an O-occupancy table indicating which slots in an O memory portion serving a particular S device such as $S_7$ (also shown), store a chunk which is currently parity-less and hence needed. This table may reside as metadata in the O memory portion itself or may reside in the I/O controller or recover controller of FIG. 1. The table includes, for each parity-less chunk in memory portion O, a link or pointer to a slot in the S device being served to which that chunk belongs and includes a null link associated with each slot in memory portion O which is not currently storing any parity-less chunk. A slot in the O-occupancy table which has a null-link, such as the third, fifth, seventh and eighth slots in the illustrated example, is either storing no data at all, i.e. initial null data, such as the seventh and eighth slots in the illustrated example, or is storing obsolete data, i.e. an old chunk superseded by a new chunk for which parity has already been computed asynchronously. A slot which has an active, i.e. valid link, such as all except the third, fifth, seventh and eighth slots in the illustrated example, is needed because it stores an old chunk which has been superseded, in S, by a new incoming chunk, however, it is still needed because if recovery of another chunk which was lost, and whose parity value is common with the old chunk with the active link, is to be successful while the new superseding chunk is still parity-less, the old chunk with the active link is necessary in order to reconstruct the lost chunk using the old parity value and all participating chunks other than that which was lost.

FIG. 11B is an N-occupancy table indicating which slots in an N memory portion serving a particular S device such as $S_7$, currently store a chunk. This table may reside as metadata in the N memory portion itself or may reside in the I/O controller or recover controller of FIG. 1. The table includes, for each chunk in memory portion N, a link to a slot in the S device being served to which that chunk belongs and includes a null link associated with each slot in memory portion O which is not currently storing any parity-less chunk. A slot in the N-occupancy table which has a null-link, is either storing no data at all, i.e. initial null data, or is storing obsolete data for which parity has already been computed asynchronously. A slot which has an active, i.e. valid link, is needed because it stores a new chunk for which parity has yet to be computed.

In FIGS. 11A-11B, the O-occupancy and N-occupancy tables both store links to the S device. Alternatively, and in some applications preferably, the O occupancy table may store a link to the corresponding slot in the N-occupancy table or vice versa.

FIG. 11C is a single table which is an alternative to the tables of FIGS. 11A-11B in which all data stored in the O-occupancy table of FIG. 11A and in the N-occupancy table of FIG. 11B are stored in a single table.

FIG. 11D is a single table which is a variation of the table of FIG. 11C in which O and N are of the same size and structure and both serve a single S. In this embodiment, slots with the same index in N and O may serve the same slot in S. Slots that are not in use may store a NULL pointer.

Figure 11F:
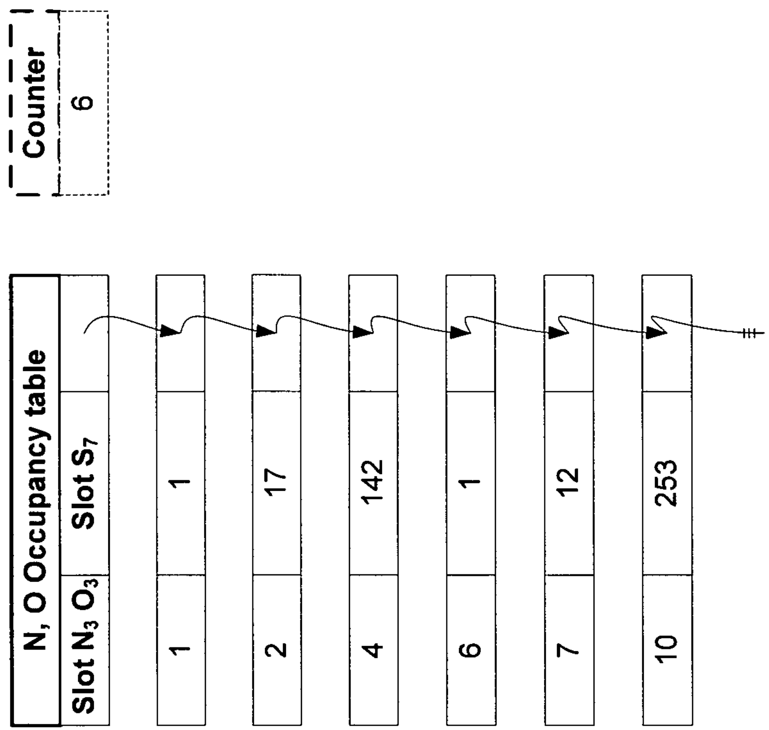
FIG. 11F is a linked list which is a further alternative to the tables of FIGS. 11A-11E which has a structure similar to the structure of FIG. 11E except that the embodiment of FIG. 11F includes a dynamically built linked list in which every entry is associated with a pair of slots in O and N which are indexed the same and which point to a slot in S.
Figure 11E:
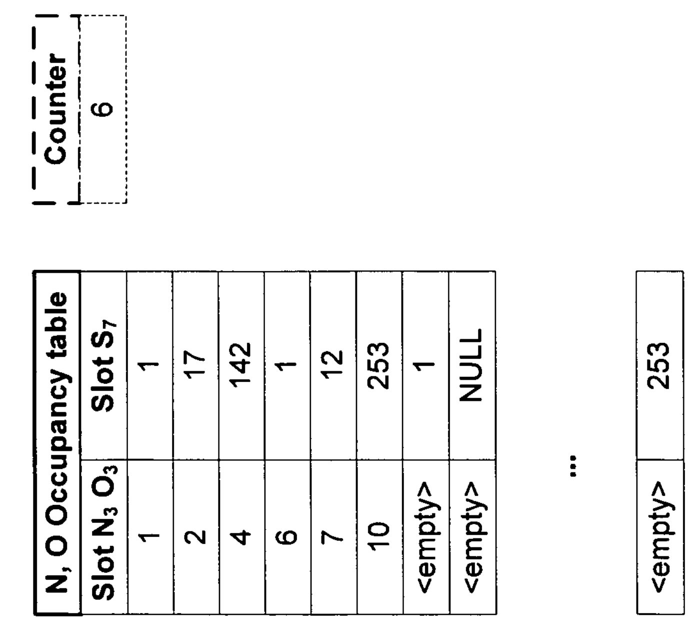
FIG. 11E is a single table which is a further alternative to the tables of FIGS. 11A-11D in which data is added to the table from top to bottom such that from a certain point on, the table may be regarded as empty.

FIG. 11E is a single table which is a further alternative to the tables of FIGS. 11A-11D in which data is added to the table from top to bottom such that from a certain point on, the table may be regarded as empty.

FIG. 11F is a linked list which is a further alternative to the tables of FIGS. 11A-11E which has a structure similar to the structure of FIG. 11E except that the embodiment of FIG. 11F includes a dynamically built linked list in which every entry is associated with a pair of slots in O and N which are indexed the same and which point to a slot in S.

According to still a further embodiment of the present invention, the configuration of FIG. 1B is used, and if a slot in a first S-device is being used to store a parity-less chunk, the parity-less chunk and its predecessor chunk are stored in correspondingly numbered slots in corresponding N and O devices such as, for example, the N and O devices residing in a single, second S device (which is not the same as the first S-device). A particular advantage of this embodiment is that it halves the number of active links which need to be stored, relative to the embodiments of FIGS. 11A-11C.

The embodiments of FIGS. 11A-11B, 11D-11F are suited for implementations in which each S device is served by a single O device and a single N device. A table is typically maintained to store these associations, e.g. that device $S_7$ is served by O1 and N2 whereas device S342 is served by O32 and N9. The embodiment of FIG. 11C is suitable for applications in which a single S device and a plurality of N and O devices are provided, as illustrated; or, a fortiori, for applications in which a single O and one or more N devices serve a single S device.

More generally, many possible implementations of the occupancy table are possible. For example:

Distributed between O and N: O and N storage may hold a link for every slot pointing to either S (this is termed a O,N→S implementation) or to one another (N or O) (this being termed a O→N→S or N→O→S scheme) and a null value for every slot not pointing anywhere, in which case the method runs over O and/or N to find occupancy related data and NULLs are indicative of available slots.

Condensed table where O and N are of the same size and coupled: A single occupancy table may reside in the controller or in the S-devices, the table storing (o-link, N-link, S-link) triples; an advantage of this embodiment is that no nulls need be stored. For example, no nulls need be stored in the S column of the table since a slot in N and O is available if the address of that slot is not in the occupancy table.

Fixed (full length) table where O and N are of the same size and coupled: Particularly although not exclusively for the system of FIG. 1B, O and N may be the same size and an occupancy table may be provided whose length is the number of slots in O and N. When entry j is used, both Nj and Oj serve the S value there whereas when entry j is NULL, both Nj and Oj are available (FIG. 11D). Alternatively, more condensed storage may be provided by retaining (index, S-link) pairs and searching for an index from the available indices that represent the N/O slots. An index that is not present in the table is available. FIG. 11E illustrates an example of such a table. FIG. 11F illustrates a variation in which a dynamic linked list is used.

If the occupancy table comprises two tables distributed between O and N as described above with reference to FIGS. 11A and 11B, a counter is typically maintained, which indicates how many slots of O and N are in use, out of the total number of slots in these storage devices. To add an entry, the following steps may be performed:

i. Run over the N table and find a NULL slot Nx ii. Run over the O table and find a NULL slot Oy iii. Link entries according to scheme iv. Increment counter To find an entry corresponding to slot S, the following steps may be performed:

a. For O,N→S type storage: Run over N and O and find a pointer valued S b. For O→N→S type storage: Run over N and find a pointer valued S, Run over O and find a pointer valued N c. For N→O→S type storage, Run over O and find a pointer valued S, Run over N and find a pointer valued O To remove an entry, the following steps may be performed:

a. Find the entries and NULL all links b. Decrement counter

In this embodiment, the Occupancy rate is the Count/Total.

If the same O and N are linked and of the same size, couple entries of the same offset may be coupled and cut down in search operations and links since the coupling yields the O←→N linkage even though this is not directly stored.

If a fixed (full-length) table where O and N are of the same size and coupled is employed, e.g. as in FIG. 11D, a counter, for how many slots of O and N are used out of the total, is typically maintained. To add an entry, the following steps may be performed:

i. Run over the table and find a NULL S entry at index j ii. Nj and Oj become the entries and S link is stored in the S location iii. Increment counter To find an entry corresponding to slot S, the following steps may be performed:

a. Run over all entries and look for an entry S with the correct value.

b. Return index k where S is located

To remove an entry, the following steps may be performed:

a. Find the entry in question (by index or by S link) and NULL the S entry b. Decrement counter In this embodiment, as in the previous embodiments, the Occupancy rate is the Count/Total.

If a condensed table where O and N are of the same size and coupled is employed, e.g. as in FIG. 11E, a counter of how many slots of O and N are used out of the total, is typically maintained. To add an entry, the following steps may be performed:

a. Use j=counter+1 which is the next available index b. Increment counter

To find an entry corresponding to slot S, the following steps may be performed:

i. Run over all entries and look for an entry S with the correct value.

ii. Return index k where S is located

To remove an entry, the following steps may be performed:

i. Find the entry in question (by index or by S link) and copy the content of the entry at index "counter" to that location ii. Decrement counter An alternative scheme for a condensed table where O and N are of the same size and coupled is employed in the following:

To add an entry, the following steps may be performed:

i. Use j=counter+1 which is the next available index ii. Locate (according to S) the proper ordered location of the new S value. Assume that that location is before the value in index j.

iii. Move all entries (if any exist) from j through counter to j+1 through counter+1 iv. Increment counter v. Return index j

To find an entry corresponding to slot S, the following steps may be performed:

a. Run a sorted search (such as binary search) over all entries and look for an entry S with the correct value.

b. Return index k where S is located

To remove an entry, the following steps may be performed:

i. Find the entry in question (by index or by S link). Assume that value is j ii. Move all entries (if any exist) from j+1 through counter to j through counter−1 iii. Decrement counter

In this embodiment, as in the previous embodiments, the Occupancy rate is the Count/Total.

The occupancy table/s may be handled as a dynamic list e.g. as shown in FIG. 11F, with pointers, providing either a single link or double link for performance.

Figure 12:
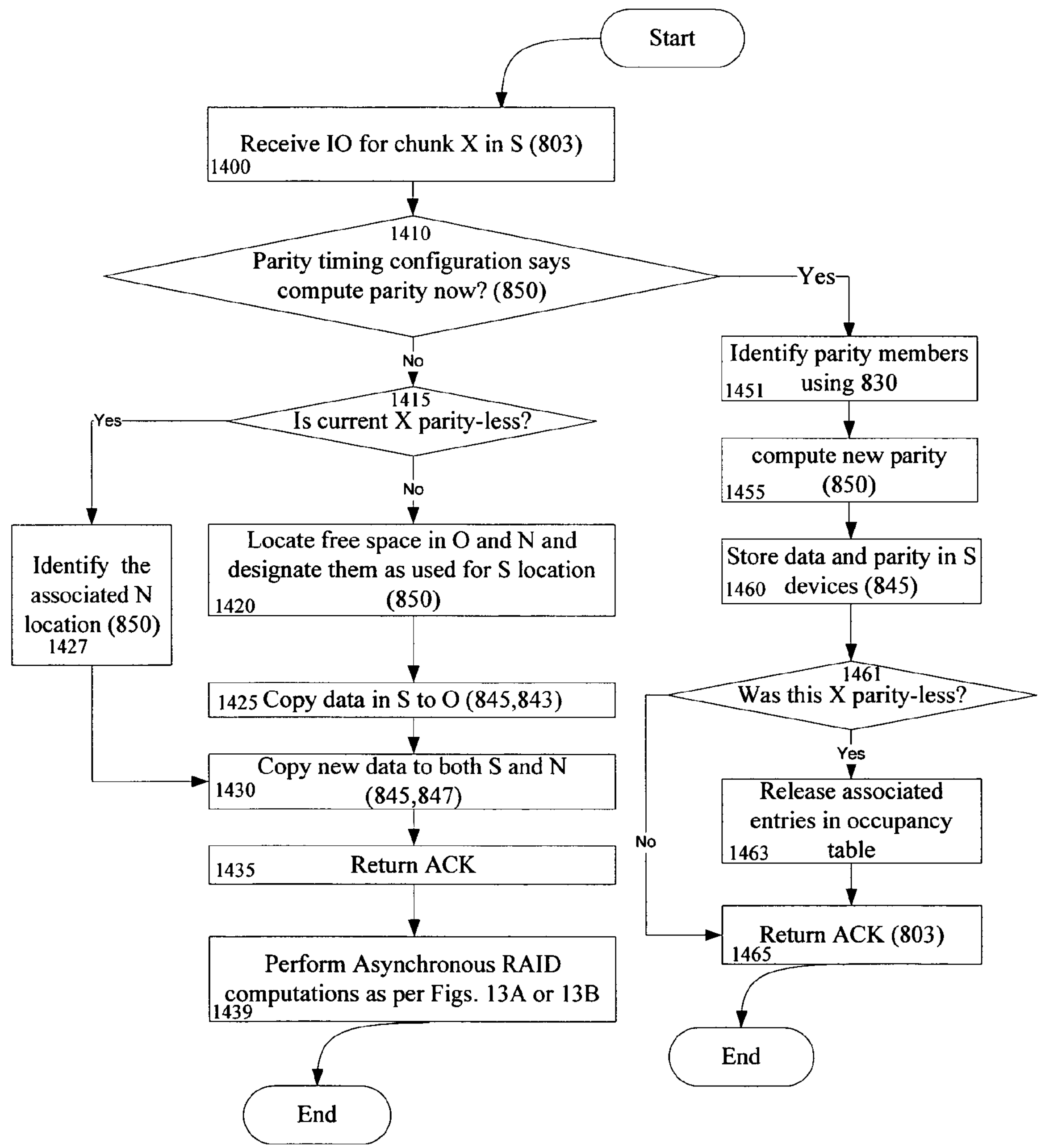
FIG. 12 is a simplified flowchart illustration of a second method for writing into the storage devices S of FIG. 1A or 1B, in accordance with certain embodiments of the present invention.

Reference is now made to FIG. 12 which is a simplified flowchart illustration of a second method for writing into the storage devices S of FIG. 1A or 1B, in accordance with certain embodiments of the present invention. The method of FIG. 12 typically comprises some or all of the following steps, suitably ordered e.g. as shown:

FIG. 12 is a method for writing data into the storage system of FIGS. 1A-1B according to an alternative embodiment of the present invention in which as part of a session in which parity values are updated asynchronously, using new chunks accessed from N-storage, the accessed new chunks are each copied into backup.

I/O controller 110 receives an I/O write command from one of the H devices instructing the I/O controller to write a certain chunk of data in an individual slot within an individual device in the S array, say slot 15 in $S_7$. Alternatively, the I/O write command may involve several chunks of data to be written into several corresponding slots in $S_7$ or in one or more other devices, in which case the example worked through herein would be expanded accordingly.

According to one embodiment, there are two selectable modes, one of which computes parity as part of the I/O write operation and the other of which does not; the parity computation is instead performed after the I/O write operation has been completed and acknowledged, e.g. during subsequent idle times of the I/O controller. Alternatively, only the second of these two options may be provided, rather than both. In step 1410, the two modes are selected between. Suitable criteria by which one or both of the modes may be selected are now described. The dynamic decision may be based on an external configuration change by the user and/or upon detecting low utilization of the system which allows the system to engage with lengthy computations related to parity.

In step 1451, the parity members of slot 15 in $S_7$ are identified, such as perhaps slot 15 in each of the devices belonging to the same RAID group as slot 15 in $S_7$ does. In the illustrated example, the parity members might include devices $S_5, \ldots S_{13}$ which operate in accordance with a RAID-6 scheme, slots 15 of $S_5$ and $S_{12}$ both being allocated to hold the parity value of the data chunks residing in slots 15 of the remaining devices $S_6, \ldots S_{11}$ and $S_{13}$. In step 1455, a new parity is computed for the new chunk allocated to slot 15 of $S_7$ and the existing chunks residing in slots 15 of $S_6, S_8 \ldots S_{11}$ and $S_{13}$. In step 1460, the new chunk is stored in $S_7$, slot 15 and the new parity value is stored in slots 15 of $S_5$ and $S_{12}$. In step 1461 the system checks if the previous value was parity-less, if so then in step 1463 the slots in N and O related to the previous value are released and the occupancy table is updated accordingly. An acknowledgement signal is returned to the H device which originated the I/O write command (step 1465).

If the new chunk is parity-less (step 1415), identify (step 1427) the N-location associated therewith, using the occupancy table/s, and skip to step 1430. Otherwise, if the late-parity computing mode is employed, the existing data in $S_7$, slot 15 is copied to a free space in array O (steps 1420 and 1425). The incoming chunk, also termed herein "new data", is copied to a free space in array N and to $S_7$, slot 15 (steps 1420 and 1430). One or more Occupancy tables, described in detail below with reference to FIGS. 11A-11F, are now updated to reflect the location of the new incoming chunk, which is currently a parity-less chunk, if any, in the S, N and O devices. These locations are typically off-limits and are not deemed free space by step 1420. An acknowledgement signal is returned to the H device which originated the I/O write command (step 1435). Asynchronous RAID computation is now carried out (step 1439) e.g. as described hereinbelow with reference to either FIG. 13A or FIG. 13B.

Figure 13A:
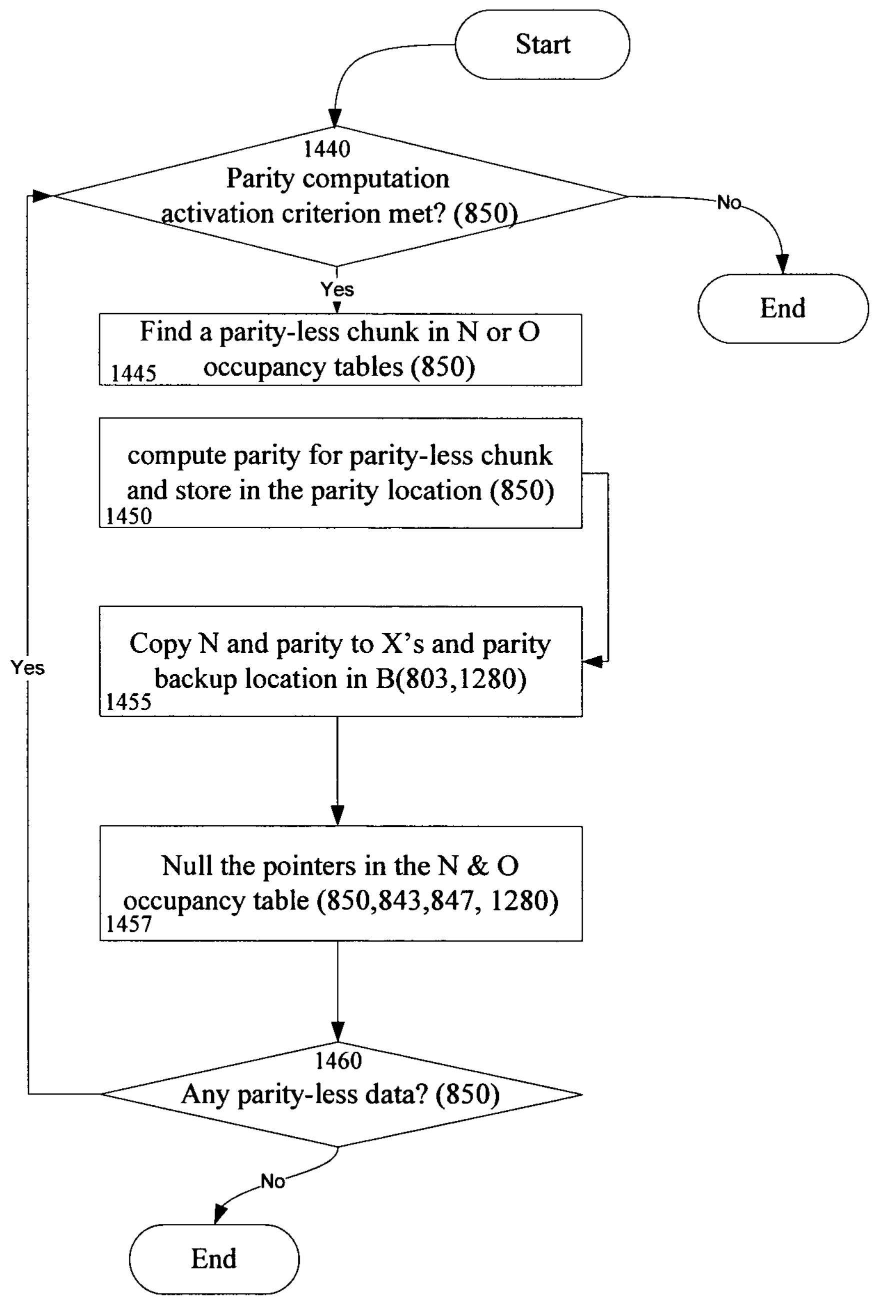
FIG. 13A is a simplified flowchart illustration of a first method for performing the asynchronous RAID computation step of FIG. 12, in accordance with certain embodiments of the present invention.

Reference is now made to FIG. 13A which is a simplified flowchart illustration of a first method for performing the asynchronous RAID computation step 1439 of FIG. 12, in accordance with certain embodiments of the present invention. The method of FIG. 13A typically comprises some or all of the following steps, suitably ordered e.g. as shown:

In step 1440, a pre-defined binary criterion which triggers actuation of the parity computation operation which still has not been performed, is checked to see whether or not the criterion has a true value. If the parity computation actuation criterion is true, the method finds a, or the, parity-less chunk in the N or O devices, using the occupancy tables (step 1445), computes its parity, stores the parity value in the appropriate location, as dictated by the RAID scheme, in the S device and updates the occupancy table/s to indicate that the appropriate formerly parity-less chunk now has parity. The location of the formerly parity-less chunk is therefore no longer off-limits and may be deemed free space by step 1420. In step 1460, the method checks the occupancy tables to determine whether there is any more parity-less data in the S devices. If not, the method terminates. While there is parity-less data and while the parity computation activation criterion remains true, the method continues to compute parity. In addition, in step 1455, the parity-value and the formerly parity-less chunk are both stored in a backup storage area reserved for storing the contents of the S devices during shut-down, thereby to greatly expedite eventual shut-down. The parity-value and the formerly parity-less chunk are respectively stored in suitable locations which may be determined by a mapping table 1230 in backup controller 170 of FIG. 10. At this point the occupancy tables are updated accordingly If a RAID-6-like scheme is used, in which two parity values are computed, typically, both of these values are computed in step 1450 and saved in the S-section of backup in step 1455 even if the parity computation activation criterion turns false in the meantime. Alternatively, the parity computation activation criterion may be checked after the first of the parity values is computed and if it has turned false, the second parity value is not computed; instead, a special notation in the occupancy tables indicates that only one of the parity values has been computed.

The Parity computation activation Criterion may for example comprise the following:

a. If any individual one of the O/N storage units is occupied over an application-specific percentage, such as perhaps 80%, set criterion=true, to free space in the O or N units, and in step 1445, select one of the chunks in the, or one of the, overly occupied O or N storage units. Otherwise, b. If the I/O rate is below an application-specific threshold number of I/Os per unit time, such as 10 I/Os per second, over a predetermined window of time such as 1 sec, set criterion=true. Otherwise, c. If the I/O controller 110 is idle, set criterion=true. Otherwise, d. If an overriding or manual request can be accommodated, and was indeed received, to finish all parity computation by a given deadline, set criterion=true. Otherwise, e. If the service level agreement allows I/Os to be postponed, set criterion=true. Otherwise, f. If the total number, or percentage, of parity-less chunks is over an application specific limit L, set criterion=true.

In the embodiment of FIG. 12, the occupancy tables of FIGS. 11A-11B are initially null, indicating that parity has been computed, and are only updated in those relatively rare instances in which parity has not yet been computed; therefore, for example, step 1440 does not require an update of the occupancy tables. However, it is appreciated that alternatively, the tables may be updated when parity has been computed, and not when it has yet to be computed, or the tables may be updated both when parity has been computed and when parity has yet to be computed.

In FIG. 1A, given an array oft primary storage devices S serving an array of q hosts and backed up by an array of p backup storage devices, k and j are parameters which are selected; typically, k=j=t. In FIGS. 1A and 1B, given an array of t primary storage devices S serving an array of q hosts and backed up by an array of p backup storage devices, the size of each O and N array is also a parameter which is selected, typically based on the following design criteria:

a. Expected average I/O rate b. Expected proportion of writes in the total I/O rate c. UPS capacity vs. speed of writes from the N and O devices to backup storage.

Figure 13B:
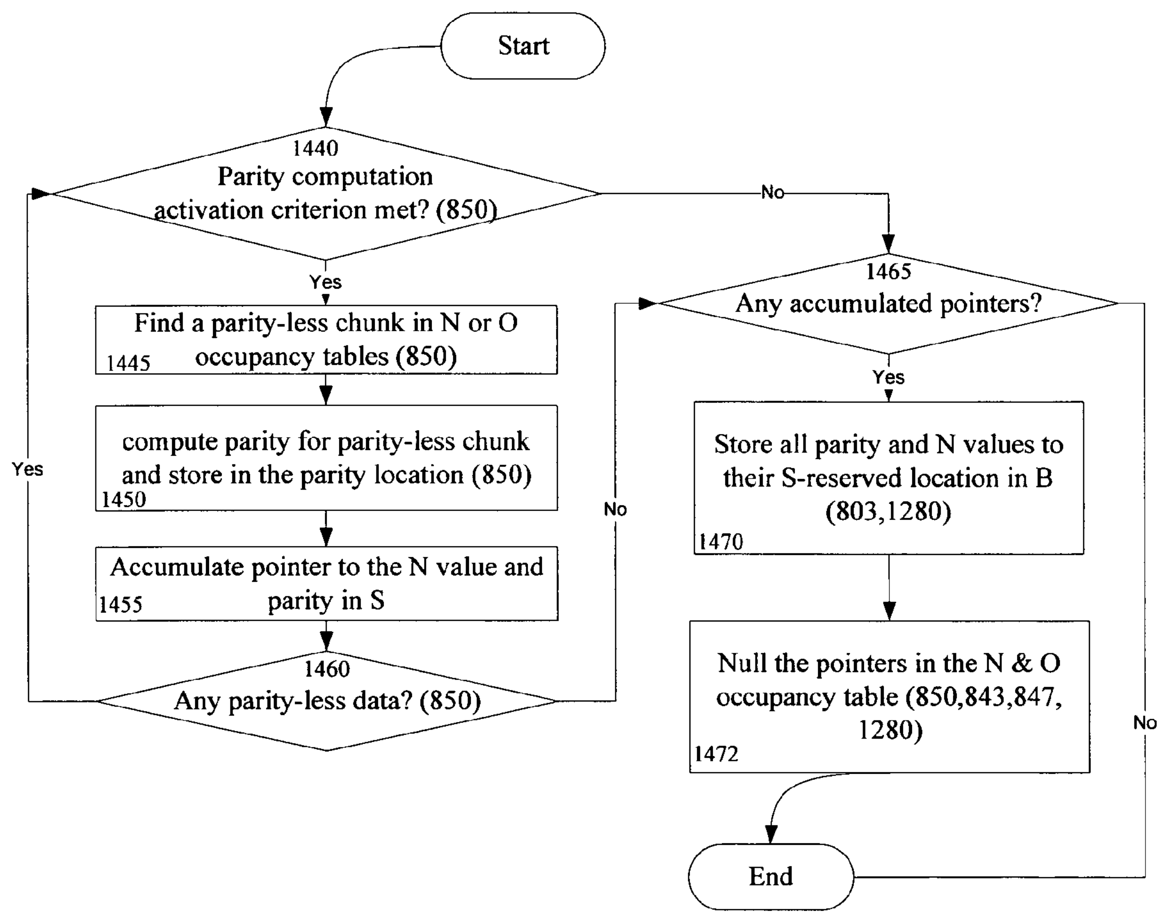
FIG. 13B is a simplified flowchart illustration of a second method for performing the asynchronous RAID computation step of FIG. 12, in accordance with certain embodiments of the present invention.

Reference is now made to FIG. 13B which is a simplified flowchart illustration of a second method for performing the asynchronous RAID computation step 1439 of FIG. 12, in accordance with certain embodiments of the present invention. The method of FIG. 13B typically comprises some or all of the following steps, suitably ordered e.g. as shown. The method of FIG. 13B is similar to the method of FIG. 13A in that, as part of a session in which parity values are updated asynchronously, using new chunks accessed from N-storage, the accessed new chunks are each copied into backup. However, in FIG. 13B all new chunks accessed in a parity computation session are copied into backup together, at the end of the session, whereas in FIG. 13A, each new chunk accessed is copied into backup as it is accessed, rather than at the end of the session. In the method of FIG. 13B, typically, the pointers to the locations in S of each new chunk and its parity value are accumulated (step 1455) as each parity value is computed and at the end of the session, accumulated pointers are sought (step 1465) and all N chunks and corresponding parity chunks are stored before the end of the session but after all parity computations of that session have been completed rather than in between.

A particular feature of the embodiment of FIG. 13B is that at least one incoming value is moved (step 1470) from the pre-parity storage area to non-volatile memory at least when the parity value associated with that incoming value is computed according to a parity-RAID scheme.

According to certain embodiments of the present invention, primary storage space is associated with a plurality of storage devices characterized by relatively high performance capabilities and a relatively high-cost per storage-segment. A temporary backup storage space is associated with a plurality of storage devices whose performance and cost characteristics are similar to the respective characteristics of the storage devices associated with the primary storage space. The storage capacity of the temporary backup storage space is substantially smaller than the storage capacity of the primary storage space. A permanent backup storage space is associated with a plurality of storage devices that are characterized by relatively low performance capabilities and a relatively low-cost per storage-segment. A storage controller responsive to an incoming write request relating to a certain data element is operative to delay asynchronous RAIDing and/or destaging, at least until the relevant parity value has been written.

Figure 13C:
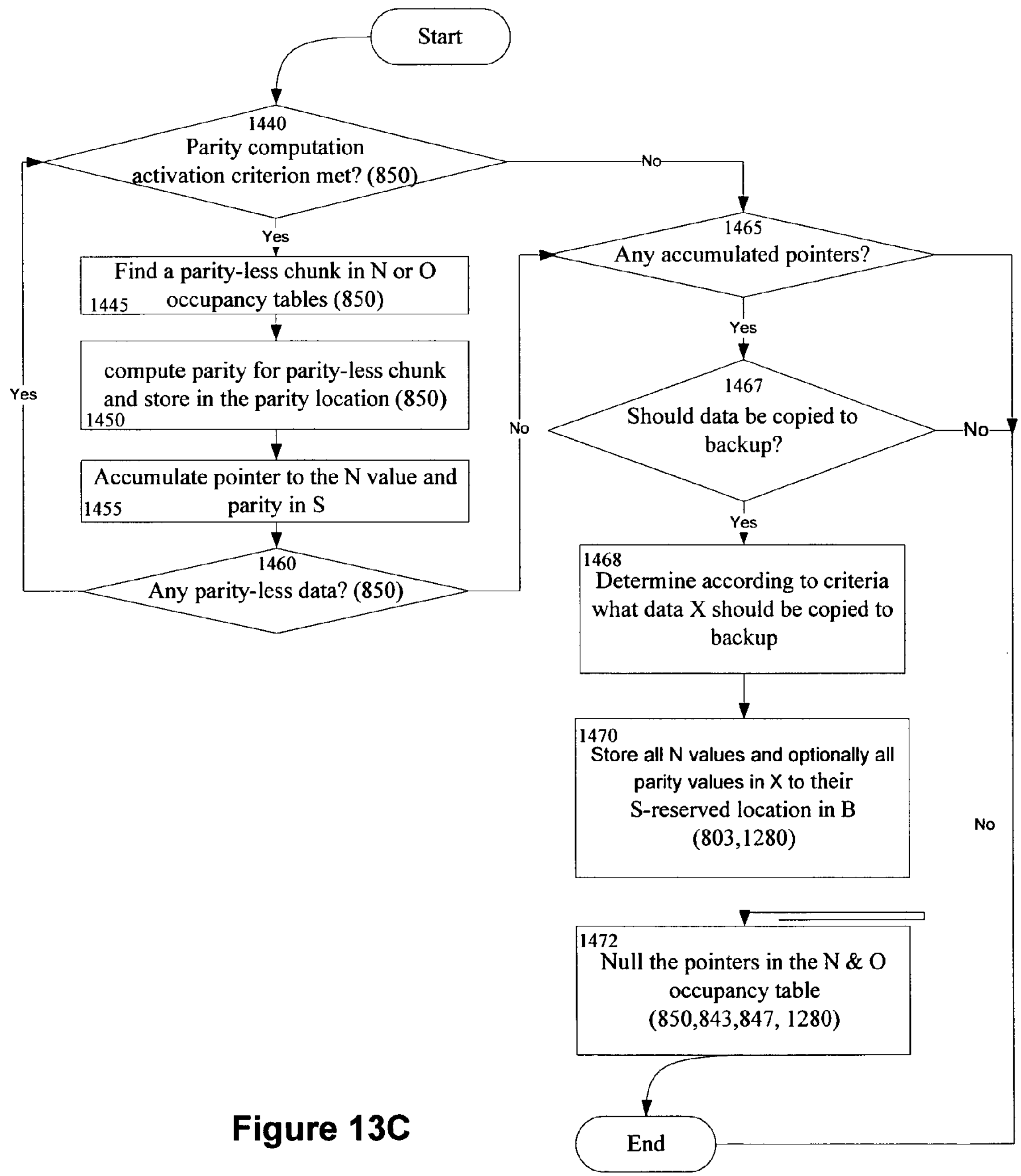
FIG. 13C is a simplified flowchart illustration of a third method for performing the asynchronous RAID computation step of FIG. 12, in accordance with certain embodiments of the present invention.

In particular, FIG. 13C is a simplified flowchart illustration of a third method for performing the asynchronous RAID computation step of FIG. 12, in accordance with certain embodiments of the present invention. The method of FIG. 13C is generally similar to the method of FIG. 13B, except that if decision step 1465 ascertains that pointers have accumulated, a decision step 1467 asks whether or not data should be copied to backup. If not, the method terminates. If so, suitable policy-dependent criteria are used to determine which data, X, should be copied to backup. A suitable policy yielding suitable criteria is described hereinbelow in detail with reference to FIG. 19.

According to certain embodiments of the present invention, the "no" option is invariably used in step 215 of FIG. 2 and in step 1415 of FIG. 12. This ensures that data is always written to N prior to other operations described herein. Then, the method operation need only destage the data written to the temporary backup N. Typically, a copy of all data written in backup B is maintained. The amount of data which is allowed not to be destaged is limited by the size of the UPS. The data is copied to the backup B according to suitable criteria such as one or a combination of several or all of the following criteria:

Upon writing the data to N;

Upon accumulating a sequence of data of predetermined length

Upon hitting a predetermined high watermark typically selected to protect the system;

Upon a time based criterion as described herein;

Upon computing the parity; and/or

When the system is idle.

Typically, when shutting down the system, only such DATA in N which has not been copied yet, is copied, e.g. as shown in FIG. 28A. When booting up the data is copied from B to S, N and O are set up (with no data), and parity is computed e.g. as shown in FIG. 28B. The UPS size typically determines the size of N and vice versa.

In the methods of FIGS. 12-13C, typically, parity computation (step 1450) is not performed in exact accordance with FIG. 4; instead, step 330 (pointer nulling) in FIG. 4 is omitted at the parity computation stage and is performed only later after writing to back-up (steps 1457 in FIG. 13A and 1472 in FIG. 13B).

The methods of FIGS. 12-13C may be performed by the I/O controller 110 of FIGS. 1A-1B; various internal functional units of the controller involved in performing the various steps of the methods of FIGS. 12-13B are indicated in each step in parentheses.

The shut down method used for data written in accordance with the methods of FIGS. 12-13C may be similar to the shut down method of FIG. 6. If "compute now" is not allowed and asynchronous computation is to be used (always "NO" in step 1410) the entire S copying step 600 is omitted, which greatly reduces shut down duration.

In FIGS. 14-18, 20-21 the following notation is employed: Rectangles S1, S2, P, O, N and B represent storage devices. S1, S2 contain data, P contains computed parity. O contains old data and pointers as employed in certain embodiments of the present invention. N contains pre-parity data and pointers as employed in certain embodiments of the present invention and B is backup storage containing backed-up data. The smaller quadrangles inside S1, S2, P, O, N and B depict storage blocks. Within the smaller quadrangles, lower case letters such as a, b, etc. are used to signify a data element or the contents of an indicated slot in a storage device such as S1 and P(a,b) (say) signifies the parity of a and b (say) which is stored at an indicated slot in storage device P (for example, in FIG. 18 the slot is indicated to be slot 7).

Figure 18:
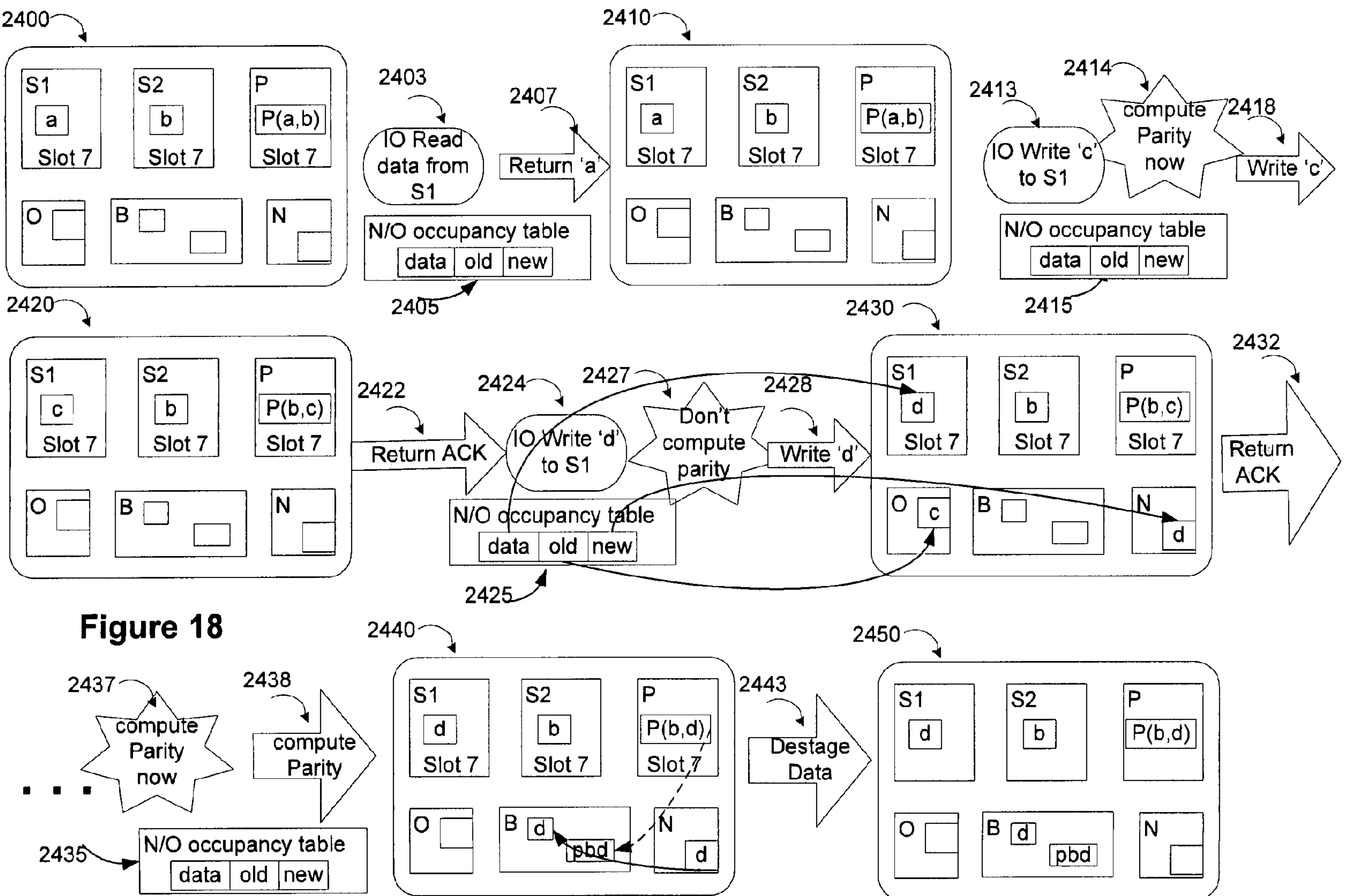
FIG. 18 is a diagram showing an example of various stages of I/O operation including various stages of the writing method of FIG. 12.

The large rectangles such as rectangles 2400, 2410, 2420, etc. in FIG. 18, represent the storage system in various states. Large arrows such as arrow 2438 in FIG. 18 represent actions performed by the controllers of the system. Thin arrows such as arrows 2422, 2432 in FIG. 18 depict either pointers or data movement. Ovals such as ovals 2403, 2413 in FIG. 18 represent external operations, typically from a host, which are performed on the system. Stars such as stars 2414 and 2427 of FIG. 18 represent current logical conditions and rectangles such as 2405 and 2414 represent states of logical data structures, such as N/O occupancy tables, used by the controller.

Figure 14:
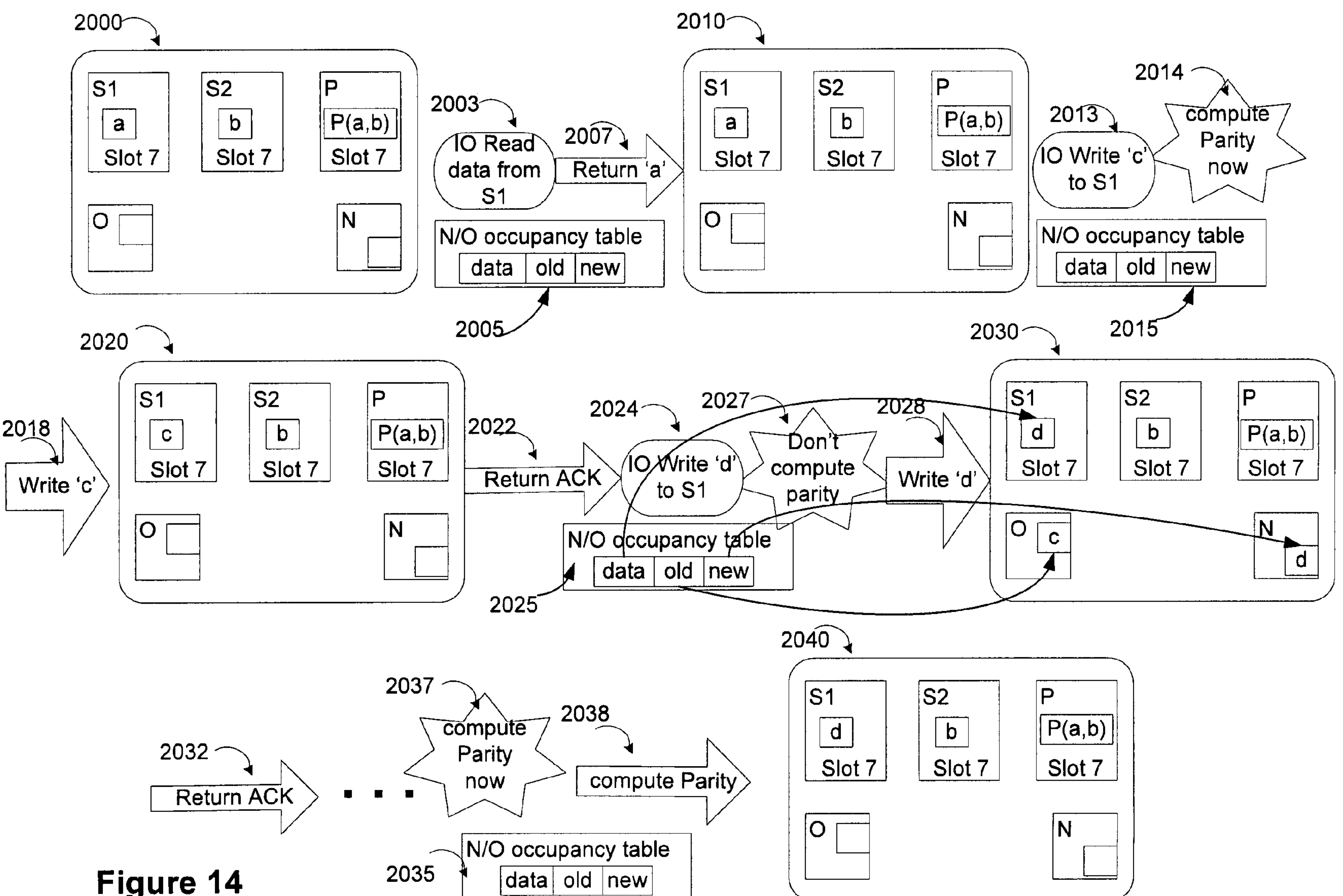
FIG. 14 is a diagram showing an example of various stages of I/O operation including various stages of the writing method of FIG. 2.

FIG. 14 is a diagram showing an example of various stages of I/O operation including various stages of the writing method of FIG. 2. In stage I, the system of FIG. 1 is shown in an initial state 2500; P indicates an S device which is storing the parity value for the currently written data (e.g. slot 15 in S7). Initially, a "read from S1" operation 2503 is performed as per a request by one of the H devices in FIG. 1 and the value of "a" is returned (arrow 2507); the state at this point, 2510, is the same as state 2500. Next, a "write c into S1" operation 2513 is received from one of the H devices in FIG. 1 and the system is in its "compute parity now" configuration 2514. As a result, as shown in state 2520 of the system of FIG. 1, "c" is stored in S1 and the parity device P now may (for example) store a parity value for "b" XORed with "c" rather than for "a" XORed with "b" as previously, in state 2510. An ack is returned to the requesting host (arrow 2522) and another I/O request (write "d" to S1) is received; at this point however, the system is in a "don't compute parity now" configuration 2527. Therefore, "d" is written into S1 (arrow 2528) however parity is not computed and the state 2525 of the N or O occupancy table of FIGS. 11A-11C is such that it includes a link to current chunk "d", a link to the old chunk "c" and a link to the slot in S1 in which the old chunk has been stored and the current chunk is now to be stored. As shown in state 2530, the new chunk "d" is stored in its requested location (slot 8 in device S1) and in N and an ack is returned to the requesting H device (arrow 2532) whereas the parity is not yet updated to reflect this change; the parity in state 2530 is still that of b XORed with c rather than b XORed with new data "d" (in the above example). Eventually, the system enters a "compute parity now" configuration (reference numeral 2537) and the "next up" parity to be computed is that of slot 8 in S1; it is only at this point that the parity value is updated to be "b" XORed with new data "d" (in the above example).

Figure 15:
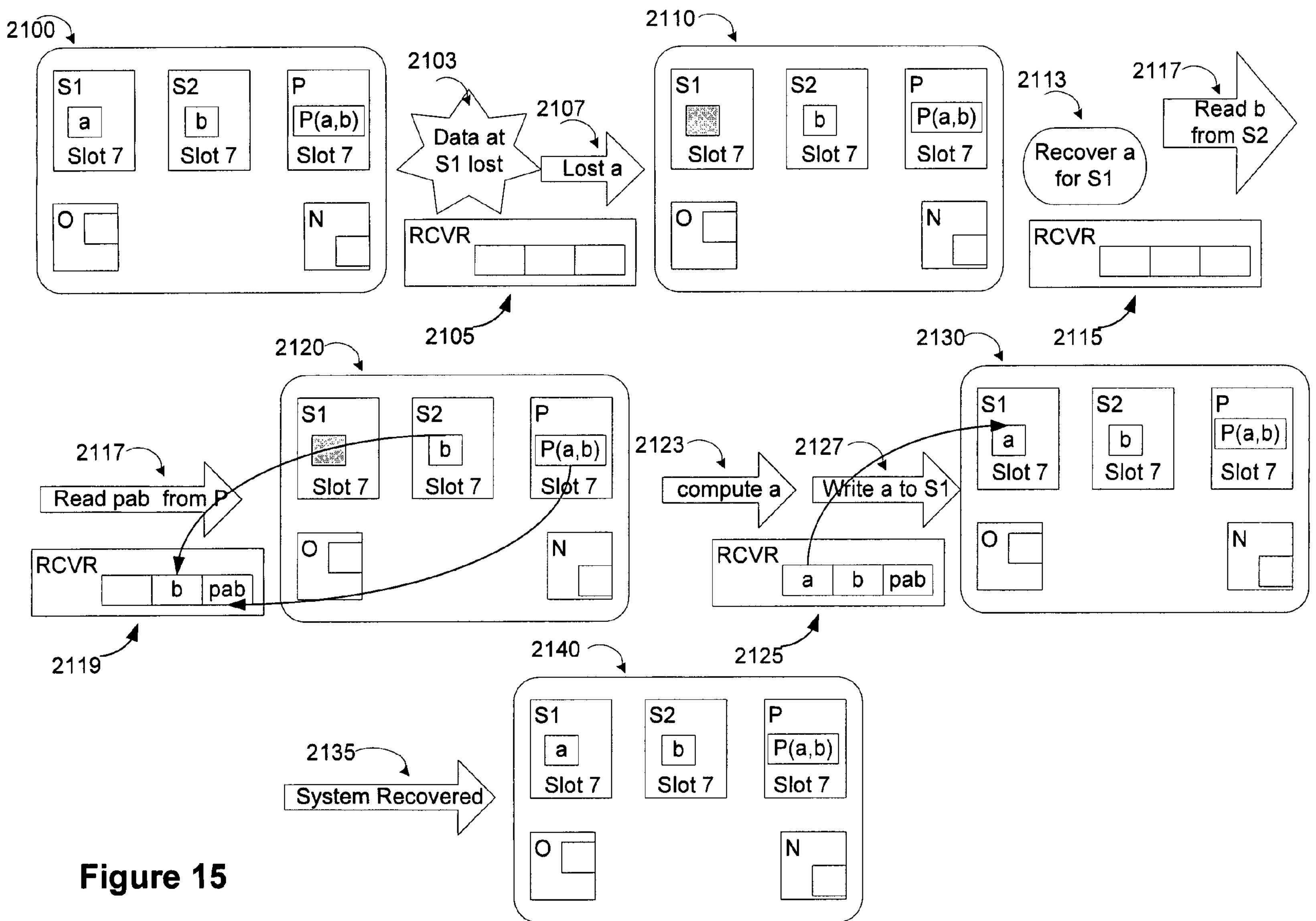
FIG. 15 is a diagram showing an example of various stages of recovery in accordance with the method of FIG. 5, for a case in which a chunk is lost and neither the chunk nor any of its parity members is parity-less.

FIG. 15 is a diagram showing an example of various stages of recovery in accordance with the method of FIG. 5, for a case in which a chunk is lost and neither he chunk nor any of its parity members is parity-less. In stage I, the system of FIG. 1A is shown in an initial state 2100; P indicates an S device which is storing the parity value for the currently written data (e.g. slot 15 in S7). Initially, an indication (referenced 2103) is received that data at S1, slot 7 is lost. The N and O devices are empty, indicating that none of the parity members of the lost slot are parity-less and therefore, a recovery operation is initiated (reference numeral 2113). In the course of the recovery operation, the values of all the lost chunk's parity members, including the parity chunk itself, are read and a conventional RAID scheme is employed to re-compute the lost chunk a, as indicated at reference numeral 2123. The recovered data is written to S1, slot 7 at which point the system has fully recovered (state 2140).

Figure 16:
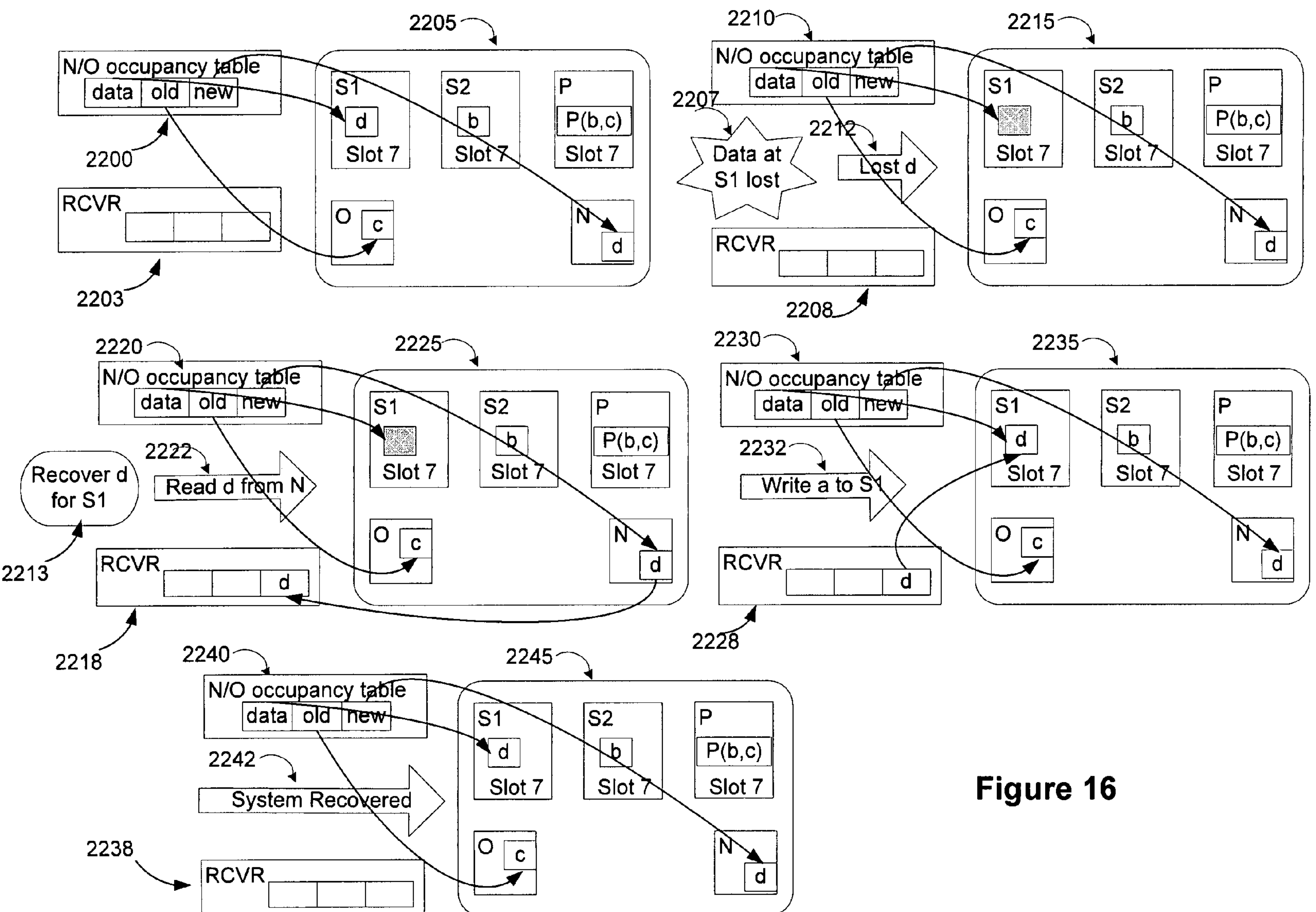
FIG. 16 is a diagram showing an example of various stages of recovery in accordance with the method of FIG. 5, for a case in which a parity-less chunk is lost but the parity members of the chunk are not parity-less.

FIG. 16 is a diagram showing an example of various stages of recovery in accordance with the method of FIG. 5, for a case in which a parity-less chunk is lost but the parity members of the chunk are not parity-less. In stage I, the system of FIG. 1A is shown in an initial state 2205; P indicates an S device which is storing the parity value for the currently written data (e.g. slot 15 in S7). Initially, an indication (referenced 2207) is received that data at S1, slot 7 is lost. Using the occupancy table 2210, it is established that the lost chunk is parity-less and therefore it is reconstructed by accessing the relevant (as per the occupancy table) slot in the N storage.

Figure 17:
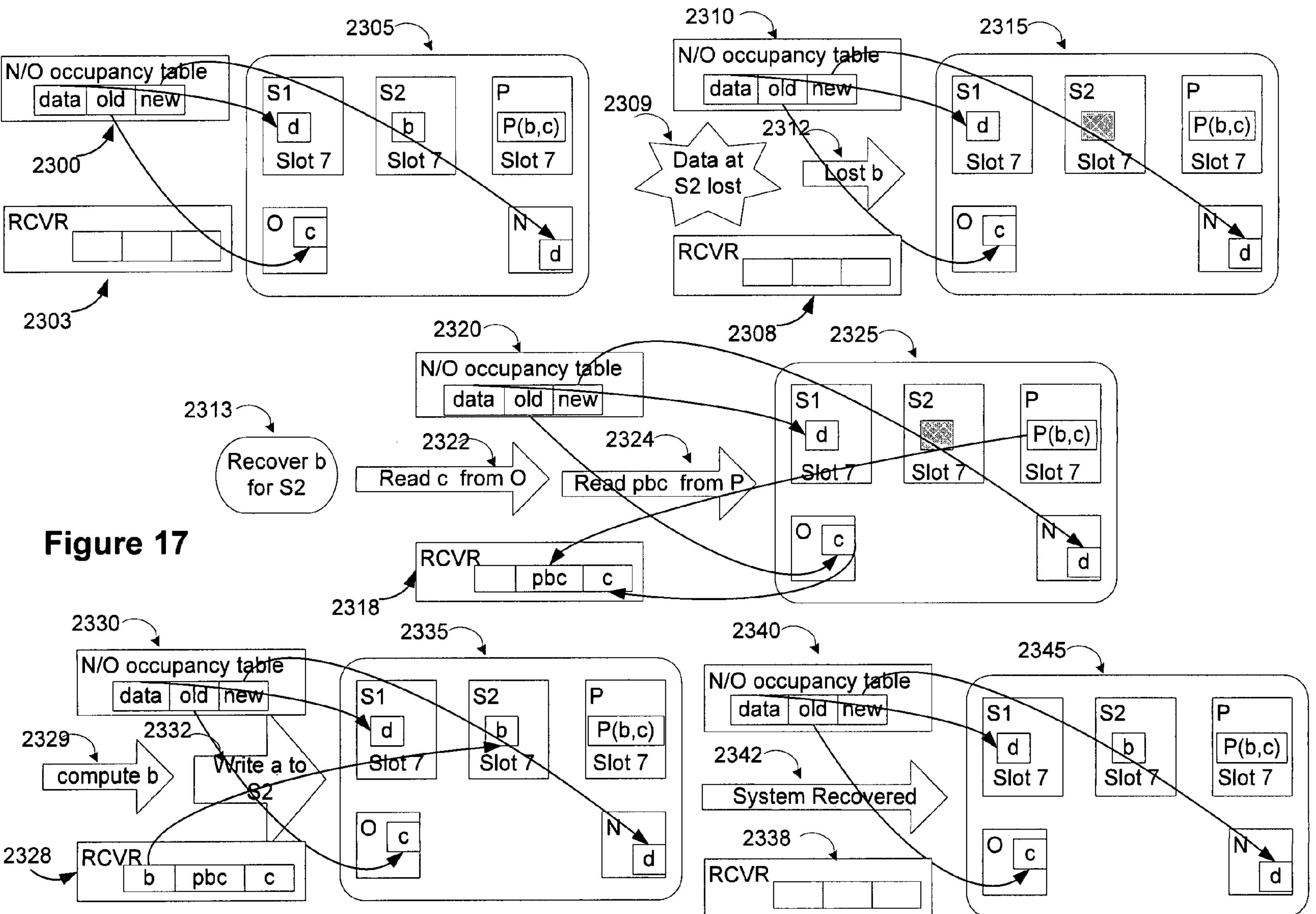
FIG. 17 is a diagram showing an example of various stages of recovery in accordance with the method of FIG. 5, for a case in which a chunk is lost which is not parity-less, but one of the parity members of the chunk is parity-less.

FIG. 17 is a diagram showing an example of various stages of recovery in accordance with the method of FIG. 5, for a case in which a chunk is lost which is not parity-less, but one of the parity members of the chunk is parity-less. In stage I, the system of FIG. 1A is shown in an initial state 2305; P indicates an S device which is storing the parity value for the currently written data (e.g. slot 15 in S7). Initially, an indication (referenced 2309) is received that data at S2 slot 7 is lost. Using the occupancy table 2210, it is established that the lost chunk is not parity-less whereas one of its parity members is parity-less and therefore it is reconstructed by reading the old value of the parity-less member from the appropriate location, as indicated by the occupancy table, in the O-storage, reading the parity value from S, reconstructing b, the lost chunk using conventional RAID scheme reconstruction, and storing it in its S2 location.

FIG. 18 is a diagram showing an example of various stages of I/O operation including various stages of the writing method of FIG. 12. FIG. 18 is generally similar to the diagram of FIG. 5 which shows I/O operation in accordance with the writing method of FIG. 2, except that in the course of the asynchronous parity computation session (state 2440), the formerly parity-less member in S1, slot 7 and the parity P_bd computed asynchronously therefore, are stored not only in S-storage as in FIG. 2, but also in backup storage B.

According to some embodiments of the present invention, destaging (according to any of the methods shown and described herein) of the data, from secondary (temporary) backup to permanent backup is delayed, typically for as long as possible and at least until the point at which parity is computed for the parity-less data. Once parity is computed, a request is initiated to destage the data to the backup non-volatile storage B. Examples of criteria for timing destaging are described herein with reference to FIG. 19.

Optionally, the system may elect to use different destaging criteria at different times, dynamically skipping between various destaging criteria. For example, the system may elect to delay destaging until parity can be computed. However, if a pre-defined high watermark in the temporary backup is reached, de-staging might be prioritized rather than allowing it to delay long enough to coincide with parity computations.

Figure 19:
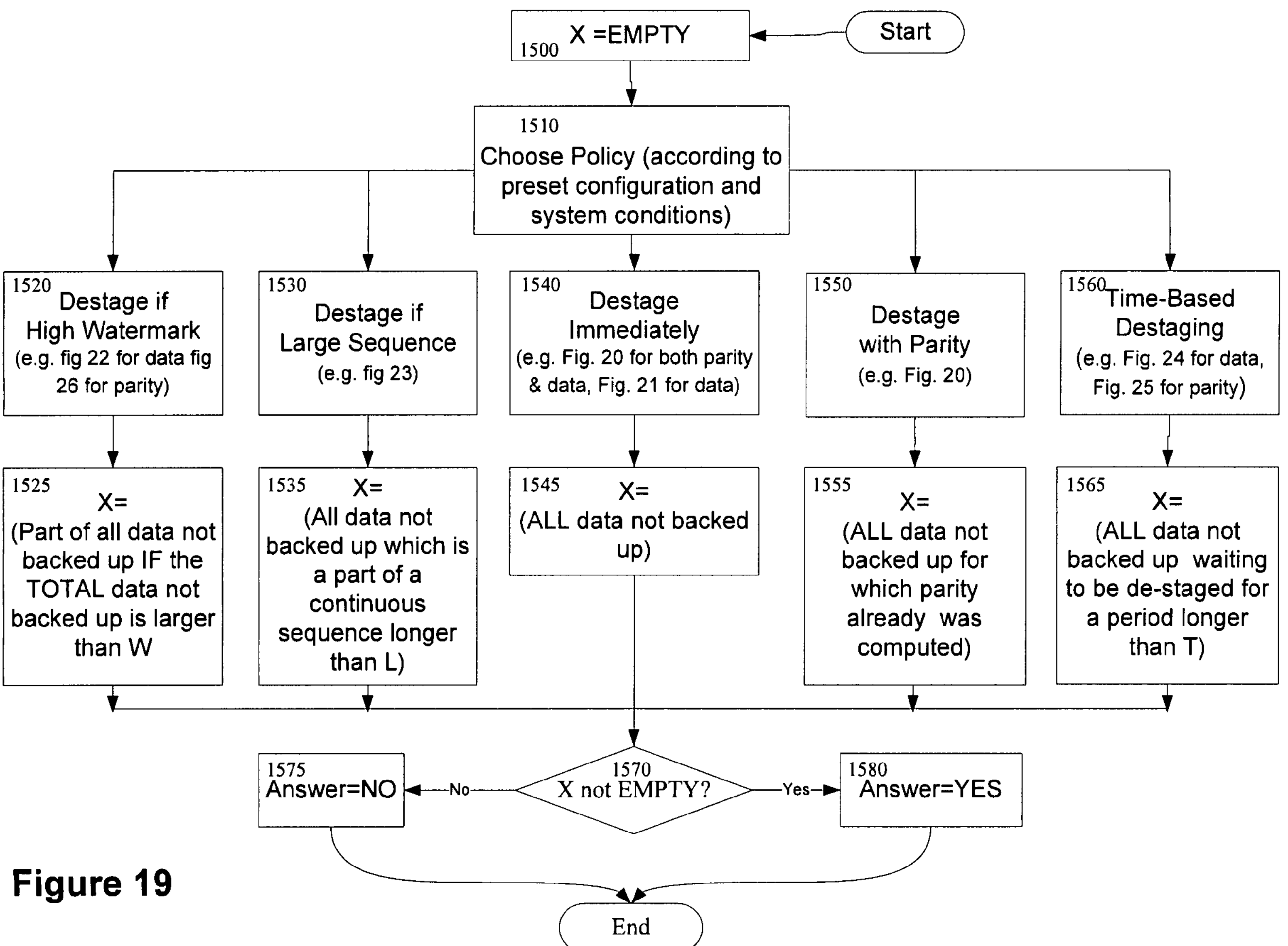
FIG. 19 is a simplified flowchart illustration of an on-the-fly or offline policy selection step useful in setting up criteria for the determining step in FIG. 13C.

FIG. 19 is a simplified flowchart illustration of an off-line policy selection step useful in setting up criteria for the determining step 1468 in FIG. 13C. As described above, FIG. 13C is a simplified flowchart illustration of a third method for performing the asynchronous RAID computation step of FIG. 12, in accordance with certain embodiments of the present invention. As shown, in FIG. 19, various policies may be employed, of which those illustrated are merely exemplary and may be provided either singly or in any combination. Initially, X, the contents (data and/or parity or and/or pointers to data and/or parity) to be destaged in the current round, is EMPTY (EMPTY is a value indicating that there is no data to de-stage). The output of the flowchart illustration of FIG. 19 is either "no" (to the question in step 1467 of FIG. 13C) and X=EMPTY, or "yes" (step 1575 and 1580) and X holds (or points) to the data that should be destaged. As shown, typically, data is copied from the pre-parity storage to non-volatile memory according to a predefined criterion selected from among the following:

a. defer destaging of the data until a threshold related to capacity of UPS is reached or crossed; (step 1520). For example, FIGS. 22 and 26 illustrate embodiments in which an upper threshold or "high water mark", reached for data or for parity, respectively, triggers destaging. The term WaterMark as used herein refers to an amount of data waiting to be destaged from temporary backup to permanent backup or to an amount of computed parity data waiting to be destaged. The term HighWaterMark (HWM) is used to refer to a predefined upper limit on the amount of data which can be accumulated to be destaged to the permanent backup or on the amount of data waiting in a pre-parity state or the amount of computed data waiting to be de-taged.

b. destage the data when a predefined amount of sequential data to be destaged has been accumulated in the pre-parity storage; (step 1530). For example, FIG. 23 illustrates destaging of both a data sequence and a parity sequence, each being at least of a pre-determined minimum length.

c. destage the data substantially immediately (step 1540). For example, the embodiment of FIG. 21 described below includes immediate destaging of data (as opposed to parity).

Figure 20:
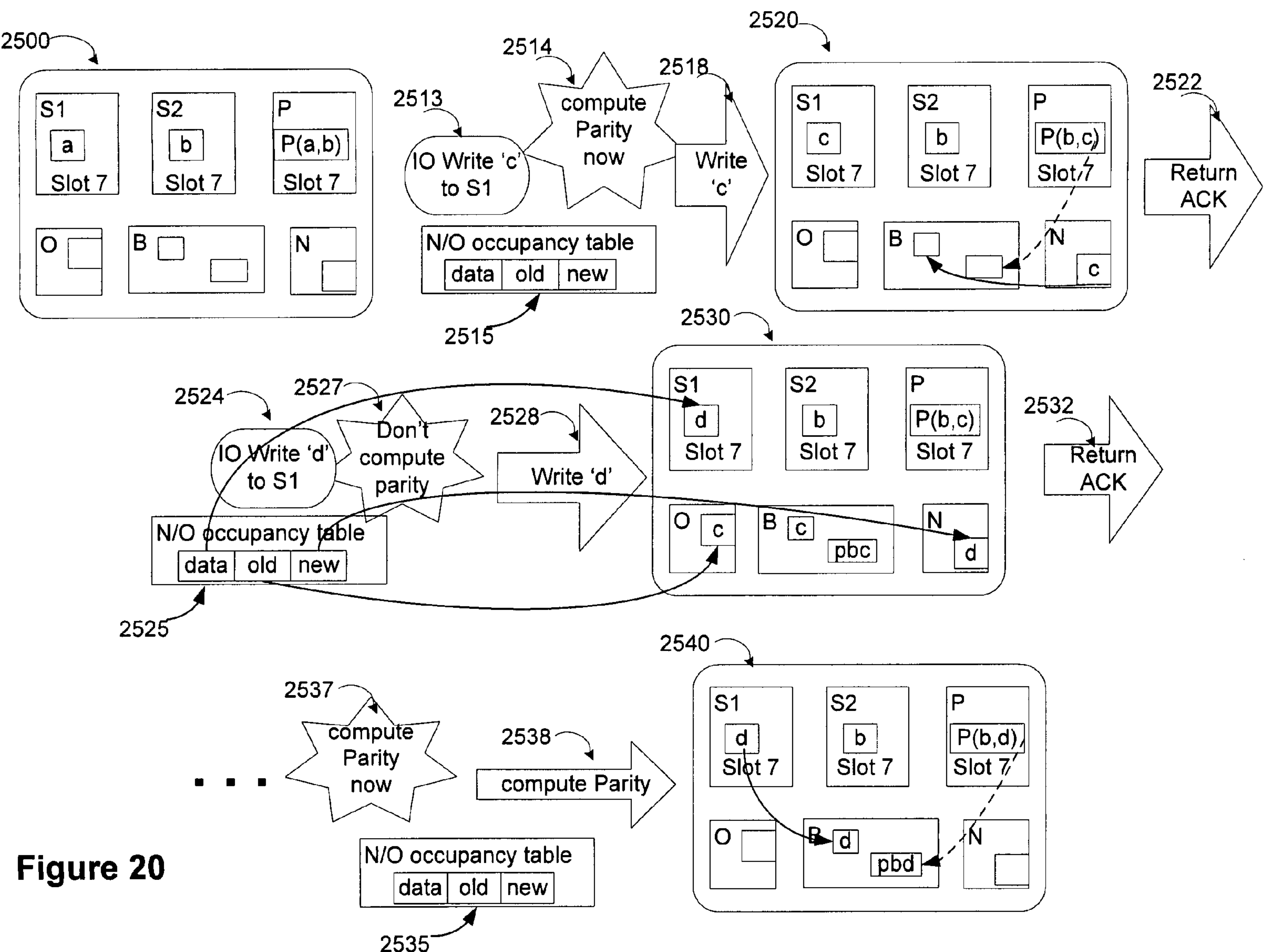
FIG. 20 is a diagram showing an embodiment of the present invention in which data is destaged after the parity is computed.
Figure 21:
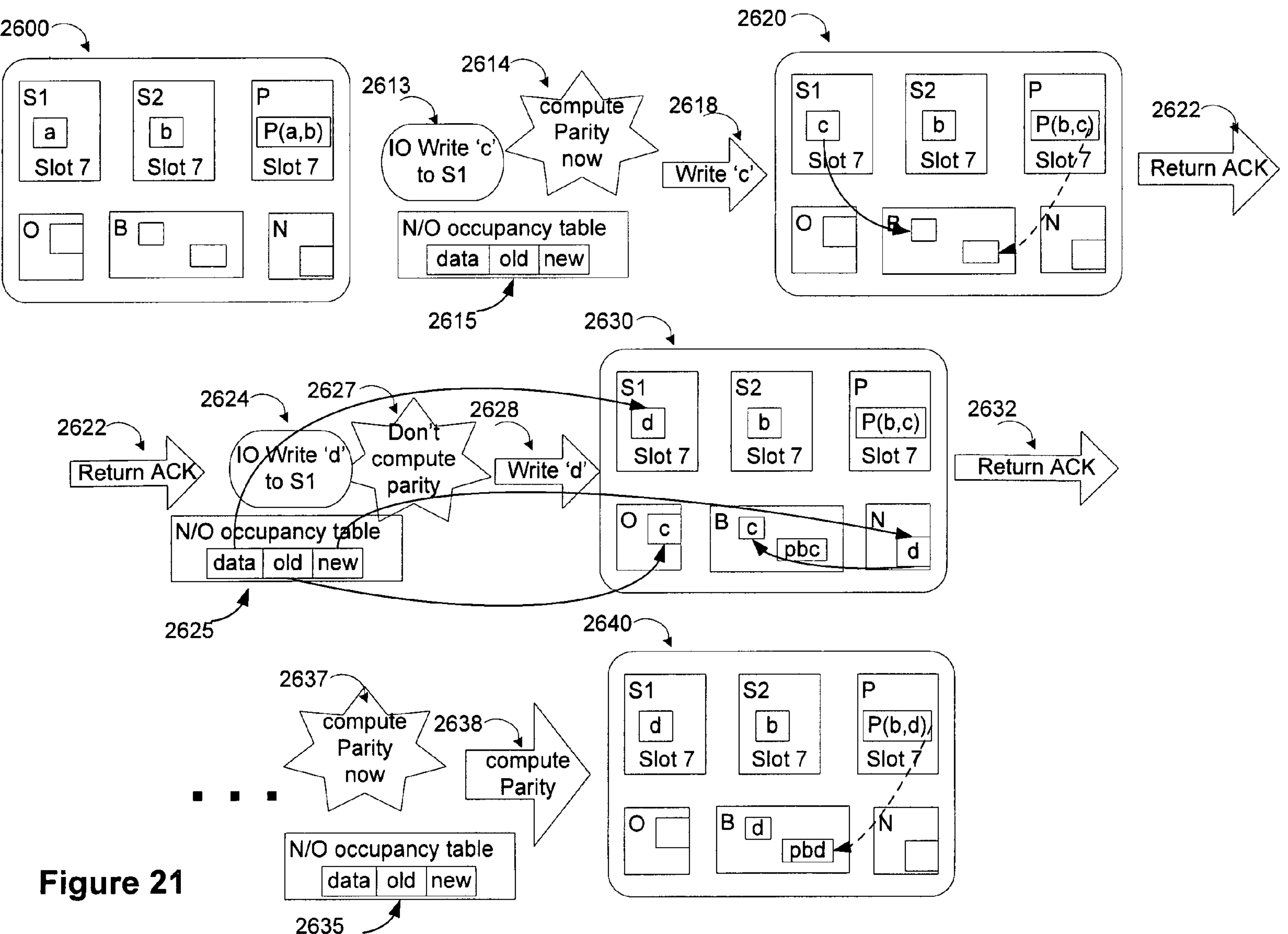
FIG. 21 is a diagram showing an embodiment of the present invention in which data is destaged substantially immediately.

As for parity destaging, FIGS. 20 and 21 are examples of immediate destaging embodiments. It is appreciated that from a point of view of parity destaging, destaging with parity option 1550 is tantamount to immediate destaging option 1540.

d. destage data when its related parity has been computed (step 1550), e.g. as described in detail below with reference to FIG. 20.

e. destage data which has not been accessed for a predetermined period of time (step 1560). For example, FIGS. 24 and 25 illustrate embodiments which are time based for data and for parity respectively in that data or parity, respectively, are destaged once they have been waiting for a predeterminedly long time period to be destaged and throughout that time period have been neither accessed nor computed.

f. "destage when idle" embodiment (not shown): destage data when the system is idle i.e. when there are no services or processes within the storage system or associated with the storage system which compete for those system resources required to effect destaging.

It is appreciated that the particular options presented in steps 1520-1565 in FIG. 19 are merely exemplary, and also are not necessarily mutually exclusive and can be suitably selected and/or combined either in a set-up stage or dynamically. For example, the high watermark embodiment of steps 1520 and 1525 can be combined, say, with the embodiments of steps 1530-1535 or of steps 1550-1555 or of steps 1560-1565. Typically, the "high watermark" consideration takes precedence over the criteria governing the embodiments of steps 1530-1535, steps 1550-1555 and steps 1560-1565 in that if the high watermark is reached, destaging is typically performed even if the other criteria are not met. Typically, if the contents of a to be destaged block reaches the high watermark, destaging is performed even if and no other criteria is met (e.g. even if no predetermined time period has not elapsed since last access and no sequence of predetermined length exists). Similarly, the time-based embodiment of steps 1560-1565 can be combined with other embodiments and if the predetermined time period is reached, destaging may be performed even if the other criteria are not met.

Another example is that the "destaging with parity" embodiment of steps 1550-1555 can be combined with, say, the embodiments of steps 1530-1535 or of steps 1560-1565.

FIG. 20 is a diagram showing an embodiment of the present invention in which data is destaged after the parity is computed. For example, at reference numerals 2520 and 2540, parity is computed hence the data and optionally the parity are destaged. However, at reference numeral 2530 no destaging occurs since parity is yet to be computed.

FIG. 21 is a diagram showing an embodiment of the present invention in which data is destaged substantially immediately. For example, at reference numeral 2620 data and optionally parity, being ready, are promptly destaged. At reference numeral 2630, data is destaged as it is written. At reference numeral 2640, parity is destaged as soon as it is computed.

Figure 22A:
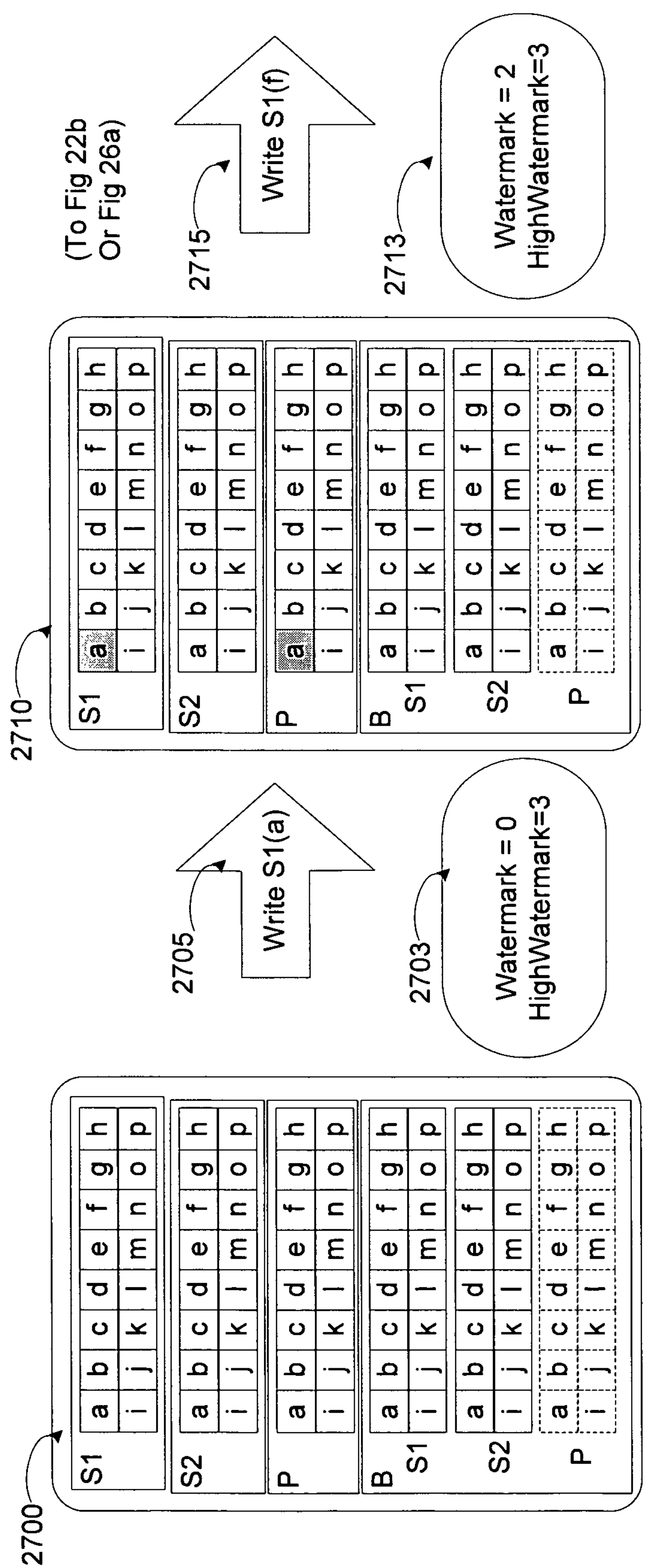
FIGS. 22A-22C, taken together, form a diagram showing an embodiment of the present invention in which data is destaged after reaching an application-defined high watermark.

In FIGS. 22A-26B, the following notation is employed: The rectangles notated S1, S2, P, and B are storage devices. S1, S2 contain data, P contains computed parity. Inside each of them are slots, represented in these drawings by quadrangles, holding data, represented by lower case letters. In this depiction the slots marked with the same letter are connected through the parity RAID property. So for example S1(*a*), S2(*a*) and S1(*p*) respectively represent the containers of 2 data elements and the container holding them would be computed parity accordingly. In B, which is the backup storage containing backed-up data, 3 compartments are defined in the illustrated embodiment which are respective images of S1, S2 and P and are notated accordingly. The large rectangles, such as 2700, 2710 in FIG. 22A which contain S1, S2, P, and B represent states of the storage system. Large wide arrows such as arrows 2705 and 2715 in FIG. 22A represent actions performed by the controllers of the system. Ovals such as ovals 2703, 2713 in FIG. 22A each represent an actual logical condition and logical data structure used by the controller. Thin arrows such as 2735, 2745 in FIG. 22C represent either pointers or data movement.

Reference is now made to FIGS. 22A-24C in which O and N devices are omitted for simplicity and devices S1, S2, P and B are aligned. Slots "a" in devices S1, S2 and P form a parity RAID set. These slots' locations in B are identically marked.

Figure 22B:
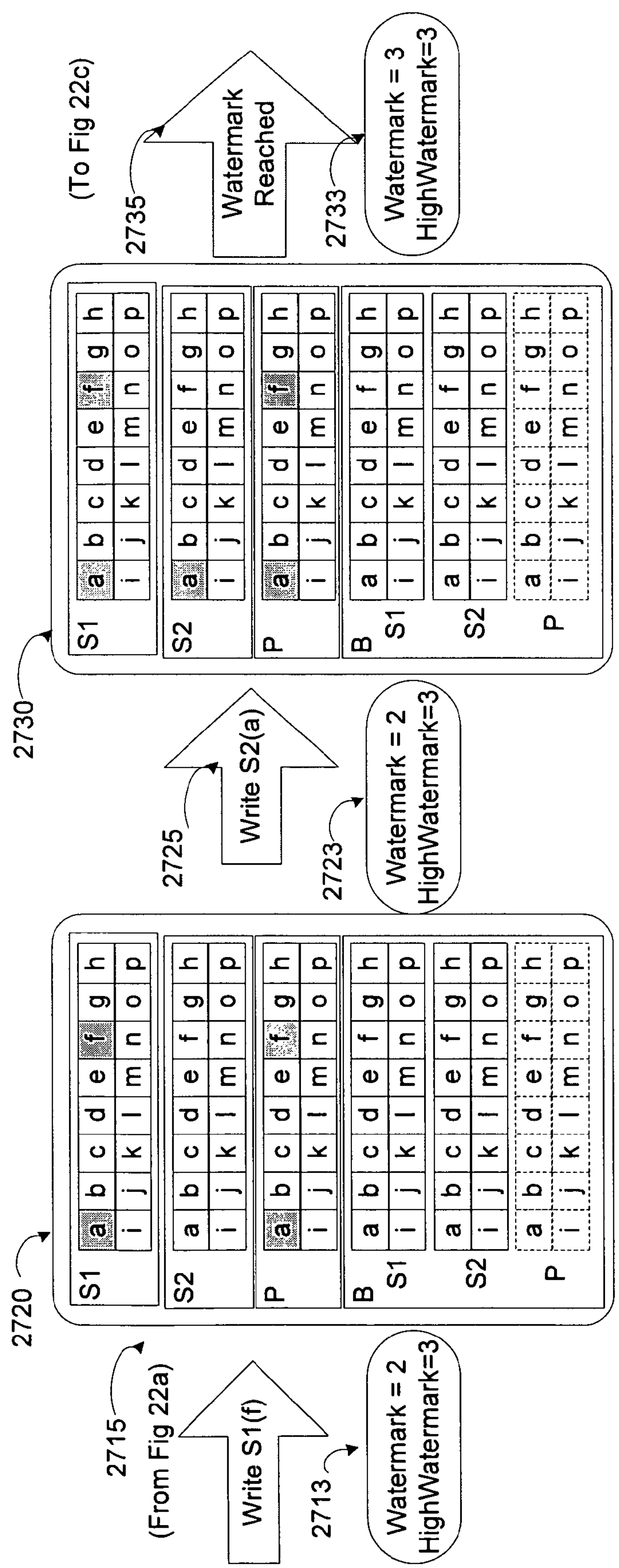
Figure 22C:
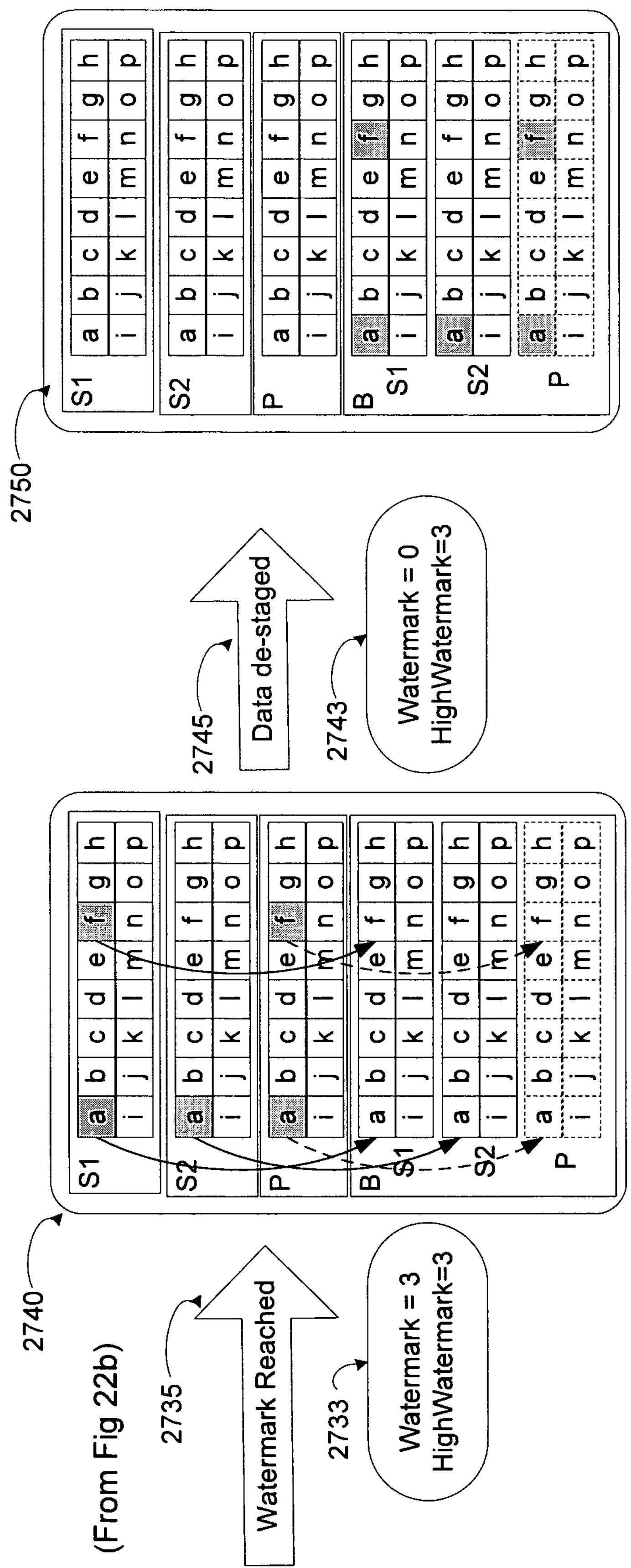

FIGS. 22A-22C, taken together, form a diagram showing an embodiment of the present invention in which data is destaged after reaching an application-defined high watermark. Data accumulated by virtue of write operations are stored in S1 and S2. Once the accumulated data reaches the watermark (high watermark=3, in the illustrated embodiment), the data and optionally the parity are destaged as shown in FIG. 22C. In some embodiments the data is also accumulated in the pre-parity area N.

It is appreciated that typically, both in the embodiment of FIG. 21 and in the embodiment of FIGS. 22A-22C, parity is destaged substantially immediately after computation; such embodiments are termed herein "immediate". In other embodiments, the parity data is destaged according to alternative or additional criteria as is described hereinbelow.

Figure 23A:
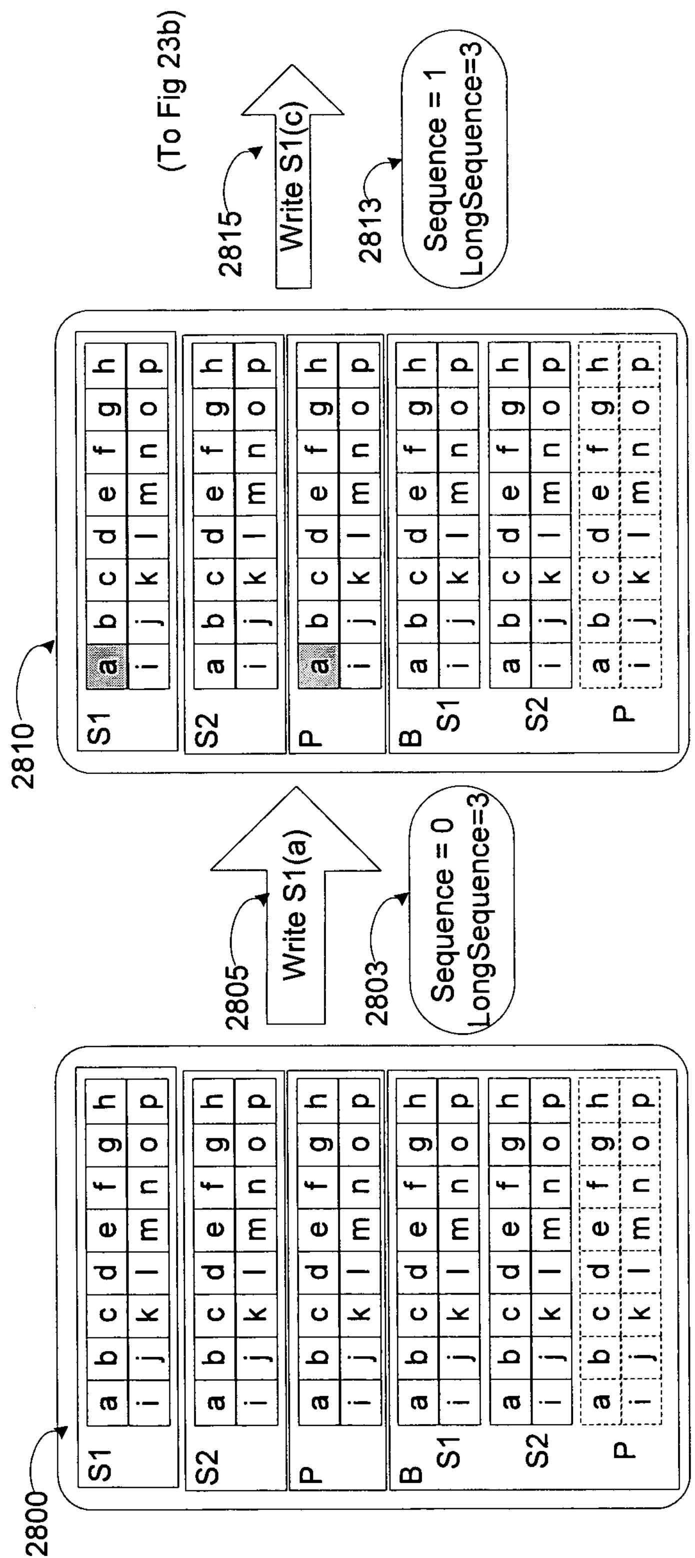
FIGS. 23A-23C, taken together, form a diagram showing a "sequence" embodiment of the present invention in which data is de-staged after, typically only after, reaching a sequence of pre-defined length.
Figure 23B:
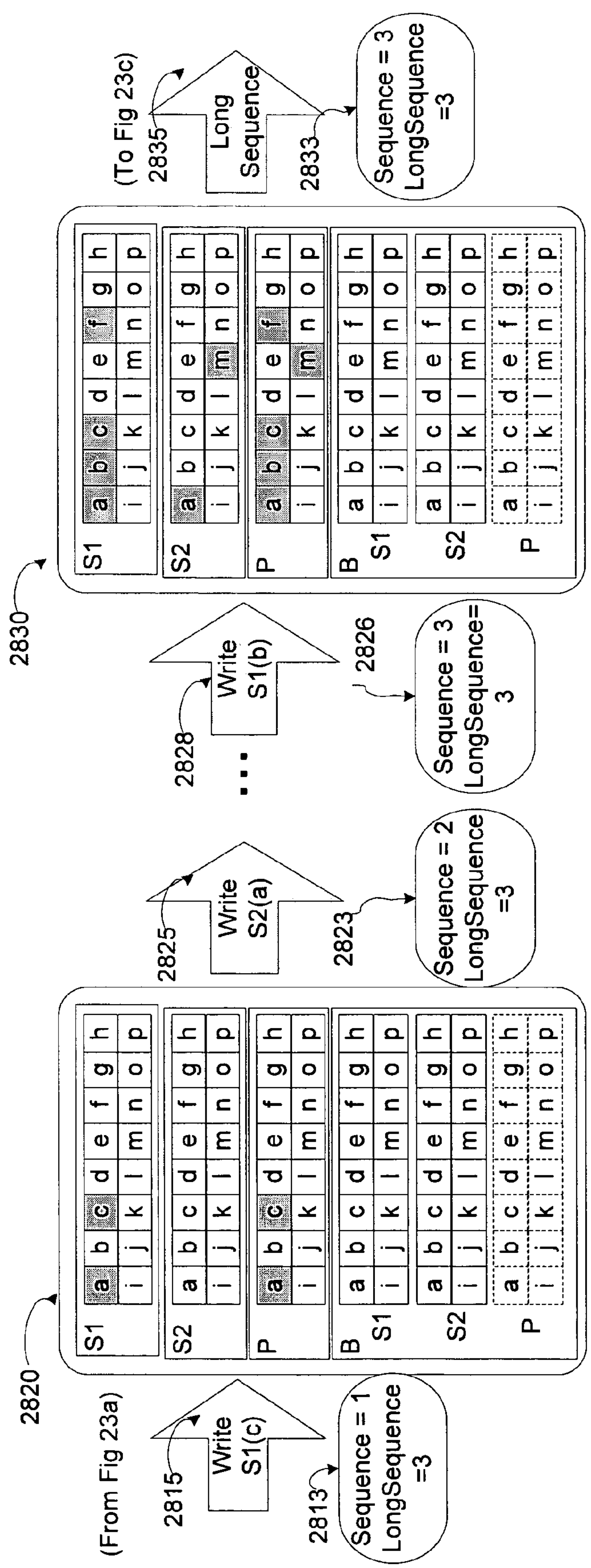
Figure 23C:
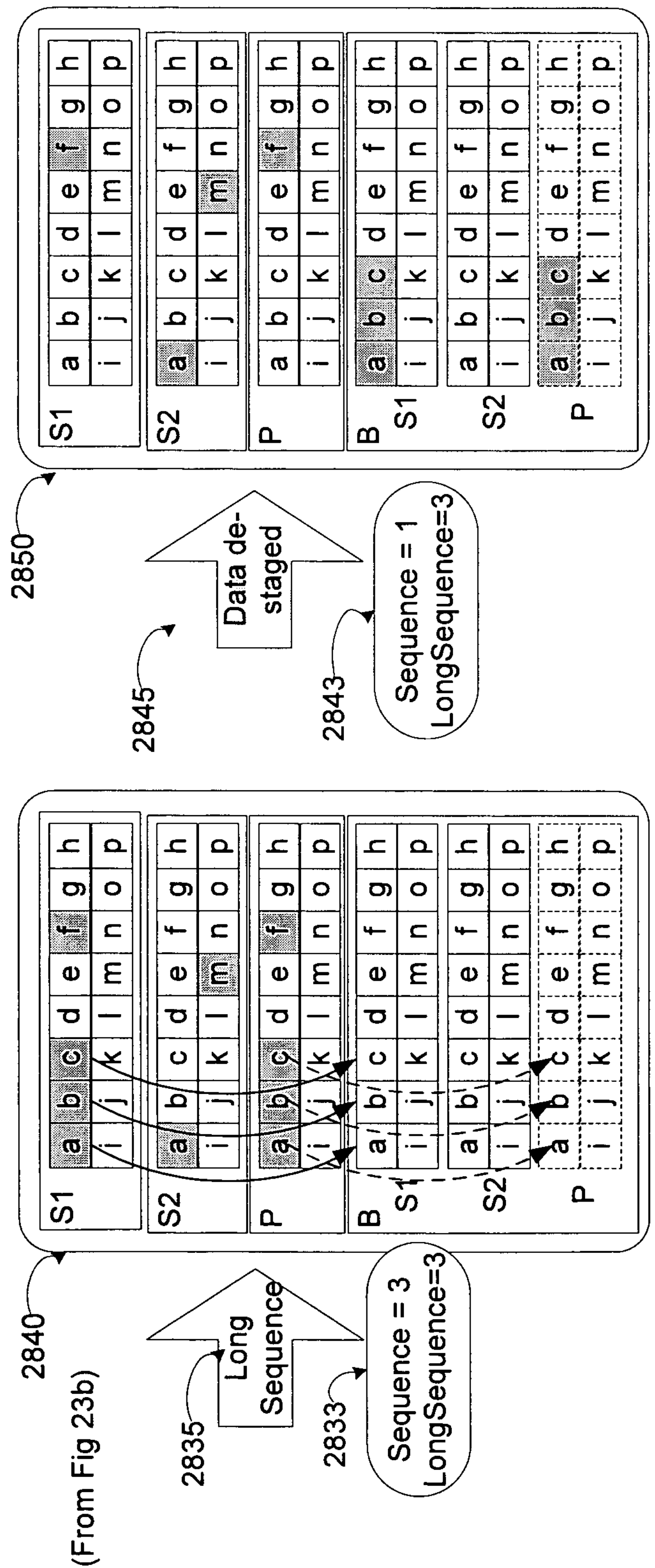

FIGS. 23A-23C, taken together, form a diagram showing a "sequence" embodiment of the present invention in which data is destaged after, typically only after reaching a sequence of pre-defined length. Accumulation continues until a sequence of length, say, 3 is reached at S1(*a,b,c*). At this point the sequence is destaged. The associated parity may also be destaged since it will have a sequence of at least the length of the data sequence. In some embodiments the data sequence is accumulated in the pre-parity area N.

Figure 24A:
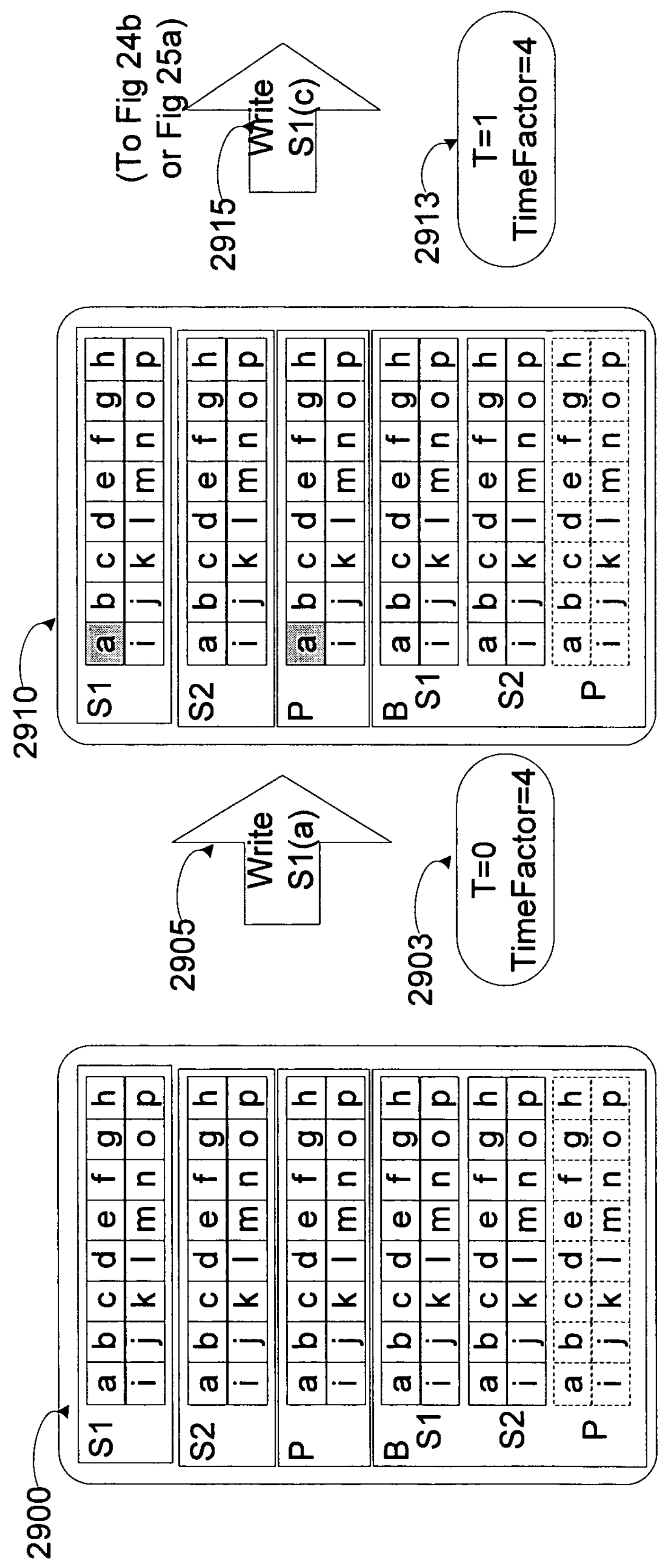
FIGS. 24A-24C, taken together, form a diagram showing an embodiment of the present invention in which data is destaged, typically only after a predetermined period of time has elapsed since the last data was accessed (read or write operation).
Figure 24B:
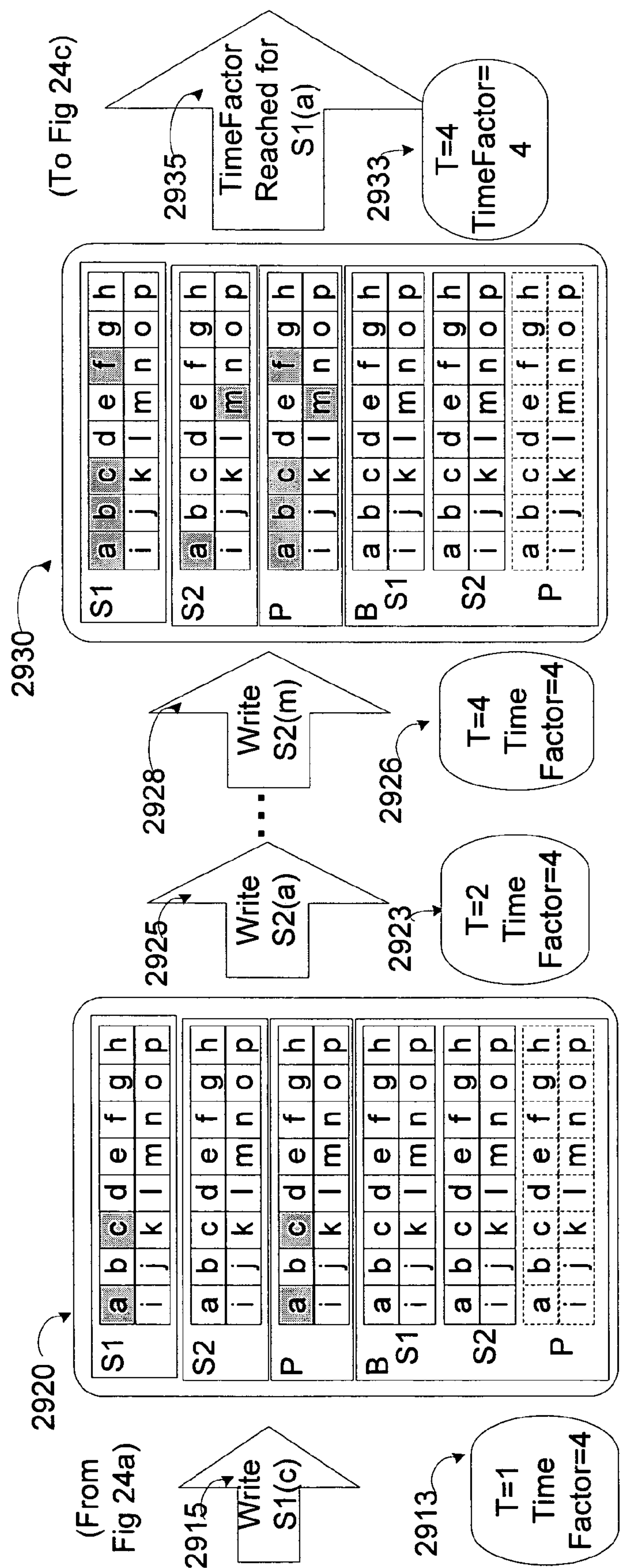
Figure 24C:
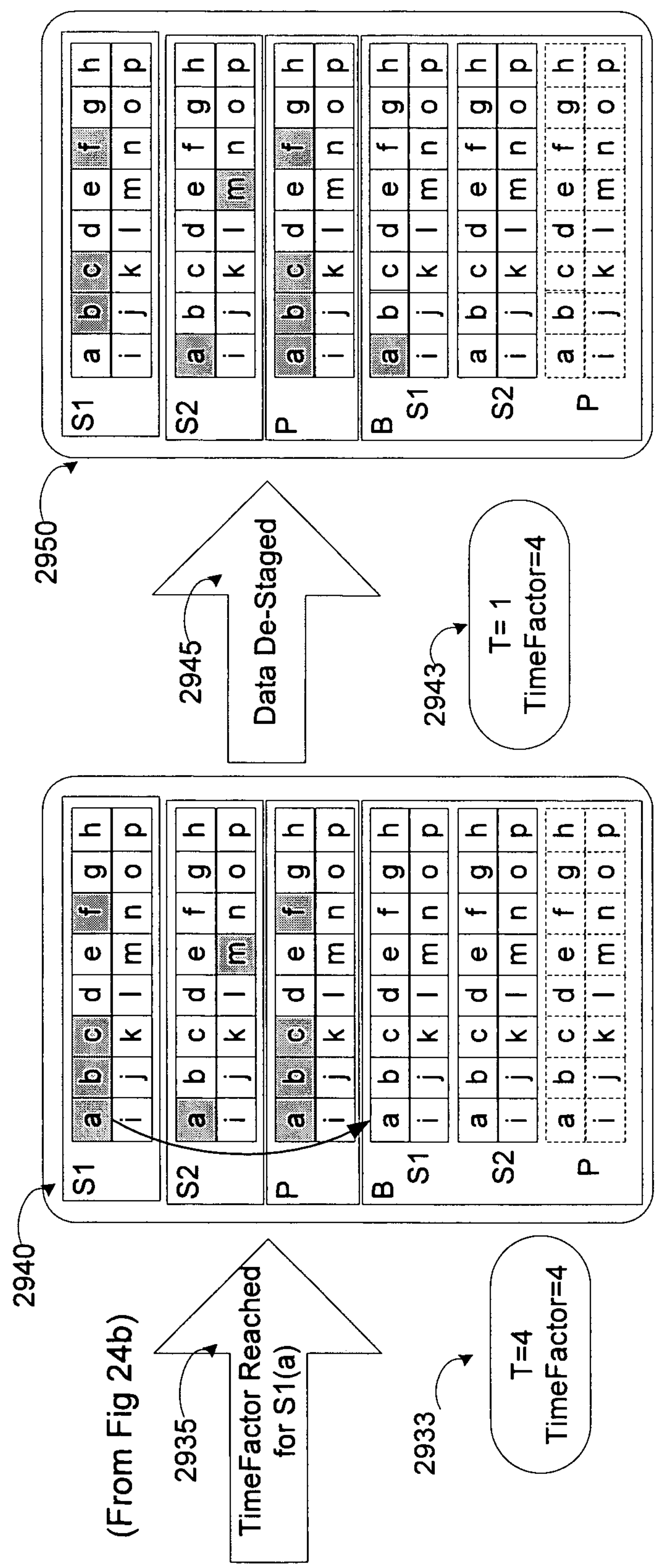

FIGS. 24A-24C, taken together, form a diagram showing an embodiment of the present invention in which data is destaged after, typically only after a predetermined period of time has elapsed since the last data access operation. The data is collected and time progresses. When S1(*a*) is found not to have been addressed for a predefined length of time, such as T=4 millisec in the illustrated example, its data, and optionally the associated parity, are destaged. In some embodiments the same access time is exhibited on the copy of the data in the pre-parity area N.

FIGS. 25A-26B, depicting examples of parity schemes constructed and operative in accordance with certain embodiments of the present invention, are now described.

Figure 25A:
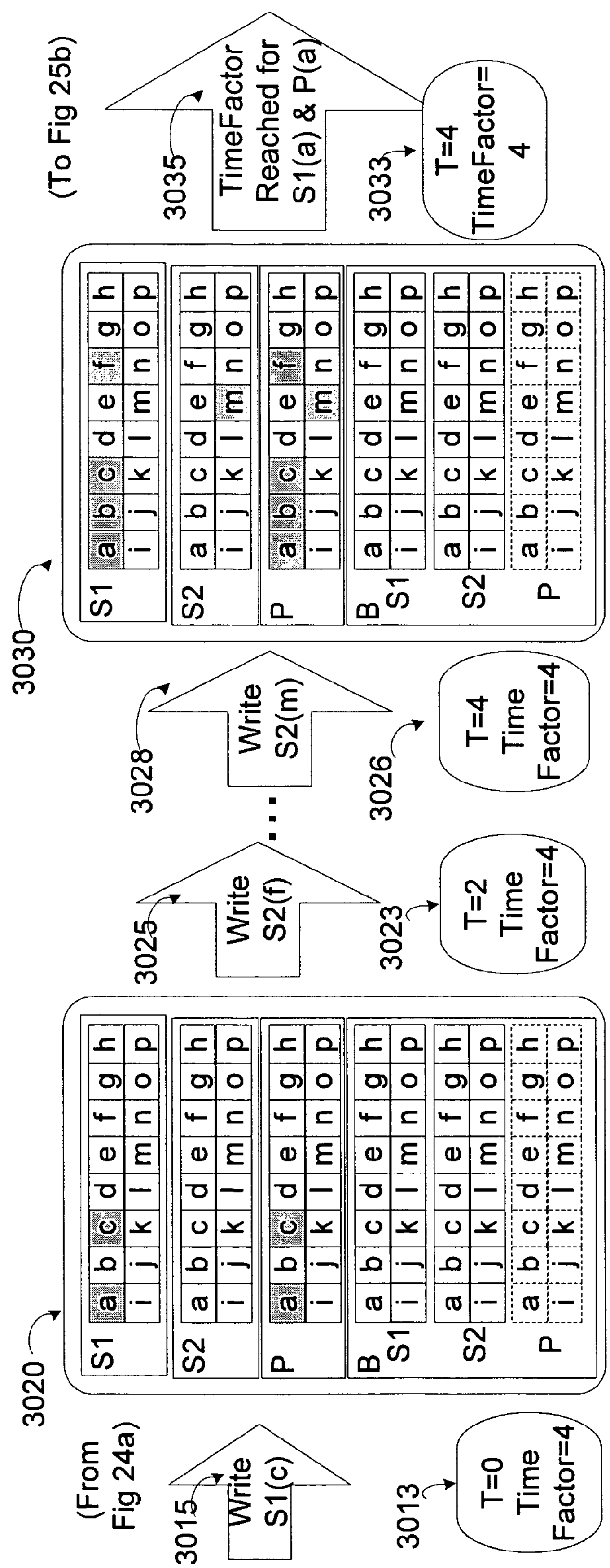
FIGS. 25A-26B, 27 depict examples of parity destaging schemes constructed and operative in accordance with certain embodiments of the present invention.
Figure 25B:
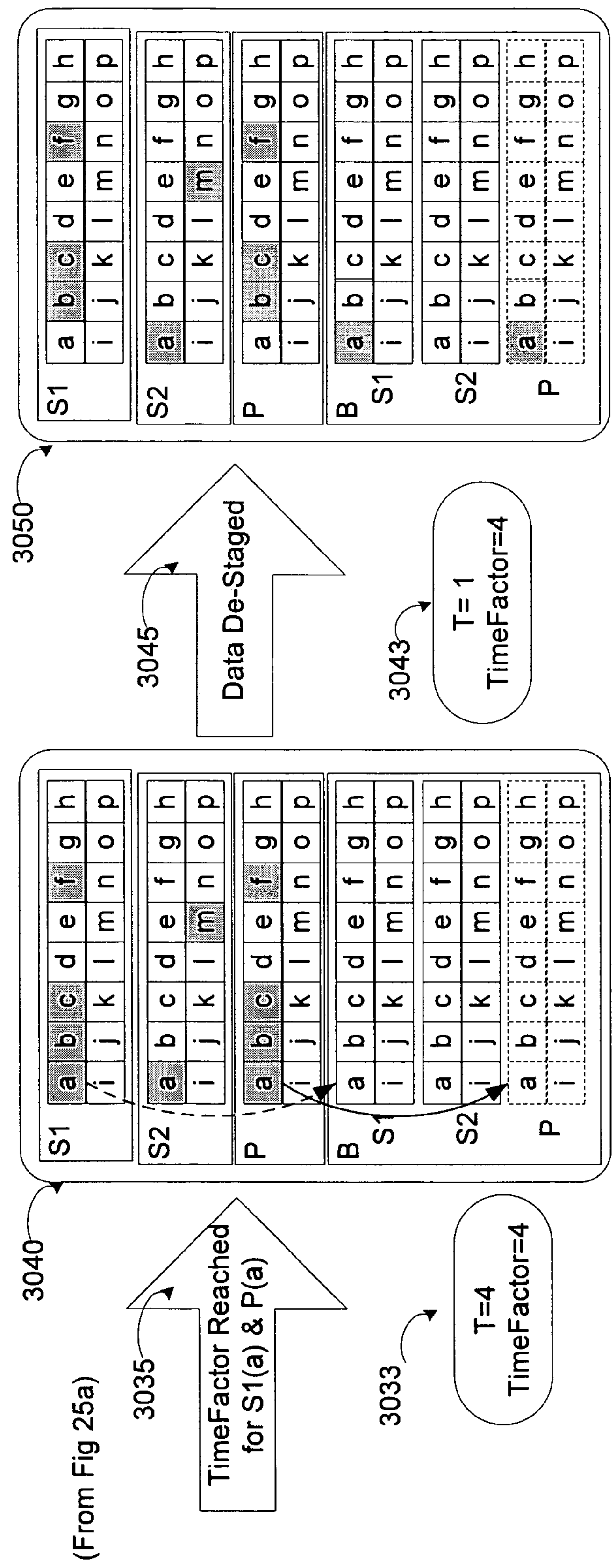

FIGS. 25A-25B, taken together, form a diagram showing a "time-based" embodiment of the present invention which is an alternative to FIG. 24B in which parity, and optionally data, is destaged if, typically only if, parity computations were not performed for a pre-determined time period.

Figure 26A:
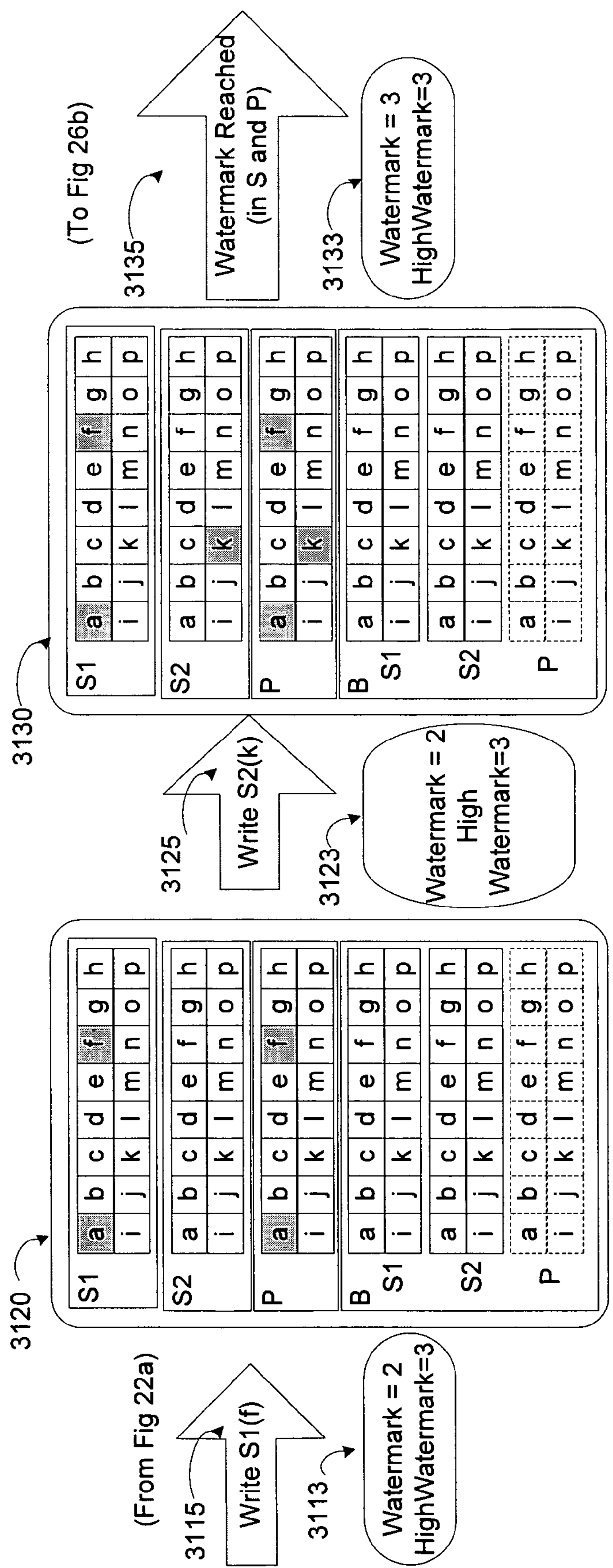
Figure 26B:
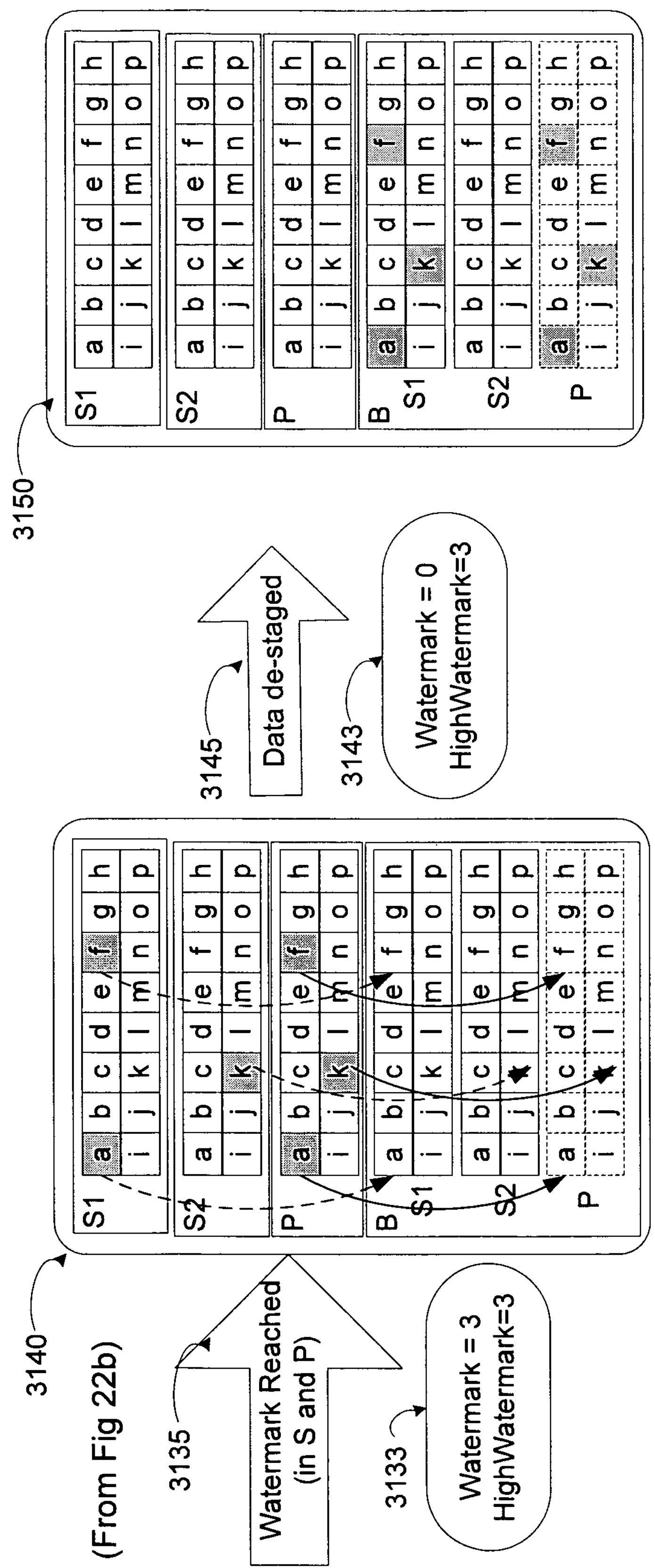

FIGS. 26A-26B, taken together, form a diagram showing another "watermark" embodiment of the present invention which is an alternative to FIGS. 22B-22C in which parity, and optionally data corresponding thereto, is destaged after, typically only after, reaching an application-defined high watermark. Once the accumulated parity reaches the watermark defined therefor, the parity and optionally the data corresponding thereto are destaged as shown in FIG. 26B. It is appreciated that the watermark can be confined to an S unit, if the number of waiting data blocks/parity blocks in an S unit reaches a predefined high watermark.

If, for example, under a certain scheme, parity is not computed for all members, and if the data but not the parity is destaged, then next time when booting, a copy of the latest (correct) data is available and parity may be computed when the system is started, e.g. as part of the load. On the other hand, if the parity is destaged as well, it either may be computed to the correct value, or all metadata related to it (e.g. to which data it belongs) may be held, or an "image" of the pointers may be downloaded, and loaded back up later.

Figure 27:
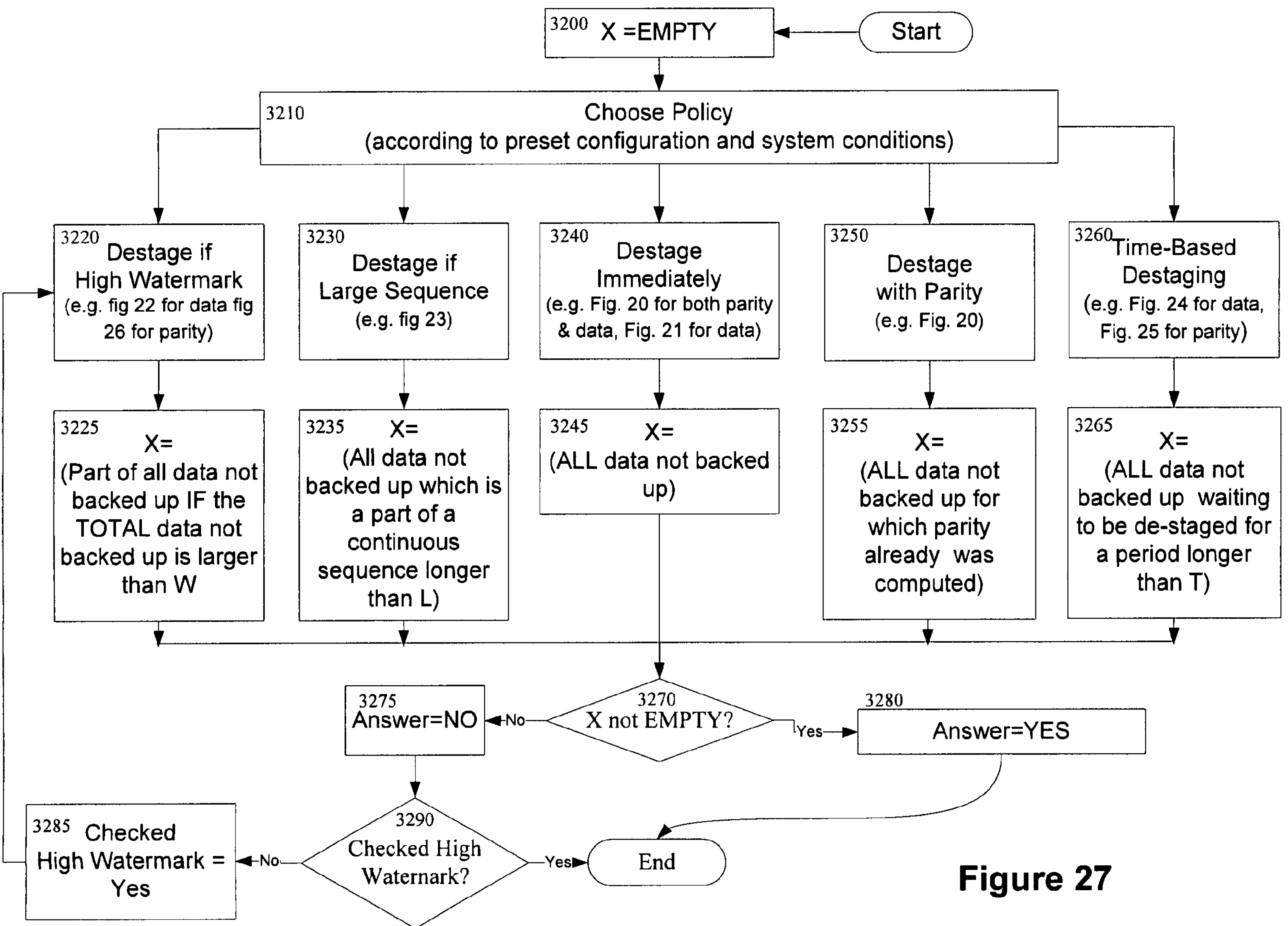

Reference is now made to FIG. 27 which illustrates an embodiment of the present invention in which a high watermark can be used as a threshold value for the size of the parity and/or data. This may be formulated as a post-condition following other conditions e.g. even if other conditions are checked and result in a decision not to destage currently, the watermark status is checked and, if it exceeds the threshold, destaging is performed. It is appreciated that system conditions other than whether a watermark has reached a high threshold, as above, can also be used to trigger destaging or even to negate destaging.

In some embodiments the watermark scheme may be employed on the combined data and parity waiting to be de-staged. In further embodiments, one may combine the data and parity to be destaged in order to meet the long sequence criterion.

FIG. 28A is a simplified flowchart illustration of an embodiment of the present invention which is an alternative to the shutting down method of FIG. 6.

FIG. 28B is a simplified flowchart illustration of an embodiment of the present invention which is an alternative to the booting up method of FIG. 7.

Figure 29:
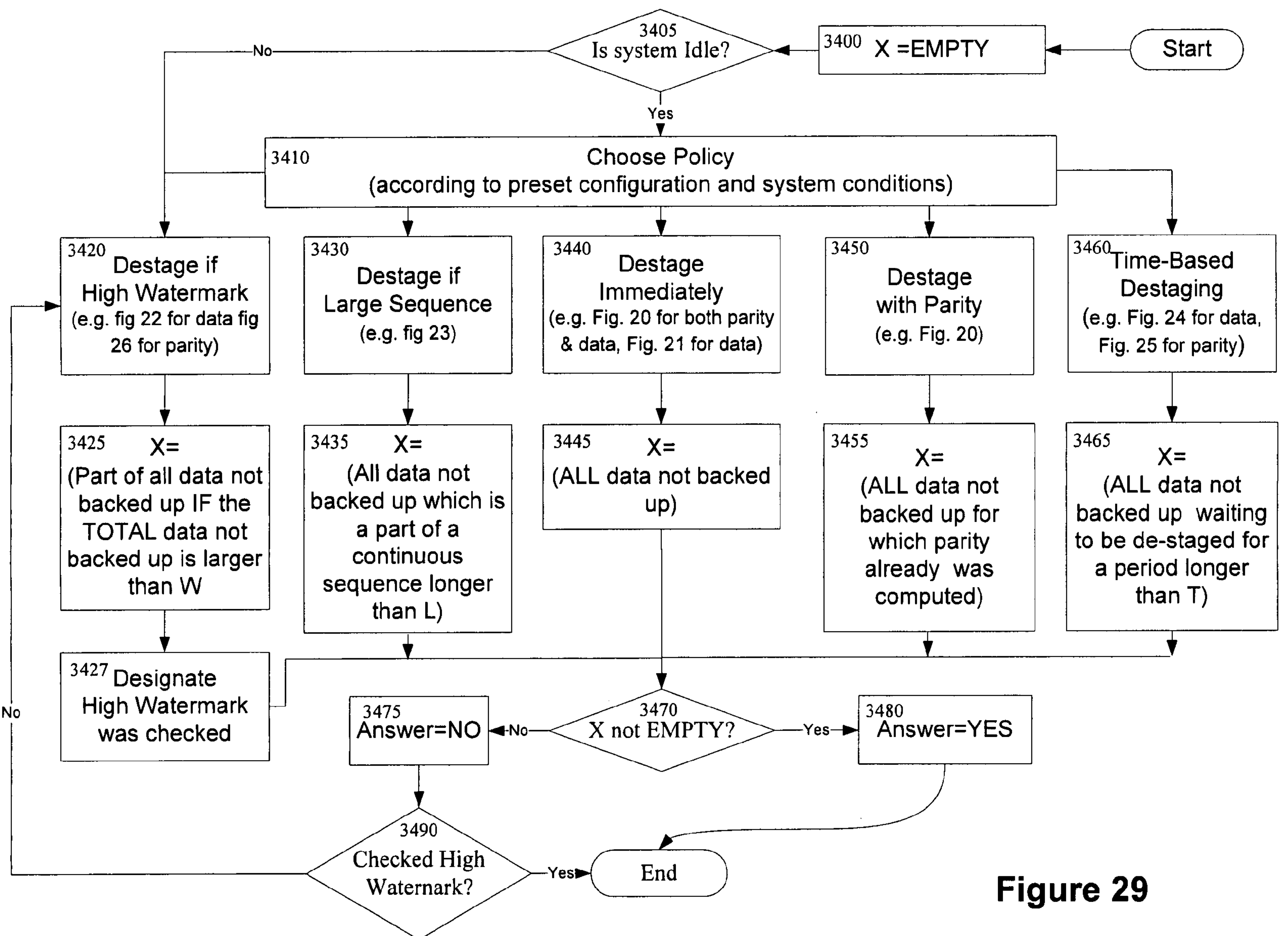
FIG. 29 illustrates an example embodiment of the present invention in which de-staging occurs when the system is idle.

FIG. 29 illustrates an example embodiment of the present invention in which destaging occurs, inter alia, when the system is idle, and also, typically, if a predefined high watermark is reached even if the system is not idle.

It is appreciated that parity values are not necessarily destaged, hence destaging operations are indicated in dashed lines in the drawings (e.g. FIGS. 22C, 23C, 26B).

Optionally, parity computation is not carried out for areas that are constantly being written on.

It is appreciated that the blocks in the various drawings are functional units and in practice, may not correspond to the actual allocation of storage and functionalities between physical units. For example, the occupancy table or tables may reside in the I/O controller, in the S-devices, in the N-devices or in the O-devices.

Each of the embodiments shown and described herein may be considered and termed a Solid State Storage module which may, for example, comprise a volatile memory unit combined with other functional units, such as a UPS. The term Solid State Storage module is not intended to be limited to a memory module. It is appreciated that any suitable one of the Solid State Storage modules shown and described herein may be implemented in conjunction with a wide variety of applications including but not limited to applications within the realm of Flash storage technology and applications within the realm of Volatile Memory based storage.

In addition to all aspects of the invention shown and described herein, any conventional improvement of any of the performance, cost and fault tolerance of the solid state storage modules shown and described herein, and/or of the balance between them, may be utilized.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery.

The invention claimed is:

1. A computer storage management system for managing a first plurality of data storage units, the system comprising at least one computer processor configured to:

responsive to a write operation in which an incoming data portion is to be written into an individual storage unit from among the storage units, deposits an incoming value in the individual storage unit and stores a copy of a data element in a pre-parity storage area, and wherein asynchronously with depositing the incoming value in the individual storage unit, the asynchronous parity computation manager is operative to compute parity data corresponding to the incoming data portion and to other data portions which are associated with the incoming data portion and to store the parity data; and recover lost data including determining whether at least one parity value associated with at least one data portion within said lost data is not current and, for at least one non-current parity, using information stored in the pre-parity storage area to generate, after said lost data has been lost, a current parity to replace said non-current parity and using said current parity to recover said lost data.

2. The system according to claim 1 wherein said at least one computer processor is configured to compute at least one parity pertaining to at least one individual writing operation after storing an incoming value pertaining to at least one writing operation subsequent to said individual writing operation.

3. The system according to claim 1, and also comprising a pre-parity storage area.

4. The system according to claim 2 wherein said at least one parity is computed after storing, only if a predetermined I/O congestion situation exists.

5. The system according to claim 4 wherein said predetermined I/O congestion situation includes at least a predetermined number of pending write operations.

6. The system according to claim 1 wherein at least a portion of the pre-parity storage area and at least one of the computer storage units are located within a single storage container.

7. The system according to claim 3 wherein said pre-parity storage area is located in a non-volatile storage device.

8. The system according to claim 1 wherein said at least one computer processor is configured to move at least one incoming value from the pre-parity storage area to non-volatile storage.

9. The system according to claim 1 wherein said at least one computer processor is configured to move at least one incoming value from the pre-parity storage area to non-volatile storage at least when a predetermined high water mark of the pre-parity storage area has been reached.

10. The system according to claim 3 wherein said at least one computer processor is configured to move at least one incoming value from said pre-parity storage area to non-volatile storage each time a set of incoming values has accumulated in said pre-parity storage area which answers to a predetermined criteria for continuousness in a context defined by a storage scheme of the non-volatile storage.

11. The system according to claim 3 wherein said at least one computer processor is configured to move at least one incoming value from said pre-parity storage area to non-volatile storage each time a predetermined period of time has elapsed since incoming values were last moved from said pre-parity storage area to non-volatile storage.

12. The system according to claim 3 wherein said pre-parity storage area comprises a FIFO storing:

incoming data portions and, for each individual incoming data portion stored, a pointer indicating a computer storage unit, from among said first plurality thereof, for which said individual incoming data portion stored is intended, and a parity computed bit indicating whether or not a parity has been computed for said individual incoming data portion stored.

13. The system according to claim 2 wherein said at least one computer processor is configured to carry out at least one asynchronous parity computation session in which at least one parity is computed pertaining to at least one individual writing operation after storing an incoming value pertaining to at least one writing operation subsequent to said individual writing operation, and wherein said session is followed by at least one writing session and subsequently by a shut-down having a duration, and wherein said at least one computer processor is configured to store at least one said parity and at least one incoming value combined into said at least one parity in a non-volatile storage device during said asynchronous parity computation session and prior to shut down, thereby to shorten said duration of said shut-down.

14. The system according to claim 13 wherein a plurality of parities, respectively combining a plurality of incoming values, are computed in said asynchronous parity computation session, and wherein all of said plurality of parities and the incoming values respectively combined thereinto are stored in the non-volatile storage device after first computing all of said parities.

15. The system according to claim 13 wherein a plurality of parities, respectively combining a plurality of incoming values, are computed in said asynchronous parity computation session, and wherein computation of at least one of said plurality of parities terminates after storage in the non-volatile storage device of least one other of said plurality of parities begins.

16. The system according to claim 9, and also comprising a UPS for use during shutdown whose size is determined by the maximal amount of pending writes to non-volatile storage.

17. The system according to claim 1 wherein, for at least one write operation replacing an old value with a new value, the old value is stored in O and is redundant by the parity and remaining parity members and at least two copies of the new value are stored in S and in N respectively.

18. The system according to claim 3 wherein said pre-parity storage area is located in a solid state storage device.

19. The system according to claim 1 wherein the at least one computer processor is configured to move at least one incoming value from the pre-parity storage area to non-volatile storage at least when the parity value associated with said incoming value is computed according to a parity-RAID scheme.

20. The system according to claim 19 wherein the at least one computer processor is configured to store a parity value computed for at least one incoming value in non-volatile storage at least when said parity value is computed according to a parity-RAID scheme.

21. The system according to claim 8 wherein said at least one computer processor is configured to store a parity value computed for at least one incoming value in non-volatile storage at least when a sequence of already computed parities, having a pre-defined length, has accumulated.

22. The system according to claim 21 wherein said at least one computer processor is configured is operative to store a parity value computed for at least one incoming value in non-volatile storage at least when a predetermined high water mark of the accumulated computed parities in the plurality of storage units has been reached.

23. The system according to claim 21 wherein said at least one computer processor is configured to store a parity value computed for at least one incoming value in non-volatile storage each time a set of computed parities has accumulated in the plurality of storage units which answers to a predetermined criteria for continuousness in a context defined by a storage scheme of the non-volatile storage.

24. The system according to claim 21 wherein said at least one computer processor is configured to store a parity value computed for at least one incoming value in non-volatile storage each time a predetermined period of time has elapsed since said parity value was last computed.

25. The system according to claim 1 wherein data is copied from the pre-parity storage to non-volatile storage according to a criterion whereby said data is destaged substantially immediately.

26. The system according to claim 25 wherein said criterion also comprises de-staging parity substantially immediately after computation thereof.

27. The system according to claim 1 wherein parity is copied from said plurality of data storage units to non-volatile storage according to a criterion whereby parity is de-staged substantially immediately after said parity has been computed.

28. The system according to claim 16 wherein, during shut-down, at least one data element in said pre-parity storage area which has already been destaged is not copied into said non-volatile storage area.

29. The system according to claim 3 wherein said pre-parity storage area is located in a volatile storage device.

30. The system according to claim 16 wherein the UPS is large enough to accommodate destaging time for the maximal amount of pending writes plus writing time for storing data corresponding to the maximal amount of pending writes within the non-volatile storage.

31. The system according to claim 30 wherein the UPS is also large enough to accommodate the maximal amount of data in the pre-parity storage.

32. The system according to claim 1 wherein data is copied from the pre-parity storage to non-volatile storage according to a criterion whereby said data is destaged when a predefined amount of sequential data to be destaged has been accumulated in said pre-parity storage.

33. The system according to claim 1 wherein data is copied from the pre-parity storage to non-volatile storage according to a criterion whereby data which has not been accessed for a predetermined period of time is de-staged.

34. The system according to claim 1 wherein data is copied from the pre-parity storage to non-volatile storage according to a criterion whereby data is destaged when there are no processes associated with the storage system which compete with destaging of said data for common system resources.

35. The system according to claim 1 wherein data is copied from the pre-parity storage to non-volatile storage according to a criterion whereby said data is destaged as soon as parity computations therefor have been completed.

36. The system according to claim 1 wherein parity is copied from said plurality of data storage units to non-volatile storage according to a criterion whereby de-staging of said parity is deferred until a threshold related to capacity of UPS is reached.

37. The system according to claim 1 wherein parity is copied from said plurality of data storage units to non-volatile storage according to a criterion whereby parity is de-staged when a predefined amount of sequential parity values to be de-staged have accumulated in said plurality of data storage units.

38. The system according to claim 1 wherein parity is copied from said plurality of data storage units to non-volatile storage according to a criterion whereby parity which has not been accessed for a predetermined period of time is de-staged.

39. The system according to claim 1 wherein parity is copied from said plurality of data storage units to non-volatile storage according to a criterion whereby parity is de-staged when there are no processes associated with the storage system which compete with de-staging of said parity for common system resources.

40. A computer storage management method for managing a first plurality of computer storage units operative to store data each including at least a second plurality of corresponding data portions, the method comprising:

managing writing operations and asynchronously computing at least one parity, including, responsive to occurrence of at least one write operation in which an incoming value is to be written into a location in an individual computer storage unit from among the computer storage units, depositing said incoming value in said individual storage unit, thereby to define an individual data portion stored therewithin, and in a pre-parity storage area, and computing and storing a parity combining the incoming value with the values of those data portions, in the computer storage units other than said individual computer storage unit, which correspond to said individual data portion; and recovering lost data including determining whether at least one parity of at least one data portion within said lost data is not current and, for at least one non-current parity, using information stored in the pre-parity storage area to generate, after said lost data has been lost, a current parity to replace said non-current parity and using said current parity to recover said lost data.

41. A computer program product, comprising a non-transitory computer usable medium having a computer readable program code embodied therein, said computer readable program code adapted to be executed to implement a computer storage management method for managing a first plurality of computer storage units operative to store data each including at least a second plurality of corresponding data portions, the method comprising:

managing writing operations and asynchronously computing at least one parity, including, responsive to occurrence of at least one write operation in which an incoming value is to be written into an individual computer storage unit from among the computer storage units, depositing said incoming value in said individual storage unit, thereby to define an individual data portion stored therewithin, and in a pre-parity storage area, and computing and storing a parity combining the incoming value with the values of those data portions, in the computer storage units other than said individual computer storage unit, which correspond to said individual data portion; and recovering lost data including determining whether at least one parity of at least one data portion within said lost data is not current and, for at least one non-current parity, using information stored in the pre-parity storage area to generate, after said lost data has been lost, a current parity to replace said non-current parity and using said current parity to recover said lost data.

42. The method according to claim 40, and also comprising acknowledging a write request corresponding to said write operation after said depositing step is performed for said write operation and before said computing and storing step is performed for said write operation.

43. The method according to claim 40 wherein the incoming value is always written to the pre-parity storage area prior to said computing of said parity.

44. The method according to claim 43 wherein incoming values are destaged from the pre-parity storage area to non-volatile storage according to a criterion whereby said incoming values are de-staged substantially immediately.

45. The method according to claim 42, further comprising, during normal operation of said first plurality of computer storage units, moving at least one incoming value from the pre-parity storage area to non-volatile storage, and, when booting up said first plurality of computer storage units, copying at least one value stored in said non-volatile storage area to said first plurality of computer storage units and computing and storing a parity therefor.

46. The method according to claim 40, and also comprising increasing frequency of parity computation as availability of storage in the pre-parity storage area decreases.

47. The method according to claim 40, and also comprising increasing frequency of destaging as availability of storage in the pre-parity storage area decreases.

48. The system according to claim 1 wherein data is copied from the pre-parity storage to non-volatile storage according to a criterion whereby destaging of said data is deferred until a threshold related to capacity of UPS is reached.

49. The method according to claim 43 wherein incoming values are de-staged from the pre-parity storage area to non-volatile storage according to a criterion whereby defer de-staging of said incoming values until a threshold related to capacity of UPS is reached.

50. The method according to claim 43 wherein incoming values are de-staged from the pre-parity storage area to non-volatile storage according to a criterion whereby said incoming values are de-staged when a predefined amount of sequential data to be de-staged has accumulated in said pre-parity storage.

51. The method according to claim 43 wherein incoming values are de-staged from the pre-parity storage area to non-volatile storage according to a criterion whereby incoming values which has not been accessed for a predetermined period of time are de-staged.

52. The method according to claim 43 wherein incoming values are de-staged from the pre-parity storage area to non-volatile storage according to a criterion whereby incoming values are de-staged when there are no processes associated with the storage system which compete with de-staging of said incoming values for common system resources.

53. The method according to claim 43 wherein incoming values are de-staged from the pre-parity storage area to non-volatile storage according to a criterion whereby incoming values are de-staged as soon as parity computations therefor have been completed.

* * * * *

UNITED STATES PATENT AND TRADEMARK OFFICE

CERTIFICATE OF CORRECTION

PATENT NO. : 8,943,357 B2
APPLICATION NO. : 13/124243
DATED : January 27, 2015
INVENTOR(S) : Yedidia Atzmony It is certified that error appears in the above-identified patent and that said Letters Patent is hereby corrected as shown below:

On the Title Page, Item (60), please correct priority information for provisional patent application 61/165,670 as follows:

Provisional application No. 61/193,079, filed on Oct. 27, 2008, provisional application No. 61/165,670 filed on APRIL 1, 2009.

Signed and Sealed this
Twelfth Day of May, 2015

Michelle K. Lee

Michelle K. Lee
*Director of the United States Patent and Trademark Office*